(12) United States Patent
Bar-Erez et al.

(10) Patent No.: US 9,643,629 B2
(45) Date of Patent: May 9, 2017

(54) ROLLING CONTAINER ASSEMBLY WITH ADJUSTABLE STORAGE UNITS

(71) Applicant: THE STANLEY WORKS ISRAEL LTD., Rosh Ha'Ayin (IL)

(72) Inventors: Sharon Bar-Erez, Kefar Sirkin (IL); Gil Vilkomirski, Ein Vered (IL); Yosi Sabbag, Holon (IL); Elad Hay Shitrit, Tel Aviv (IL)

(73) Assignee: The Stanley Works Isreal Ltd., Rosh Ha'Ayin (IL)

( * ) Notice: Subject to any disclaimer, the term of this patent is extended or adjusted under 35 U.S.C. 154(b) by 0 days.

(21) Appl. No.: 14/830,304

(22) Filed: Aug. 19, 2015

(65) Prior Publication Data
US 2016/0046309 A1 Feb. 18, 2016

Related U.S. Application Data

(63) Continuation of application No. 14/480,113, filed on Sep. 8, 2014, now Pat. No. 9,132,543, which is a
(Continued)

(51) Int. Cl.
*B62B 1/14* (2006.01)
*B62B 1/12* (2006.01)
(Continued)

(52) U.S. Cl.
CPC ............... *B62B 1/12* (2013.01); *A47B 47/00* (2013.01); *A47B 81/00* (2013.01); *B25H 3/023* (2013.01);
(Continued)

(58) Field of Classification Search
CPC .... B62B 1/04; B62B 1/06; B62B 1/12; B62B 1/14; B62B 1/142; B62B 1/16
(Continued)

(56) References Cited

U.S. PATENT DOCUMENTS

| 344,661 A | 6/1886 | Kistler |
| 687,619 A * | 11/1901 | Couse ...................... G07F 9/10 126/332 |

(Continued)

FOREIGN PATENT DOCUMENTS

| DE | 42 01 264 | 7/1993 |
| DE | 10 2007 032 382 A1 | 1/2008 |

(Continued)

OTHER PUBLICATIONS

Stanley 20602Z Metal Rolling Workshop [online]. Retrieved from the Internet: <URL: http://www.amazon.com/Stanley-20602Z-Metal-Rolling-Workshop/dp/B00005QVQT>.
(Continued)

*Primary Examiner* — Jeffrey J Restifo
(74) *Attorney, Agent, or Firm* — Pillsbury Winthrop Shaw Pittman LLP

(57) ABSTRACT

An apparatus for transporting articles between working locations includes one or more rotatable ground engaging wheels mounted towards the bottom of the apparatus for rotation about an axis to provide rolling support for the apparatus, a manually engageable pulling handle, a frame, at least one container connected to the frame, and an audio playback device. The audio playback device includes one or more speakers and is configured to be releasably connected to the apparatus. The pulling handle and the one or more ground engaging wheels are arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

18 Claims, 40 Drawing Sheets

Related U.S. Application Data continuation-in-part of application No. 14/019,161, filed on Sep. 5, 2013, now Pat. No. 8,936,258, which is a continuation of application No. 12/858,376, filed on Aug. 17, 2010, now Pat. No. 8,567,796.

(60) Provisional application No. 61/238,937, filed on Sep. 1, 2009.

(51) Int. Cl.

| | | |
|---|---|---|
| *B25H 3/02* | (2006.01) | |
| *A47B 47/00* | (2006.01) | |
| *A47B 81/00* | (2006.01) | |
| *B65D 21/02* | (2006.01) | |
| *B65D 25/28* | (2006.01) | |
| *B65D 43/16* | (2006.01) | |
| *B65D 43/22* | (2006.01) | |
| *B62B 1/04* | (2006.01) | |
| *B62B 1/26* | (2006.01) | |
| *B62B 5/00* | (2006.01) | |
| *H04R 1/02* | (2006.01) | |

(52) U.S. Cl.
CPC ............ *B25H 3/028* (2013.01); *B62B 1/04* (2013.01); *B62B 1/14* (2013.01); *B62B 1/26* (2013.01); *B62B 5/00* (2013.01); *B65D 21/0217* (2013.01); *B65D 25/28* (2013.01); *B65D 43/16* (2013.01); *B65D 43/22* (2013.01); *H04R 1/028* (2013.01); *B62B 2202/12* (2013.01); *B62B 2202/48* (2013.01); *B65D 2525/283* (2013.01); *H04R 2499/13* (2013.01)

(58) Field of Classification Search
USPC ............................................ 280/47.18, 47.19
See application file for complete search history.

(56) References Cited

U.S. PATENT DOCUMENTS

| | | | |
|---|---|---|---|
| 1,424,819 A | | 8/1922 | Hayes et al. |
| 2,554,091 A | | 5/1951 | Davis |
| 2,588,830 A | | 3/1952 | Haanstad |
| 2,901,262 A | | 8/1959 | Berlin |
| 2,964,328 A | | 12/1960 | Muir |
| 3,168,329 A | | 2/1965 | Goldschmidt |
| 3,393,951 A | | 7/1968 | Sulentic |
| 3,734,526 A | | 5/1973 | Propst et al. |
| 3,804,432 A | | 4/1974 | Lehrman |
| 3,891,230 A | * | 6/1975 | Mayer ............... B62B 1/14 190/18 A |
| 3,990,653 A | | 11/1976 | Marcell |
| 4,169,607 A | * | 10/1979 | Reese ............... B62B 1/06 280/47.19 |
| 4,363,496 A | | 12/1982 | Schreiner |
| 4,448,434 A | | 5/1984 | Anderson |
| 4,619,363 A | | 10/1986 | Wolfseder |
| 4,884,689 A | | 12/1989 | Su-Chin |
| 4,936,594 A | * | 6/1990 | Oliver, III ............ A47B 81/06 280/47.19 |
| 4,984,704 A | | 1/1991 | O'Malley |
| 5,104,135 A | | 4/1992 | Sheets |
| 5,123,666 A | | 6/1992 | Moore |
| 5,207,723 A | * | 5/1993 | Newby, Sr. ............ B62B 1/12 280/47.19 |
| 5,333,885 A | * | 8/1994 | Pullman ............... B62B 1/10 273/285 |
| 5,362,078 A | | 11/1994 | Paton |
| 5,378,005 A | * | 1/1995 | Norton ............... B25H 3/04 206/349 |
| 5,464,104 A | | 11/1995 | McArthur |
| 5,474,312 A | | 12/1995 | Starita et al. |
| 5,595,395 A | | 1/1997 | Wilson |
| 5,626,352 A | | 5/1997 | Grace |
| 5,634,649 A | | 6/1997 | Breining et al. |
| 5,720,535 A | | 2/1998 | Mehman |
| 5,799,958 A | * | 9/1998 | Bishop ............... B25H 3/00 280/47.26 |
| 5,845,915 A | | 12/1998 | Wilson |
| 5,906,381 A | | 5/1999 | Hovatter |
| 5,913,527 A | | 6/1999 | Hailston |
| 5,931,483 A | | 8/1999 | Haynes |
| 5,934,466 A | | 8/1999 | Loeffler |
| 5,938,396 A | | 8/1999 | Audet |
| 6,000,713 A | | 12/1999 | Lin |
| 6,050,660 A | | 4/2000 | Gurley |
| 6,079,719 A | | 6/2000 | Tisbo et al. |
| 6,082,539 A | | 7/2000 | Lee |
| 6,109,627 A | * | 8/2000 | Be ............... B62B 1/26 190/18 A |
| 6,113,129 A | | 9/2000 | Marques et al. |
| 6,123,344 A | * | 9/2000 | Clegg ............... B62B 1/14 211/194 |
| 6,131,926 A | | 10/2000 | Harlan |
| 6,135,466 A | | 10/2000 | Irwin |
| 6,176,559 B1 | | 1/2001 | Tiramani et al. |
| D437,484 S | | 2/2001 | Tiramani et al. |
| 6,254,112 B1 | | 7/2001 | Clegg |
| 6,347,847 B1 | | 2/2002 | Tiramani et al. |
| 6,357,063 B1 | | 3/2002 | Selby |
| 6,371,320 B2 | | 4/2002 | Sagol |
| 6,394,471 B1 | * | 5/2002 | Watson ............... B62B 1/12 280/47.19 |
| 6,398,235 B1 | * | 6/2002 | Cary ............... B25H 3/00 280/47.18 |
| 6,474,930 B1 | | 11/2002 | Simpson |
| 6,561,528 B2 | | 5/2003 | Bootsman |
| 6,601,930 B2 | | 8/2003 | Tiramani et al. |
| 6,616,152 B2 | | 9/2003 | Oliver |
| 6,659,476 B2 | | 12/2003 | Weida |
| 6,666,465 B2 | | 12/2003 | Chan |
| 6,874,634 B2 | | 4/2005 | Riley |
| 6,889,838 B2 | | 5/2005 | Meier et al. |
| 6,945,546 B2 | | 9/2005 | Guirlinger |
| 7,063,339 B2 | | 6/2006 | Jarko et al. |
| 7,066,475 B2 | | 6/2006 | Barnes |
| 7,108,131 B2 | | 9/2006 | Dreher et al. |
| 7,168,715 B1 | | 1/2007 | Friedman |
| 7,188,847 B1 | | 3/2007 | Friedman |
| D542,496 S | | 5/2007 | Sabbag |
| 7,210,689 B2 | | 5/2007 | Guirlinger |
| 7,263,742 B2 | * | 9/2007 | Valentini ............... B25H 3/00 15/323 |
| 7,328,905 B2 | | 2/2008 | Guirlinger |
| 7,367,571 B1 | * | 5/2008 | Nichols ............... B25H 1/12 280/47.131 |
| 7,500,681 B2 | | 3/2009 | Steadman |
| 7,503,569 B2 | | 3/2009 | Duvigneau |
| 7,686,260 B1 | | 3/2010 | Tetradis |
| 7,703,776 B1 | | 4/2010 | Nugent |
| 7,819,407 B1 | | 10/2010 | Charitun |
| 7,823,893 B2 | | 11/2010 | Meyers et al. |
| 7,845,653 B2 | | 12/2010 | Katz |
| 7,883,096 B2 | | 2/2011 | Katz et al. |
| 7,905,502 B2 | | 3/2011 | Oliver |
| 7,938,412 B2 | | 5/2011 | Katz |
| D640,869 S | | 7/2011 | Katz et al. |
| D653,832 S | * | 2/2012 | Vilkomirski ............... B25H 1/12 D34/25 |
| D654,241 S | | 2/2012 | Vilkomirski et al. |
| 8,132,819 B2 | | 3/2012 | Landau et al. |
| 8,226,092 B2 | | 7/2012 | Oliver |
| 8,567,796 B2 | * | 10/2013 | Bar-Erez ............... B25H 3/023 280/47.18 |
| 8,657,307 B2 | * | 2/2014 | Lifshitz ............... B25H 3/028 280/47.17 |
| 8,668,209 B1 | * | 3/2014 | Anzivino ............... B62B 1/002 280/47.12 |
| 9,132,543 B2 | * | 9/2015 | Bar-Erez ............... B25H 3/023 |

(56) References Cited

U.S. PATENT DOCUMENTS

| | | | |
|---|---|---|---|
| 2001/0052681 A1* | 12/2001 | Deavila | B62B 3/10 |
| | | | 280/47.19 |
| 2002/0014488 A1 | 2/2002 | Schermel | |
| 2002/0067027 A1 | 6/2002 | Anderson | |
| 2002/0074905 A1 | 6/2002 | Tiramani et al. | |
| 2002/0113386 A1 | 8/2002 | Be | |
| 2003/0001348 A1 | 1/2003 | Weida | |
| 2003/0146589 A1 | 8/2003 | Jarko et al. | |
| 2004/0265104 A1 | 12/2004 | Davis, Jr. | |
| 2005/0062244 A1 | 3/2005 | Guirlinger | |
| 2005/0104308 A1* | 5/2005 | Barnes | B62B 1/14 |
| | | | 280/47.24 |
| 2005/0258610 A1 | 11/2005 | Stone et al. | |
| 2005/0275178 A1 | 12/2005 | Huesdash et al. | |
| 2006/0006619 A1 | 1/2006 | Guirlinger | |
| 2006/0012139 A1 | 1/2006 | Guirlinger | |
| 2006/0038367 A9 | 2/2006 | Ferraro et al. | |
| 2007/0080512 A1 | 4/2007 | Bartholmey et al. | |
| 2007/0194543 A1 | 8/2007 | Duvigneau | |
| 2007/0273114 A1 | 11/2007 | Katz | |
| 2008/0084036 A1 | 4/2008 | Keeler | |
| 2008/0121547 A1 | 5/2008 | Dur et al. | |
| 2008/0128305 A1 | 6/2008 | Guirlinger | |
| 2008/0143069 A1 | 6/2008 | Richards et al. | |
| 2009/0020528 A1 | 1/2009 | Chang | |
| 2009/0026901 A1 | 1/2009 | Nies, III et al. | |
| 2009/0096181 A1* | 4/2009 | Cole, Jr. | B62B 1/14 |
| | | | 280/47.35 |
| 2009/0309323 A1 | 12/2009 | Oliver | |
| 2010/0052276 A1 | 3/2010 | Brunner | |
| 2010/0290877 A1 | 11/2010 | Landau et al. | |
| 2010/0327562 A1 | 12/2010 | Kasuya et al. | |
| 2011/0049824 A1* | 3/2011 | Bar-Erez | B25H 3/023 |
| | | | 280/47.18 |
| 2011/0181008 A1 | 7/2011 | Bensman et al. | |
| 2012/0160886 A1 | 6/2012 | Henny et al. | |
| 2012/0326406 A1 | 12/2012 | Lifshitz et al. | |
| 2014/0001719 A1 | 1/2014 | Bar-Erez et al. | |
| 2014/0023221 A1* | 1/2014 | Weinstein | H04R 1/028 |
| | | | 381/334 |
| 2014/0375181 A1* | 12/2014 | Bar-Erez | B25H 3/023 |
| | | | 312/111 |

FOREIGN PATENT DOCUMENTS

| | | |
|---|---|---|
| EP | 0 555 533 B1 | 8/1994 |
| EP | 1 424 170 | 6/2004 |
| EP | 1 859 908 | 11/2007 |
| GB | 2 235 165 | 9/2006 |

OTHER PUBLICATIONS

Stanley Rolling Workshop [online]. Retrieved from the Internet: <URL: http://www.machinemart.co.uk/shop/product/details/rolling-workshop/path/tool-boxes-tool-bags-organisers>.

Stanley FatMax® 4-in-1 Mobile Work Station (020800R) [online]. Retrieved from the Internet: <URL: http://www.stanleytools.com/default.asp?CATEGORY=TOOLBOXES&TYPE=PRODUCT&PARTNUMBER=020800R&SDesc=FatMax%26%23174%3B+4-in-1+Mobile+Work+Station>.

Extended Search Report as issued for European Patent Application No. 10174339.1, dated May 27, 2011.

Northern Tool Mobile Workshop and Toolbox—Model# 75-2050 [online]. Retrieved from the Internet: <URL: http://www.northerntool.com/webapp/wcs/stores/servlet/product_6970_200382275_200382275>.

Duratool Rolling Tool Organizer and Rolling Workshop [online]. Retrieved from the Internet: <URL: http://www.amazon.com/s?ie=UTF8&search-alias=tools&field-brandtextbin=Duratool>.

Non-Final Office Action issued Jul. 20, 2016 in corresponding U.S. Appl. No. 14/815,226 (7 pages).

\* cited by examiner

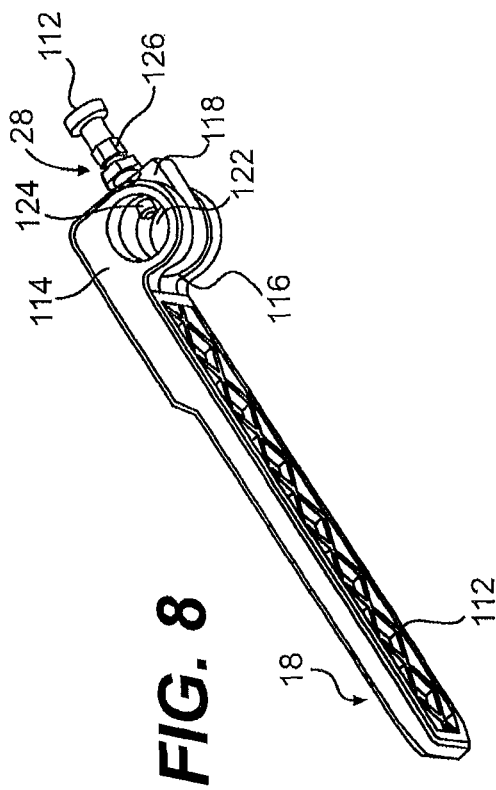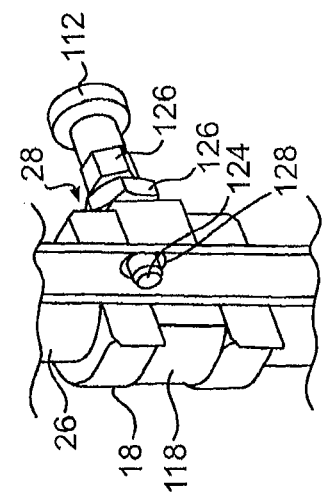

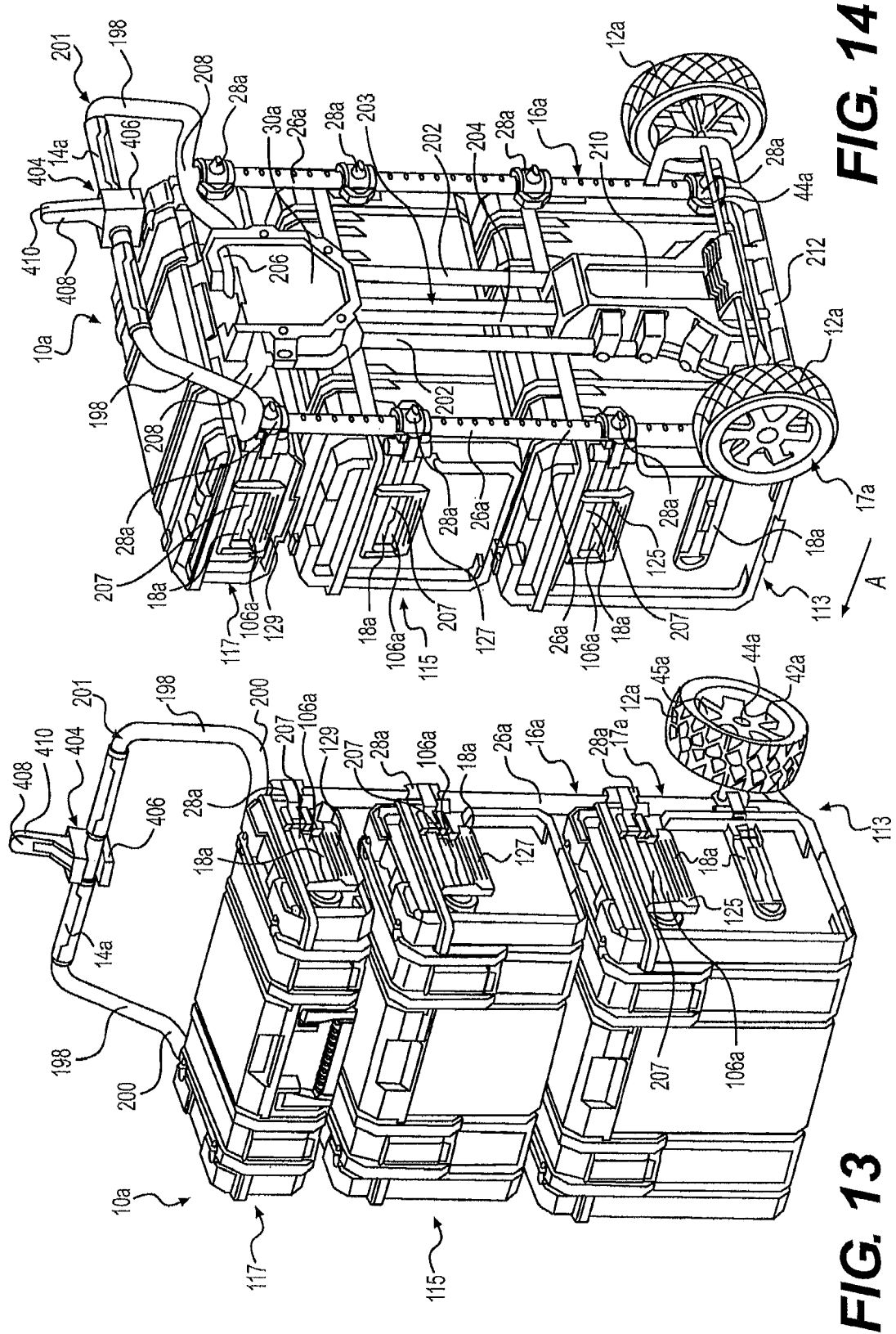

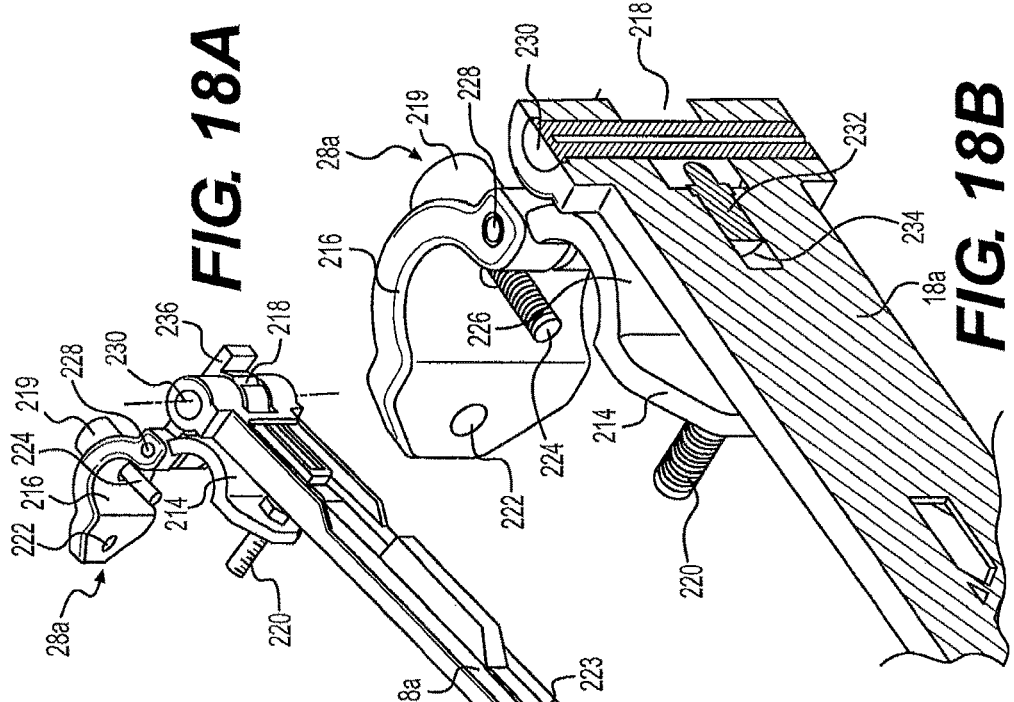
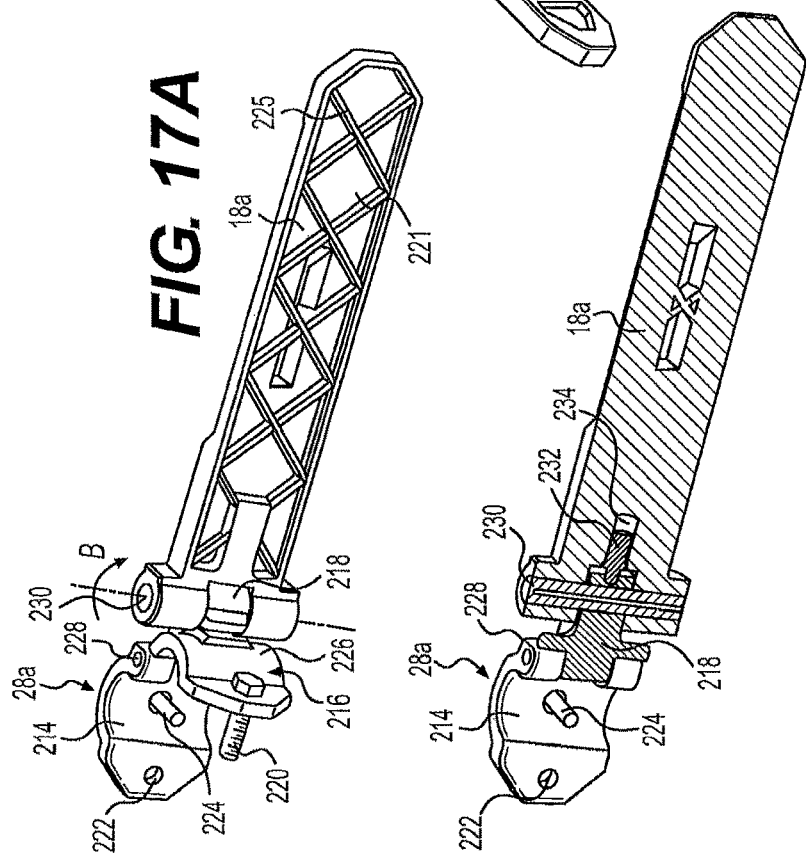

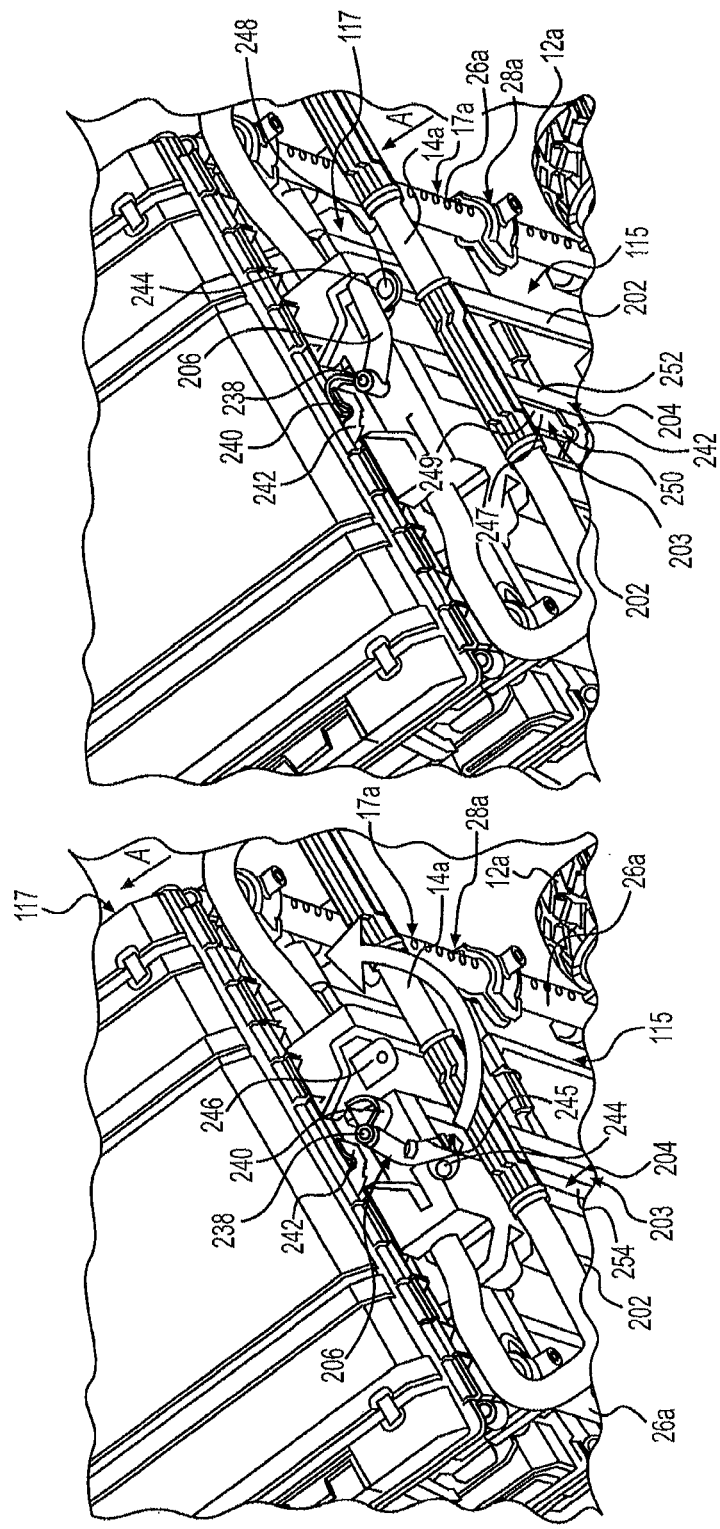

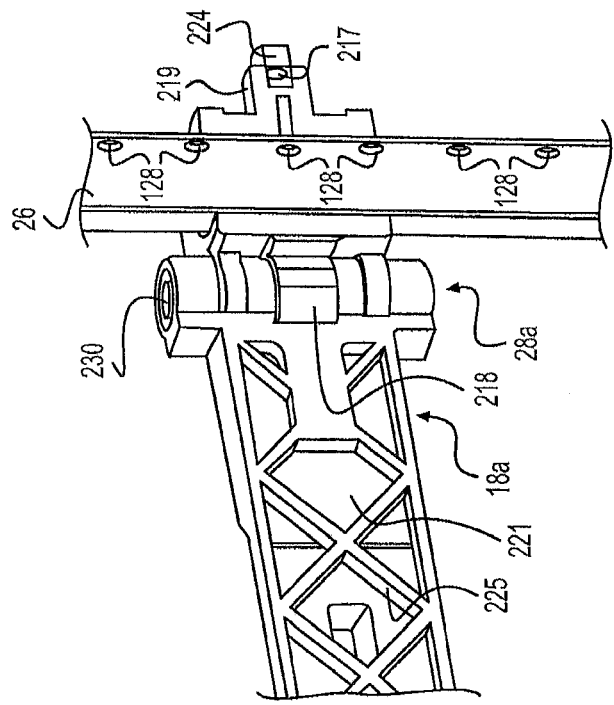
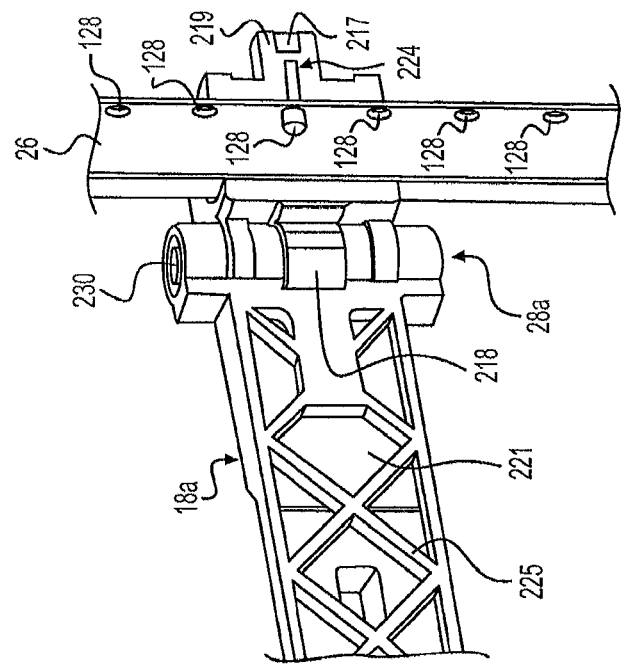
FIG. 29B
FIG. 29A

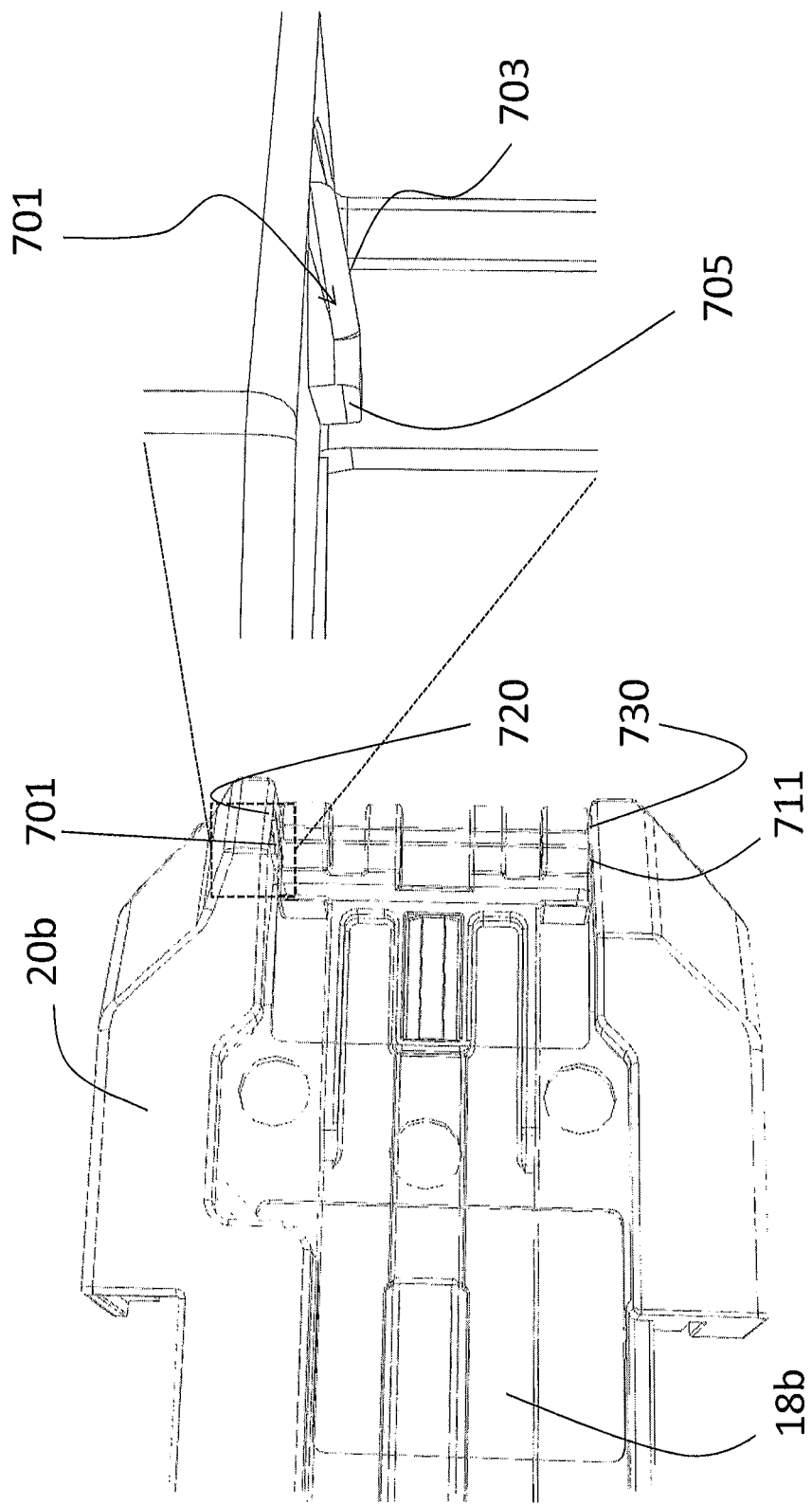

ROLLING CONTAINER ASSEMBLY WITH ADJUSTABLE STORAGE UNITS

CROSS-REFERENCE TO RELATED APPLICATIONS

This application is a continuation of U.S. patent application Ser. No. 14/480,113, entitled "Rolling Container Assembly With Adjustable Storage Units," filed on Sep. 8, 2014, now U.S. Pat. No. 9,132,543, which is a continuation-in-part of U.S. patent application Ser. No. 14/019,161, entitled "Rolling Container Assembly With Adjustable Storage Units," filed on Sep. 5, 2013, now U.S. Pat. No. 8,936,258, which is a continuation of U.S. patent application Ser. No. 12/858,376, entitled "Rolling Container Assembly With Adjustable Storage Units," filed on Aug. 17, 2010, now U.S. Pat. No. 8,567,796, which in turn claims priority and benefit under 35 U.S.C. §119(e) to U.S. Provisional Patent Application No. 61/238,937, entitled "Rolling Container Assembly With Adjustable Storage Units," filed on Sep. 1, 2009. The entire content of each of these applications are incorporated herein by reference in their entirety.

FIELD

The present patent application relates to a rolling container assembly.

BACKGROUND

Rolling tool container assemblies are commonly used to carry a plurality of working tools to the working location. However, such tool container assemblies typically do not have adjustable mount structures that enable containers to be releasably mounted to the assembly. There is a need in the art for an improved storage system.

SUMMARY

One aspect of the present patent application provides an apparatus for transporting articles between working locations. The apparatus includes one or more rotatable ground engaging wheels mounted towards the bottom of the apparatus for rotation about an axis to provide rolling support for the apparatus, a manually engageable pulling handle, a frame, at least one container connected to the frame, and an audio playback device. The audio playback device includes one or more speakers and is configured to be releasably connected to the apparatus. The pulling handle and the one or more ground engaging wheels are arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

Another aspect of the present patent application provides an apparatus for transporting articles between working locations. The apparatus includes one or more rotatable ground engaging wheels mounted towards the bottom of the apparatus for rotation about an axis to provide rolling support for the apparatus, a manually engageable pulling handle, a frame, one or more mount structures adjustably connected to the frame so as to adjust a height thereof on the frame, at least one container releasably connected to the one or more mount structures that are adjustably connected to the frame, thus enabling a height of the at least one container to be adjusted on the frame, and an audio playback device. The audio playback device includes one or more speakers and the audio playback device configured to be releasably connected to the one or more mount structures. The pulling handle and the one or more ground engaging wheels are arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the present patent application. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

FIG. 8 is a perspective view of a mount structure and attachment structure in accordance with an embodiment of the present patent application;

FIGS. 9a-9b are partial cross sectional views of a mount structure, mounting bar, and attachment structure in accordance with an embodiment of the present patent application;

FIG. 13 shows a front perspective view of the rolling container assembly in accordance with another embodiment of the present patent application;

FIG. 14 shows a rear perspective view of the rolling container assembly of the embodiment of FIG. 13;

FIGS. 17A-17B show detailed perspective and partial cross-sectional views, respectively, of the mount structure in accordance with an embodiment of the present patent application;

FIGS. 18A-18B show detailed perspective and partial cross-sectional views, respectively, of the mount structure in accordance with an embodiment of the present patent application;

FIGS. 20A-20B show detailed views of a rear latching structure of the rolling container assembly in the unlatched and latched positions, respectively, in accordance with an embodiment of the present patent application;

FIGS. 29A-29B are partial cross sectional views of a mount structure, mounting bar, and attachment structure in accordance with an embodiment of the present patent application;

FIGS. 32B-32D are line drawing side views of the alternate latching assembly shown in FIG. 32A in accordance with an embodiment of the present patent application;

DETAILED DESCRIPTION

Figure 1:
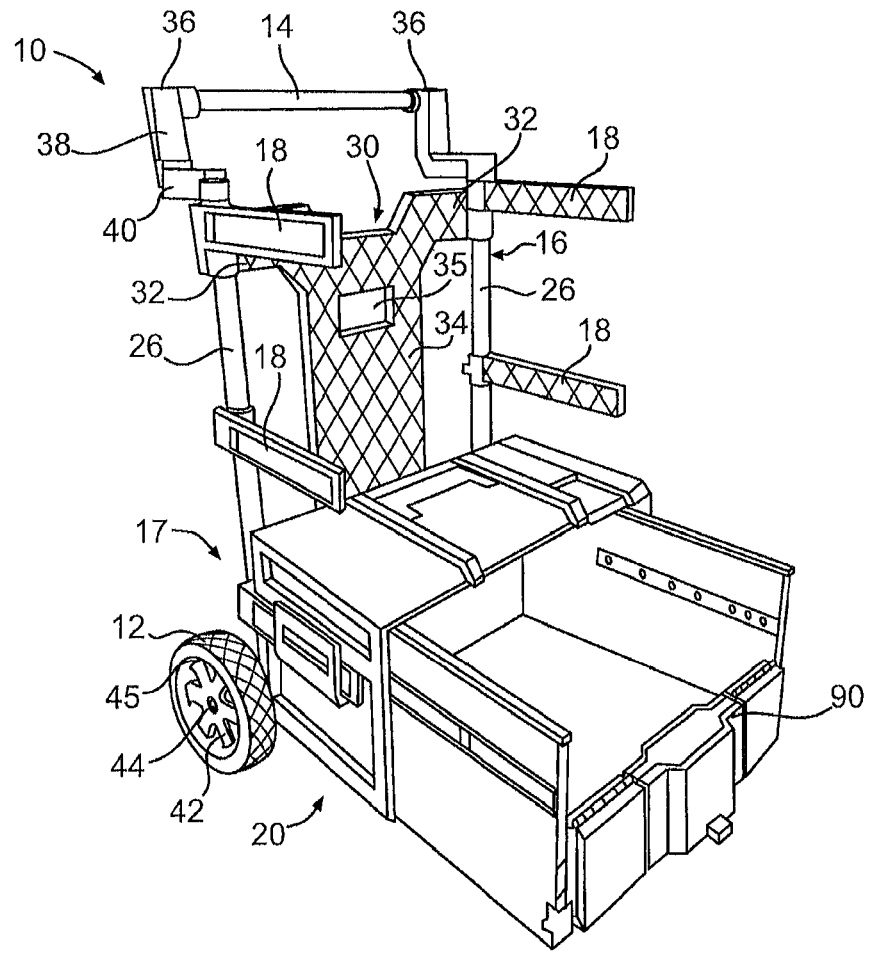
FIG. 1 is a perspective front view of a rolling storage assembly in accordance with an embodiment of the present patent application.

FIG. 1 shows an apparatus 10 for transporting articles between working locations. The apparatus 10 includes one or more rotatable ground engaging wheels 12 mounted towards the bottom of the apparatus 10 for rotation about an axis to provide rolling support for the apparatus 10 and a manually engageable pulling handle 14. The pulling handle 14 and the one or more ground engaging wheels 12 are arranged to enable a user to manually pull the pulling handle 14 generally rearwardly so as to tilt the apparatus 10 rearwardly to a tilted rolling movement position, thereby enabling a user to roll the apparatus 10 to a desired location by pushing or pulling the pulling handle 14 in a desired direction. The apparatus 10 may also include a chassis 17, which may comprise a frame 16 and at least one or more mount structures 18 adjustably connected to the frame 16. The apparatus 10 further includes a plurality of containers 20, 22, and 24 (see FIG. 3) releasably connected to the mount structures 18. In one embodiment, at least two of the containers 20, 22, and 24 are of a different configuration from one another. The plurality of containers 20, 22, 24 may be releasably connected to the mount structures 18 such that each of the plurality of containers 20, 22, 24 may be independently removable from the mount structures 18 and the chassis 17. That is, each of the plurality of containers 20, 22, and 24 may be released and removed from their respective mount structures 18 and from the chassis 17 without releasing any of the other containers of the plurality of containers 20, 22, and 24. The plurality of containers 20, 22, 24 may also be releasably connected to the mount structures 18 and arranged such that the containers 20, 22, 24 are spaced from one another. In other words, the containers 20, 22, and 24 may be connected to the mount structures 18 and arranged on the chassis 17 such that each container 20, 22, 24 does not contact or rest on another container 20, 22, and 24. As such, a lower container 20, 22, 24 may be removed from the chassis 17 without having to remove a container 20, 22, 24 located above the lower container 20, 22, 24.

It is contemplated that the mount structures 18 are not limited to the configuration shown in the illustrated embodiment. The mount structures 18 may have any configuration that enables the containers 20, 22, 24 to be mounted thereon. The mount structures 18 may be, just for example, trays or hooks connected to the frame 16. In some embodiments, the mount structures 18 may be removed from the frame 16. Alternatively or additionally, in some embodiments, the mount structures 18 may also be optionally fixed to the frame 16.

As shown in FIG. 1, the frame may comprise two vertically extending mounting bars 26. The mounting bars 26 may be configured and arranged to attach the mount structures 18 to the frame 16 using attachment structures 28 (see FIG. 7). The attachment structures 28 may also be configured and arranged to enable the mount structures 18 to be adjusted on or removed from the frame 16. The attachment structures 28 will be described in detail later. The apparatus 10 may optionally have a rear member 30 secured to the frame 16. The rear member 30 may be made from suitably molded plastic, although it is contemplated that other materials known in the art may be used, such as, for example, metal or wood. The rear member 30 may be formed with ribs 29 (see FIG. 5) that are deployed crosswise with respect to one another such that diamond and triangular shapes are formed. In this embodiment, the rear member 30 includes legs 32 (four are shown in FIG. 6) and a base portion 34. The legs 32 may be constructed and arranged to extend from the base portion 34 and attach to the mounting bars 26 of the frame 16. The base portion 34 may have recesses 35 (see FIG. 6) formed on the upper and lower halves of the base portion 34. The legs 32 may have recesses which may hold the mounting bars 26 therein. It is contemplated that the legs 32 may be attached to the mounting bars 26 using other attachment mechanisms, such as adhesive bonding, pins, clamps, screws, fasteners, or other attachment mechanisms known in the art. In this embodiment, the mount structures 18 extend forwardly of the mounting bars 26 to enable the containers 20, 22, or 24 to be mounted to the chassis 17. The mounting bars 26 may be made of metal, plastic, wood, or other materials known in the art. The containers 20, 22, and 24 may be made from plastic, although it is contemplated that other materials known in the art may be used, such as, for example, metal or wood, or a combination thereof.

As shown in FIG. 1, the handle 14 may be a cylindrical rod extending between handle attachment members 36 on each side. The handle attachment members 36 are used to attach the handle 14 to the frame 16 of the chassis 17. In the embodiment shown in FIG. 1, the L-shaped handle attachment members 36 has a main portion 38 and a ledge 40, and the handle 14 is horizontally displaced from the mounting bars 14 at a distance equal to the length of the ledge 40. This placement of the handle 14 relative to the rest of the chassis 17 facilitates access to the handle 14 and facilitates the pushing and pulling of the handle 14. The handle attachment members 36 may be hollow, thus enabling the handle attachment members 36 to receive the mounting bars 26 on one end (near the ledge 40) and the handle 14 on the other end (near the main portion 38). The handle 14 may be made of metal, plastic, wood, or other materials known in the art. In some embodiments, rubber or other anti-slip material may be provided on the surface of the handle 14 to facilitate the grasping of the handle 14. Although the handle 14 shown in FIG. 1 is fixed relative to the chassis 17, it is contemplated that in some embodiments, the handle 14 may be constructed and arranged to be extendable. It is also contemplated that the handle 14 may have other configurations, shapes, and arrangements. For example, in the embodiment shown in FIG. 7, the handle 14 may be pivotally attached to the chassis 17 via pivot pins 41. The handle 14 may be pivoted to a position wherein the handle 14 is generally perpendicular to the mounting bars 26 to facilitate the pulling and pushing of the apparatus 10. Alternatively, the handle 14 may be pivoted to the upright position for storage.

As shown in FIG. 1, the ground engaging wheels 12 may be attached to the chassis 17. In other embodiments, the ground engaging wheels 12 may be attached to the container 20, 22, or 24 mounted towards the bottom of the apparatus 10. In one embodiment, each of the wheels 12 is a molded structure reinforced by a plurality of wheel ribs 42 and each wheel 12 is mounted on an end of an elongated axle 44 by two hubs 45 or other appropriate structure. The axle 44 may be an elongated cylindrical shaft that is snap fit into rotational engagement with a receiving structure of the container 20, 22, or 24 or the chassis 17 in conventional fashion. Alternatively, the axle 44 can be mounted to the apparatus 10 through a pair of axially aligned through-holes (not shown) formed in the container 20, 22, 24 or the chassis 17. The wheels 12 may have rubber treads or other anti-slip material provided on the surface to provide friction with the ground when the apparatus 10 is to be rolled from one location to another.

Figure 2:
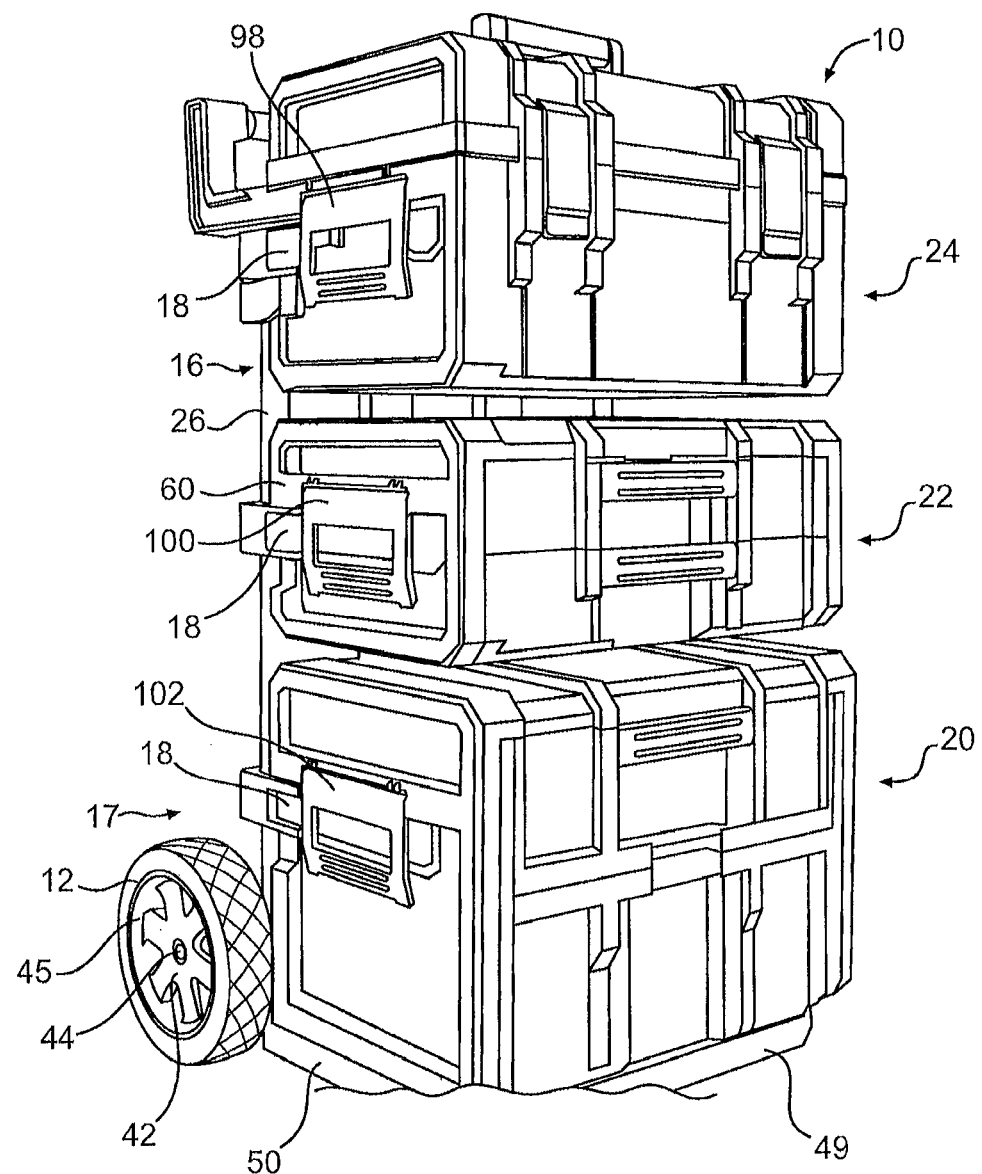
FIG. 2 is a perspective view of the rolling storage assembly with containers mounted thereto in accordance with an embodiment of the present patent application.

FIG. 2 is a perspective view of the apparatus 10 with three containers 20, 22, and 24 mounted to the chassis 17. The containers 20, 22, and 24 may have coupling elements that provide releasable connection with the mount structures 18. In this embodiment, the coupling elements take the form of pairs of side handles 98, 100, or 102 on each side of the containers 20, 22, and 24. The side handles 98, 100, and 102 are constructed and arranged to clamp or otherwise engage or couple or latch or connect onto the mount structures 18 to enable the containers 20, 22, and 24 to be releasably or removably connected to the chassis 17. This embodiment is not intended to be limiting, and it is contemplated that the coupling elements may have a variety of configurations, locations, and arrangements in other embodiments. Just for example, in some embodiments, the coupling elements may be separate from the side handles 98, 100, and 102. Referring back to the embodiment shown in FIG. 2 the toolbox container 24 is mounted to the mount structures 18 via side handles 98. The small container 22 is releasably connected to the structures 18 via side handles 100. The large container 20 is releasably connected to the mount structures 18 via side handles 102. The words "small" and "large" are used here to relatively differentiate among the different containers shown in this embodiment and are not intended to be limiting. Thus, the small container 22 may be equal or larger in size than the large container 20 in some embodiments. The arrangement and location of the containers on the chassis 17 may vary and may be customized according to user preferences. The toolbox container 24, the small container 22, and the large container 20 will be described in detail later. It is contemplated that the number of mount structures 18 may vary, depending on the number of containers that the user would like to place on the chassis 17. It is also contemplated that different combinations of containers may be used. Just for example, there may be four toolbox containers 24 mounted to the chassis 17 or three large containers 20 mounted to the chassis 17. The apparatus 10 and the containers 20, 22, and 24 are generally rectangular in shape. However, any convenient shape may be used. In some embodiments, the containers 20, 22, 24 may be constructed and arranged such that the containers 20, 22, 24 may be placed in a stacked relation directly on top of one another without the use of the chassis 17.

In other embodiments, a structure different from (or in addition to) the handles 98, 100, and 102 may be used to latch the containers onto the mount structures 26. In one embodiment, a clamp separate from the handles 98, 100, and 102 may be used to latch the containers 20, 22, and 24 to the mount structures 18. In one embodiment, the mount structures 18 may include attachment members constructed and arranged to clamp or otherwise engage or couple or latch or connect onto mount structure engaging members on the containers 20, 22, and 24. For example, in one embodiment, the mount structures 18 may include a latching structure in the form of a clamp that engages with a portion of the containers 20, 22, and 24 to latch the containers 20, 22, and 24 to the mount structures 18. In one embodiment, the containers 20, 22, and 24 may include hooks to engage with the mount structures 18. In another embodiment, multiple mount structure engaging members may be provided on each of the containers 20, 22, and 24 at various locations such that the position of the containers 20, 22, 24 on the chassis 17 may be changed by engaging the mount structures 18 with different mount structure engaging members on each of the containers 20, 22, or 24. In yet another embodiment, the mount structures 18 may be integrally formed with the handles 98, 100, and 102 of the containers 20, 22, and 24 such that the position of the containers 20, 22, 24 on the chassis 17 may be changed by adjusting the mount structures 18 on the frame 16. The mount structures 18 may optionally be integrally formed with other parts of the containers 20, 22, and 24.

Figure 3:
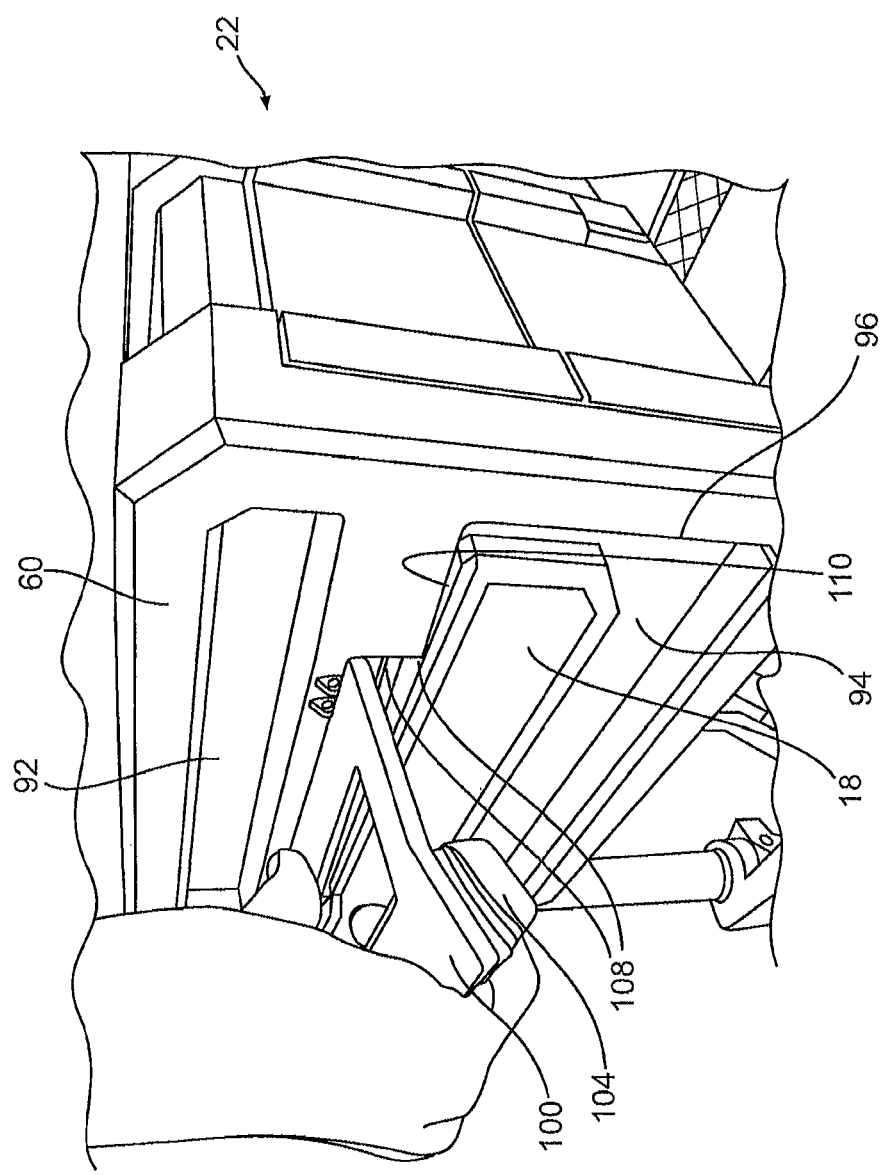
FIG. 3 is a perspective view of a container being mounted to the rolling storage assembly in accordance with an embodiment of the present patent application.
Figure 4:
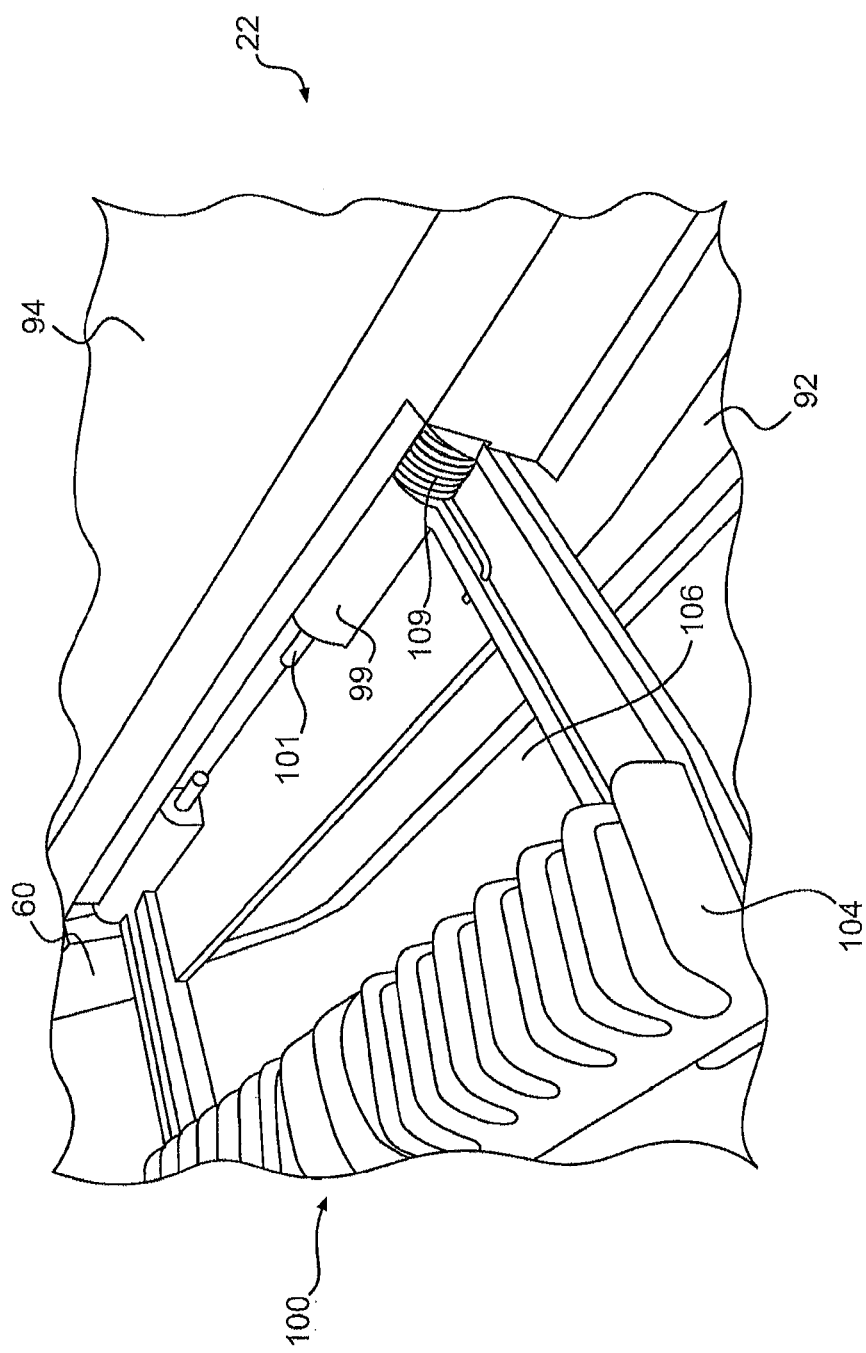
FIG. 4 is a perspective bottom view of a side handle of a container in accordance with an embodiment of the present patent application.

FIG. 3 is a perspective view of the side handle member 100 of the small container 22. The small container 20 may have an upper depression 92 and a lower depression 94 on each of opposing side walls 60. The side handles 100 may be pivotally attached to each of the side walls 60 between the upper depression 92 and the lower depression 94. As shown in FIG. 4, the side handle 100 may be attached to the container portion 52 using hinges 99 and pins 101, although it is contemplated that snap-fit connections, fasteners, and other attachment mechanisms may be used. The side handle 100 may include springs 109 (one is shown in FIG. 4) that biases the side handle 100 in the retaining position such that the side handle 100 is generally parallel with the side wall 60, as shown in FIG. 2. The side handle 100 may be pivoted in a counterclockwise direction to a release position wherein the container 22 may be connected to or removed from the mount structures 18, as shown in FIG. 3. In the release position, the side handle 100 may be generally perpendicular to the side wall 60. The side handle 100 may include a gripping portion 104 on an end opposite the end connected to the side wall 60. The gripping portion 104 may be constructed and arranged such that the gripping portion 104 contacts the surface of the lower depression 94 when the side handle 100 is in the retaining position. In this embodiment, the gripping portion 104 is made of rubber material with grooves formed therein to facilitate the grasping of the side handle 100. It is contemplated that the side handle 100 may be made of other materials, or may have other shapes or arrangements provided on the surface thereof. A recess 106 may be formed in the side handle 100 to facilitate grasping of the side handle 100. As shown in FIG. 3, the lower depression 94 may create a ledge 96 that surrounds the depression 94. The ledge 96 may include a cutout 103 (see FIG. 11a) formed near the rear wall 60 of the container portion 52. The cutout 103 may be sized and arranged so that the mount structures 18 may slide through the cutout 103 to be received in the depression 94 when the container 22 is mounted to the chassis 17.

As shown in FIG. 3, when the container 22 is to be mounted to or removed from the chassis 17, the user may lift the container 22 by grasping the side handle members 100 of the container 22 so that the side handle members 100 are in the release position. The container 22 is then positioned such that the mount structures 18 may slide through the cutouts 103 to be received in the lower depressions 94. In this embodiment, when the container 22 is mounted to the chassis 17, the container 22 is supported by the mount structures 18, and an upper surface 108 of each mount structure 18 is disposed against an upper portion 110 of the ledge 96 of the container 22. The side handles 100 may then be released, whereby the spring 109 snaps the side handles 100 pivotally to the retaining position. The mount structures 18 may then be retained between the upper portion 110 of the ledge 96 and the gripping portion 104 of the side handles 100. The other containers, such as the toolbox container 24 and the large container 20, may be mounted to the chassis 17 in a similar manner. The side handles 98 of the toolbox container 24 and the side handles 102 of the large container 20 may be constructed and arranged in a similar manner as side handles 100.

Figure 5:
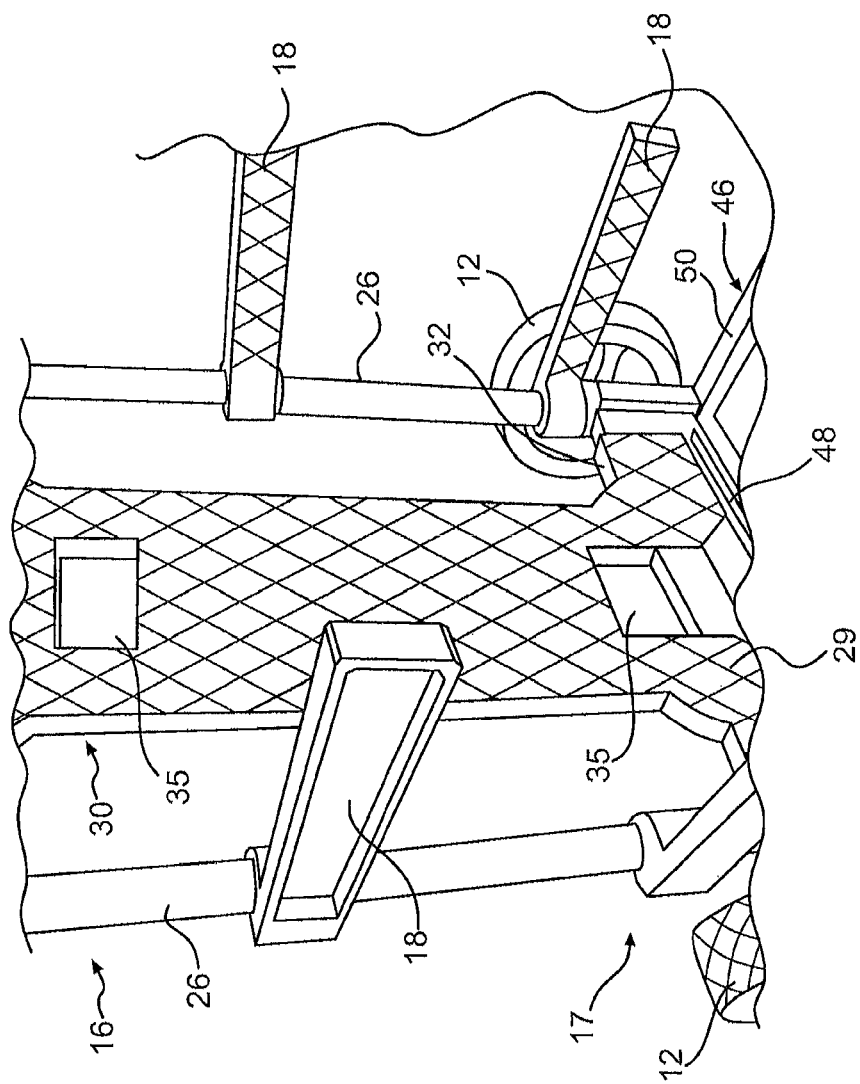
FIG. 5 is a perspective view of a chassis of the rolling container assembly in accordance with an embodiment of the present patent application.
Figure 6:
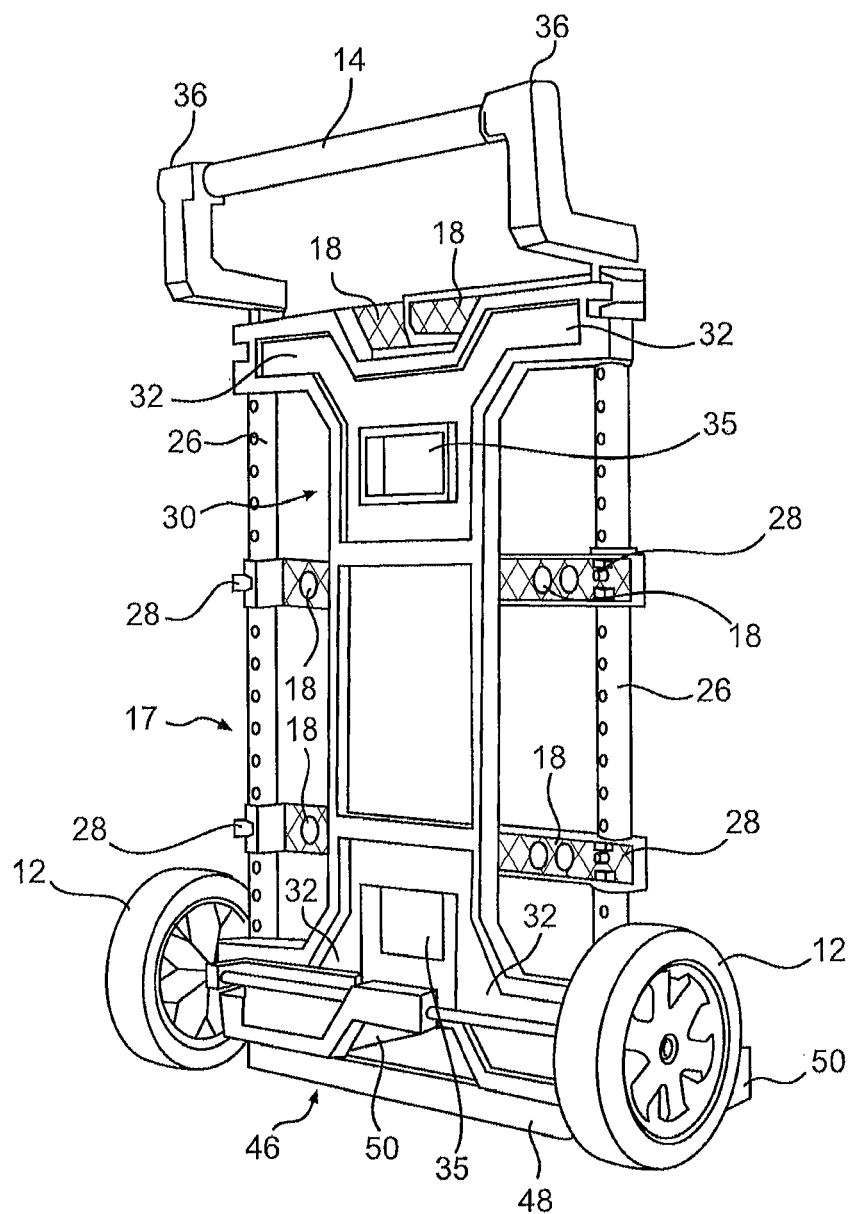
FIG. 6 is a perspective view of the chassis of the rolling container assembly with mount structures folded in the storage position in accordance with an embodiment of the present patent application.
Figure 7:
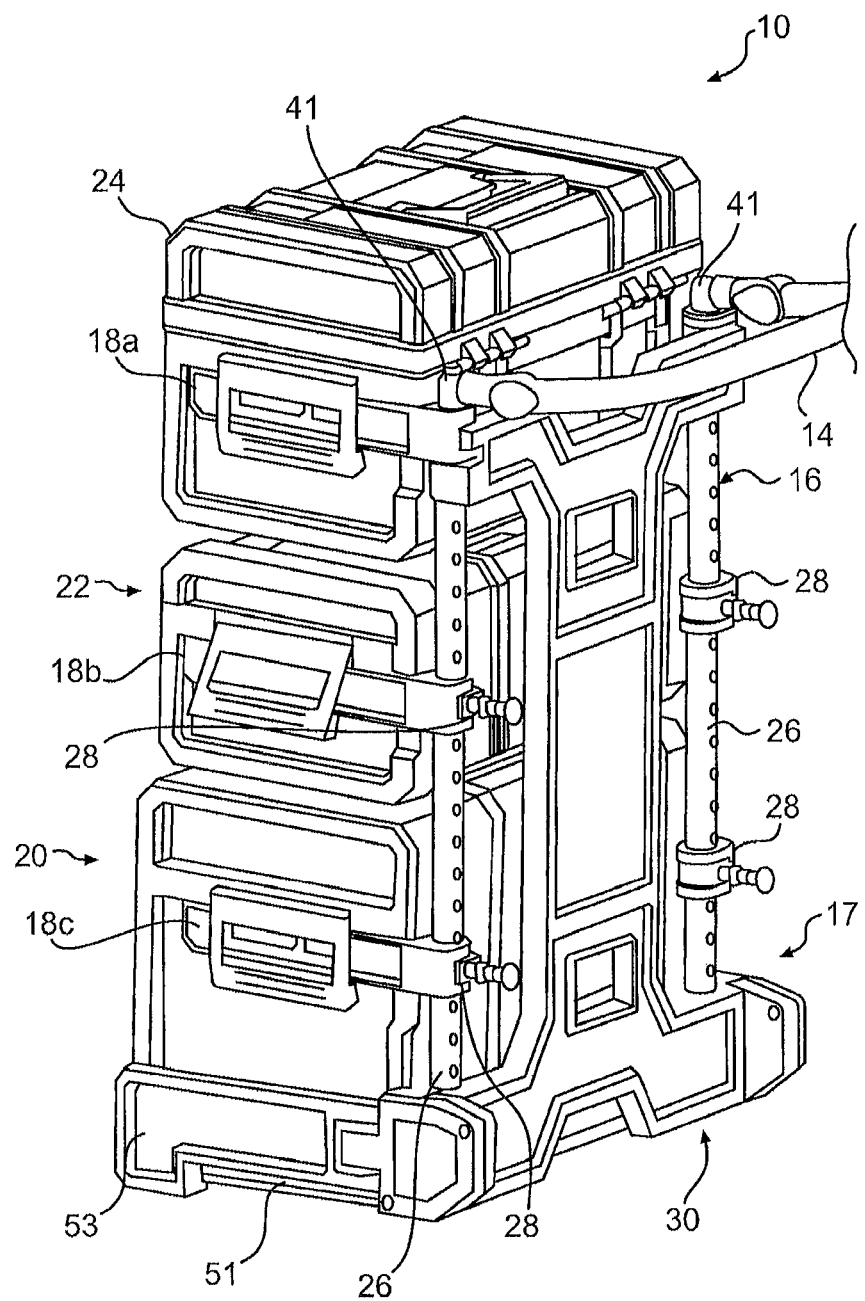
FIG. 7 is a perspective rear view of the rolling storage assembly with containers mounted thereto in accordance with an embodiment of the present patent application.

As shown in FIGS. 5 and 6, the chassis 17 may also include a chassis support structure or frame 46 providing a generally downwardly facing fixed ground engaging surface, the ground engaging surface being located forwardly of said one or more rotatable ground engaging wheels 12 and being constructed and arranged to engage the ground. The chassis support structure 46 may comprise a middle portion 48 that extends from one mount structure, in this embodiment taking the form of the mounting bar 26, to another mount structure; two side portions 50 (one is shown in FIG. 5) that extend generally perpendicularly from the middle portion 48; and a front portion 49 (see FIG. 2) constructed and arranged to attach to the two side portions 50 and extend generally parallel to the middle portion 48. In some embodiments, the supporting frame 46 may have feet (not shown) attached to the bottom of the support structure 46 and constructed and arranged to engage the ground. The feet may be made of rubber or other anti-slip material to provide friction when engaged with the ground. The chassis support structure 46 may generally be made of plastic, although it is contemplated that other materials known in the art may be used. It is contemplated that in one embodiment, the chassis support structure 46 may be a frame including a platform 51 (as shown in FIG. 7). The platform 51 may be used to carry a container 20, 22, 24 thereon.

As shown in FIG. 5, the mount structures 18 may be in an extended position wherein the mount structures 18 extend generally perpendicularly from a plane defined by the mounting bars 26 and the rear member 30. When the mount structures 18 are in the extended position, containers 20, 22, and 24 may be releasably connected to the mount structures 18. Alternatively, the mount structures 18 may be folded towards the support structure 26 to a folded position for storage and portability, as shown in FIG. 6. The attachment structures 28 for the mount structures 18 may be constructed and arranged to allow the mount structures 18 to be rotated to the folded position.

FIG. 7 is a rear perspective view of the apparatus 10. In this embodiment, the apparatus 10 includes the attachment structures 28 for adjustably connecting the two pairs of mount structures 18b, and 18c to the frame. In this embodiment, the pair of mount structures 18a are not releasably connected to the mounting bars 26 via the attachment structures 28, although the mount structures 18a may be rotated around the mounting bars 26 for storage. In other embodiments, the mount structures 18*a* may be releasably connected to the mounting bars 26 using the attachment structures 28. Although wheels 12 are not shown in FIG. 7, it is contemplated that the wheels 12 may be attached to the bottom portion of the chassis 17, as shown in FIGS. 1 and 2. In one embodiment, there may be side support structures 53 extending perpendicularly from the rear member 30. The side support structures 53 may be constructed and arranged to support the container 20, 22, or 24 that is disposed on the platform 51.

FIG. 8 is a detailed view of the mount structure 18 and attachment structure 28 in accordance with the embodiment shown in FIG. 7. In this embodiment, the mount structure 18 has strengthening ribs 112 deployed crosswise relative to one another across the inner surface to provide extra support for the mount structures 18 when the containers 20, 22, and 24 are releasably connected to the mount structures 18. The attachment portion 114 of the mount structure 18 may include a rotatable connection that enables the mount structure 18 to be rotated between the folded position and the extended position. In this embodiment, the rotatable connection takes the form of a groove 116 profile formed in the attachment portion 114 and an insertion ring 118. The groove 116 is constructed and arranged to receive the insertion ring 118 such that the groove 116 and the insertion ring 118 may be rotatably connected to one another. The insertion ring 118 may be constructed and arranged to remain stationary while the mount structure 18 is rotated between the extended and folded positions. In this embodiment, a recess 122 is formed in the insertion ring 116 and attachment portion 114 of the mount structure 18, and the recess 122 is constructed and arranged to receive the mounting bar 26.

As shown in FIG. 8, the attachment structure 28 includes a pull member 112 that is constructed and arranged to release the attachment structure 28 from the mounting bar 26. The pull member 112 may be connected to an engaging member 124, in this embodiment taking the form of a finger 124, that is constructed and arranged to extend into the recess 122 when the pull member 112 is in a locked position (as shown in FIG. 9*a*) wherein the position of the mount structure 28 on the mounting bar 26 may not be adjusted. The pull member may be pulled to an unlocked position (as shown in FIG. 9*b*) wherein the position of the mount structure 28 on the mounting bar 26 may be adjusted. The attachment structure 28 may include a tension spring (not shown) that biases the pull member 112 in the locked position. Bolt nuts 126 may be used to attach the pull member 112 to the finger 124.

FIGS. 9*a* and 9*b* show the operation of the attachment structure 28 in accordance with the embodiment shown in FIGS. 7 and 8. Openings 128 may be provided along the length of the mounting bars 26 for the placement of the attachment structures 28. The openings 128 may be constructed and arranged to receive the finger 124 when the attachment structure 28 is in the locked position, as shown in FIG. 9*a*. To move the attachment structure 28 to the unlocked position so that the finger 124 is no longer in the opening 128, the user may simply pull the pull member 112 in a direction away from the mounting bar 26, as shown in FIG. 9*b*. When the finger 124 is outside of the opening 128, as shown in FIG. 9*b*, the attachment structure 28 may be removed from the mounting bar 26 or adjusted to another position on the mounting bar 26. In this embodiment, the pulling of the pull member 112 away from the mounting bar 26 compresses the tension spring within the attachment structure 28. The tension spring is constructed and arranged to snap the finger 124 through the opening 128 when the finger 124 is aligned with the opening 128 and the pull member 112 is released. Thus, to lock the mount structure 18 to a position on the mounting bar 26, the user may simply align the finger 124 with an opening 128 and then release the pull member 112 so that the finger 124 may snap into the opening 128. The attachment structure 28 may have any construction or configuration, and the illustrated embodiment is not intended to be limiting.

In one embodiment, the containers 20, 22, and 24 may be constructed such that there is a common denominator among the vertical dimensions of the containers 20, 22, and 24. In other words, the containers 20, 22, 24 may be constructed with vertical dimensions having a common denominator. In one embodiment, the common denominator may be dependent on the spacing between the openings 128 on the mounting bar 26. For example, the spacing between each openings 128 may be a selected distance (X), and each of the containers 20, 22, 24 may have a vertical dimension a certain number (A, B, C) of times more than X, where A, B, C may represent different values. Thus, container 20 may have a vertical dimension of AX, container 22 may have a vertical dimension of BX, and container 24 may have a vertical dimension of CX. Just for example, in one embodiment, the mounting bar 26 has thirty-two openings 128 that are spaced at a distance of 25 mm (where X=25 mm) apart from one another. In this embodiment, the container 20 has a vertical distance of 150 mm (where A=6), the container 22 has a vertical dimension of 175 mm (where B=7), and the container 24 has a vertical dimension of 200 mm (where C=8). This example is not intended to be limiting and it is contemplated that the values of X, A, B, and C may vary in other embodiments. The configuration of the containers 20, 22, and 24 having a common denominator described above enables optimal arrangement of the containers 20, 22, 24 on the chassis. In other words, this configuration enables the user to arrange the containers 20, 22, 24 on the chassis 17*a* efficiently and with optimal use of space on the mounting bars 26.

Figure 10A:
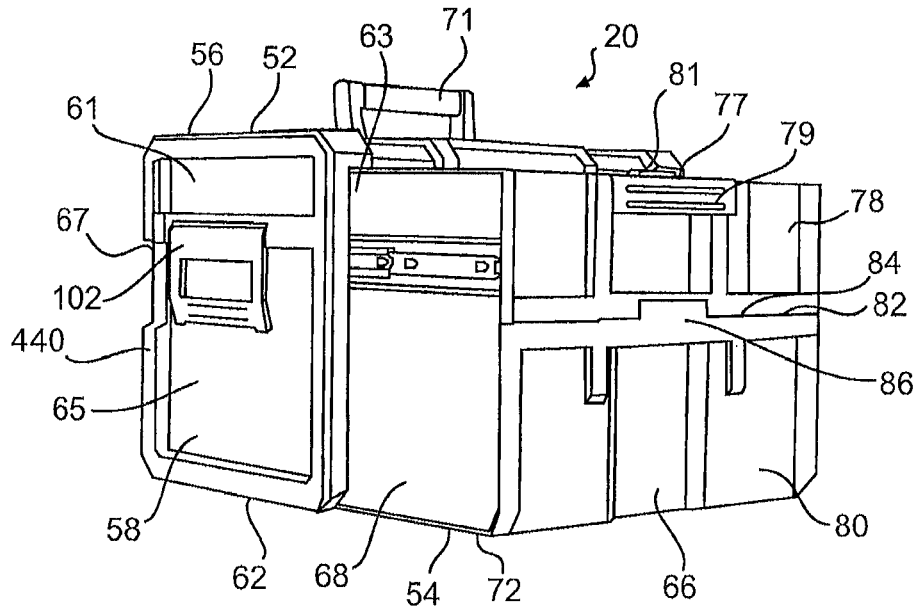
FIGS. 10a-10b are perspective views of a large container of the rolling storage assembly in accordance with an embodiment of the present patent application.

As shown in FIG. 10*a*, the large container 20 comprises a container portion 52 and a drawer portion 54 that is constructed and arranged so that it may be received within the container portion 52. In this embodiment, the container portion 52 has a top wall or side 56, two opposing side walls or sides 58, a rear wall or side 440, and a bottom wall or side 62 defining an interior space 63. The drawer portion 54 may be held inside the interior space 63. The container portion 52 has a forward facing front opening 64 into the interior space 63 that allows access to the drawer portion 54. The top wall 56 of the container portion 52 may have strengthening ribs (not shown) deployed across the inner surface of the top wall 56 facing the interior space 63. The strengthening ribs help support the top wall 56 so that the top wall 56 may provide a top working surface for placing and sorting tools or objects. A container handle 71 may be attached to the top wall 56 to facilitate the lifting of the container 26. The handle 71 may be pivotally attached to the top wall 56 of the container portion 52 using pivot pins (not shown), although it is contemplated that other attachment mechanisms, such as rivets, fasteners, and other attachment mechanisms known in the art may be used. The container handle 71 may be disposed within a recess 69 (see FIG. 10*b*) formed in the top wall 56 when the handle 71 is not in use and may be pivoted to an upright position when the handle 71 is in use. Grooves may be formed on the surface of the container handle 71 or rubber material or other anti-slip material may be provided on at least a portion of the container handle 71 to facilitate the grasping of the handle 71. It is contemplated that in some embodiments, the container handle 71 may be fixed such that the container handle 71 may not be movable from one position to another. The container portion 52 may generally be made of suitably molded plastic. It is contemplated that other materials may be used, such as, for example, wood, metal, or other materials known in the art.

Each of the two opposing side walls 140 of the container portion 52 may include an upper depression 61 and a lower depression 65. A cutout 67 may be formed in each of the lower depressions 65. As described previously with respect to the small container 22, the cutouts 67 and the side handles 100 of the large container 20 may be used to releasably connect the large container 20 to the mount structures 18 in a similar manner. The side handles 102 of the large container 20 may be constructed and arranged in a similar manner as the side handles 100 of the small container 22 to enable the large container 20 to be releasably connected to the mount structures 18.

Figure 10B:
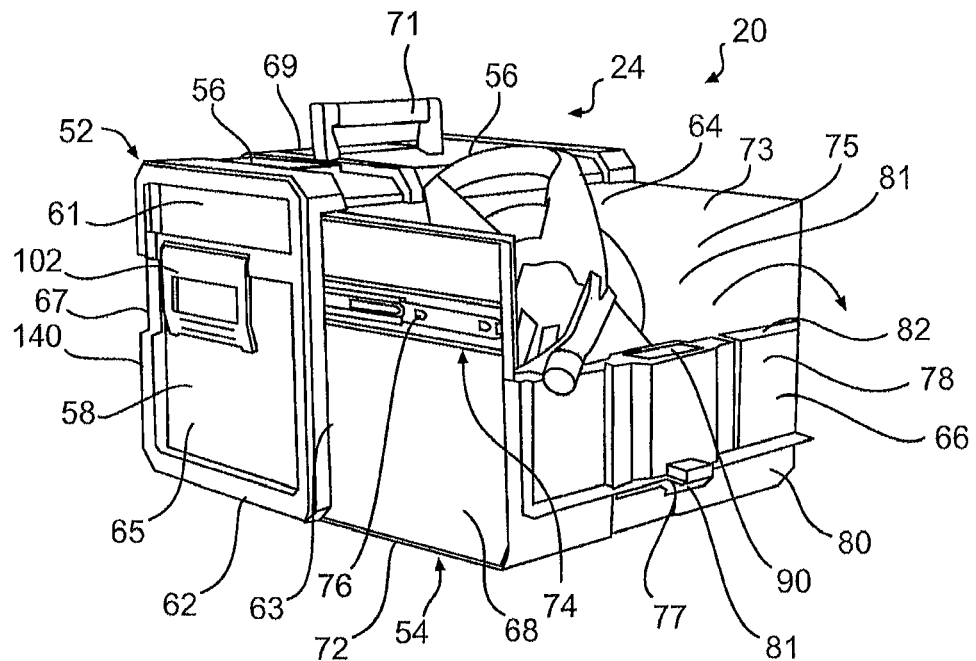

In the embodiment shown in FIG. 10a, the drawer portion 54 has a front wall or side 66, two opposing side walls 68, a rear wall (not shown), and a bottom wall or side 72 defining an upwardly facing opening 73 (see FIG. 10b) into an interior space 75 (see FIG. 10b). The drawer portion 54 may slide into and out of the container portion 52 between an open position wherein the contents of the drawer portion 54 may be accessed through the upwardly facing opening 73 and a closed position wherein the contents of the drawer may not be accessed through the upwardly facing opening 73. The drawer portion 54 may be locked to the container portion 52 using latches 77 when the drawer portion 54 is in the closed position. Details of the latches 77 will be described later.

At least portions of the large container 20, such as for example, the side handles 102 and latch 77, may be made of both metal and plastic. As shown in FIG. 10b, the drawer portion 54 may slide into and out of the container portion 52 through the front opening 64 of the container portion 52. The large container 20 may have ball bearing slides 74 that enable the drawer portion 54 to be slideable relative to the container portion 52 so that the drawer portion 54 can slide between the closed position and the open position. When the drawer portion 54 is in the closed position, the opening 73 is disposed below the top wall 56 of the container portion 52. Each opposing side walls 68 of the drawer portion 54 has sliding members 76 of the ball bearing slides 74 located thereon. Their associated sliding members (not shown) are located on inner surfaces of the opposing side walls 58 of the container portion 52. The ball bearing slides 74 may have stop members (not shown) that limit the distance the drawer portion 54 may be pulled from the container portion 52, thus preventing the sliding members 76 from being dislocated from the sliding members attached to the container portion 52. It is contemplated that in other embodiments, other sliding mechanisms may be used instead of the ball bearing slides, such as guides or slide rails. The ball bearing slides may be attached to the drawer portion 54 and the container portion 52 using pins, screws, adhesive bonding, or other attachment mechanisms known in the art.

In the embodiment shown in FIG. 10a, the front wall 66 comprises an upper section 78 and a lower section 80, the upper section 78 being pivotally connected to the lower section 80 using hinges 82. It is contemplated that other forms of connections may be used, such as pins, fasteners, or other connection mechanisms known in the art. The upper section 78 and the lower section 80 may be approximately the same size, although it is contemplated that the sizes of the upper section 78 and the lower section 80 may vary. In this embodiment, the lower section 80 remains fixed to the opposing side walls 68 and the bottom wall 72 of the drawer portion 54, while the upper section 78 is pivotally connected to the drawer portion 54 by the hinges 82. The upper section 78 may be pivoted in a downward direction and towards the lower section 80 so that the upper section 78 may be "folded down", as shown in FIG. 10b. As such, a side facing opening 81 (see FIG. 10b) in the drawer portion 54 is exposed and the contents of the drawer portion 54 may be accessed through the side facing opening 81 even when the drawer portion 54 is in the closed position relative to the container portion 52.

The hinges 82 may be located in a connection region 84 defined by a portion of the upper section 78 and a portion of the lower section 80. In this embodiment, a depression 86 (see FIG. 10a) is formed in the proximate area where the upper section 78 and the lower section 80 are connected to each other. As shown in FIG. 10b, when the lower section is "folded down", the depression 86 formed in the upper section 78 of the front wall 66 and in the lower section 80 of the front wall 66 define a recess 90 that provides a handgrip such that the user can insert fingers into the recess 90 and use the handgrip to pull the drawer portion 54 away from the container portion 52 to move the drawer portion 54 to the open position. The user may pull the drawer portion 54 away from the container portion 52 by placing fingers into the recess 90 and by pulling against the upper section 78 (see FIG. 10b) near the recess 90 to slide the drawer portion 54 to the open position. Alternatively, the user may pull the drawer portion 54 to the open position by pulling against the lower section 80 without having to place fingers into the recess 90. Dividers and/or inserts (not shown) may optionally be placed into the drawer portion 54 to customize and divide the interior space 75 of the drawer portion 54.

The top portion 78 of the drawer portion 54 may include a latch handle 79. As shown in FIG. 10a, the latch 77 used to latch the drawer portion 54 to the container portion 52 may include a latch protrusion 81 disposed on top of the latch handle 79. The latch protrusion 81 may be constructed and arranged to engage a latch engaging portion (not shown) disposed on the container portion 52 when the drawer portion 54 is locked to the container portion 52. The latch engaging portion may also be a protrusion or may be an aperture in which the protrusion 81 is received. The latch engaging portion may engage a portion of the protrusion 81 so that the drawer portion 54 is prevented from being pulled out of the container portion 52.

When the drawer portion 54 is being unlatched, the latch handle 79 is pulled so as to be pivoted in an upwards direction against the bias of an internal spring (not shown). The handle 79 may be attached via various mechanisms, such as, for example, screws, pins, bolts, fasteners, or any other mechanism or hinges as appreciated by one skilled in the art. In one embodiment, when the latch handle 79 is pulled upwards against the spring bias, the latch handle 79 pivots and the latch protrusion 81 of the handle 79 is disengaged from the latch engaging portion. The drawer portion 54 is thus able to be slid to the open position, as shown in FIG. 10a. To once again close and lock drawer portion 54, drawer portion 54 is simply manually slid back towards the closed position. During this movement, the latch engaging portion may engage a cam surface on the protrusion 81. The latch engaging portion may engage and move the cam surface on the latch protrusion 81 against the bias of the internal handle spring so as to move the handle 79 in a pivotal direction (clockwise in FIGS. 10a) until the protrusion 81 engages with the latch engaging portion, whereupon the handle 62 springs back to the locked configuration with the latch protrusion 81 engaged to the latch engaging portion.

Figure 11A:
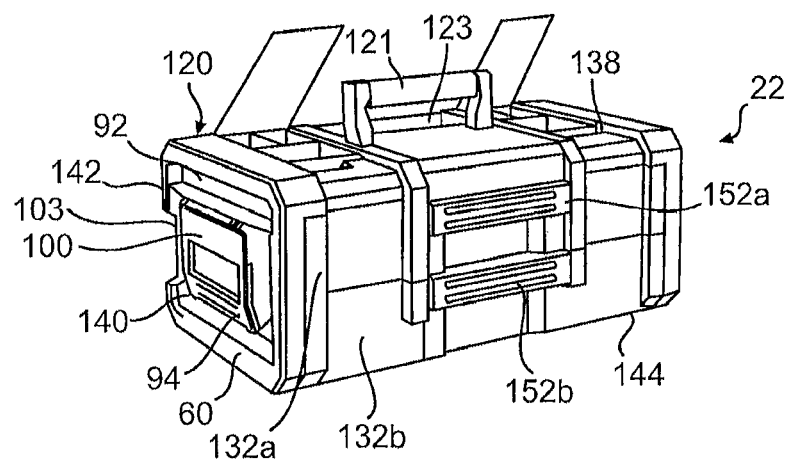
FIGS. 11a-11b are perspective views of a small container of the rolling storage assembly in accordance with an embodiment of the present patent application.
Figure 11B:
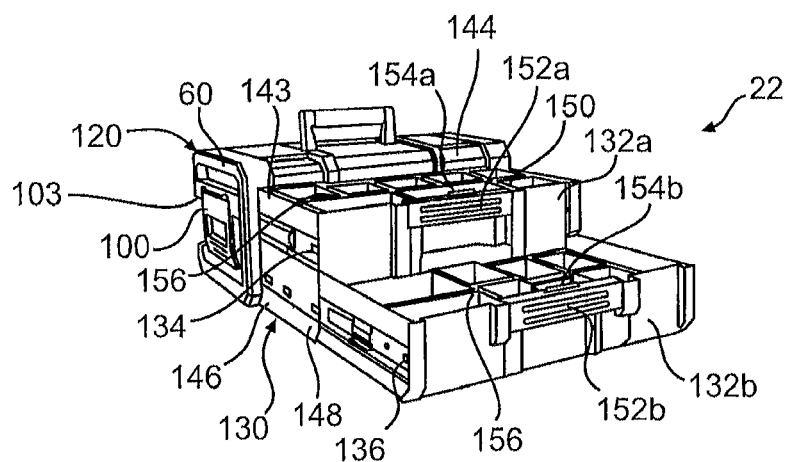

FIG. 11a shows an embodiment of the small container 22 of the present patent application. The small container 22 may comprise a container portion 120, a drawer housing portion 130 (see FIG. 11b), and drawers 132a, 132b (two are shown in this embodiment). The container portion may include a top wall or side 138, two opposing side walls 60, a rear wall or side 142, and a bottom wall or side 144 defining an interior space 143 (see FIG. 11b). As shown in FIG. 11b, the drawer housing portion 130 may slide in and out of the interior space 143 through a front opening 144 to the interior space 143. The drawer housing portion may include two opposing side walls 146, a rear wall (not shown), and a bottom wall 148 defining an interior space 150. It is contemplated that in other embodiments, the number and arrangement of the drawers may vary. For example, in one embodiment, there may be three drawers arranged in a stacked relation. In another embodiment, there may be three drawers arranged in a horizontal row.

A container handle 121 may be attached to the top wall 138 to facilitate the lifting of the container 26. The handle 121 may be pivotally attached to the top wall 138 of the container portion 120 using pivot pins (not shown), although it is contemplated that other attachment mechanisms, such as rivets, fasteners, and other attachment mechanisms known in the art may be used. The container handle 121 may be disposed within a recess 123 formed in the top wall 138 when the handle 121 is not in use and may be pivoted to an upright position when the handle 121 is in use. Grooves may be formed on the surface of the container handle 121 or rubber material or other anti-slip material may be provided on at least a portion of the container handle 121 to facilitate the grasping of the handle 121.

The top wall 138 of the container portion 120 may have strengthening ribs (not shown) deployed across the inner surface of the top wall 138 facing the interior space 143. The strengthening ribs help support the top wall 120 so that the top wall 138 may provide a top working surface for placing and sorting tools or objects. As previously described, the cutouts 103 and the side handles 100 may be used to mount the small container 22 to the mount structures 18.

As shown in FIG. 11b, ball bearing slides 134 may be disposed on the drawer housing portion 130 and the inner surface of the container portion 120 to enable the drawer housing portion 130 to slide in and out of the container portion 120. Ball bearing slides 136 may also be disposed on the lower drawers 132b to enable the drawers to slide in and out of the drawer housing portion 130. The ball bearing slides 134, 136 may have stop members (not shown) that limit the distance the drawer housing portion 130 and the lower drawer 132b may be pulled from the container portion 52 and the drawer housing portion 130, respectively. It is contemplated that in other embodiments, other sliding mechanisms may be used instead of the ball bearing slides, such as guides or slide rails. The ball bearing slides 134, 136 may be attached to the drawer housing portion 130 and the lower drawer 132b using pins, screws, adhesive bonding, or other attachment mechanisms known in the art.

The upper drawer 132a may disposed within the drawer housing portion 130 such that the contents of the upper drawer 132a may be accessed when the drawer housing portion 130 is pulled out of the container portion 120 via the ball bearing slides 134, as shown in FIG. 11b. In this embodiment, to access the contents of the lower drawer 132b, the lower drawer 132 must be pulled out of the drawer housing portion 130 via the ball bearing slides 136, as shown in FIG. 11b. However, the lower drawer 132b may optionally be pulled to the open position wherein the contents of the lower drawer 132b may be accessed even when the drawer housing portion 130 is not pulled out of the container portion 120. None, one, or both of the drawers 132a, 132b may optionally be in the open position at the same time.

Each of the drawers 132a, 132b may include a latch handle 152a, 152b. The latch handles 152a, 152b may include latch protrusions 154a, 154b that may be used to latch the drawer housing portion 130 to the container portion 120 and the lower drawer 152b to the drawer housing portion 130, respectively. The drawers 132a, 132b may be latched to latch engaging portions (not shown) in the same manner as described previously with respect to the drawer portion 54 of the large container 20. Inserts 156 may optionally be placed into the drawers 132a, 132b, and the inserts 156 may optionally be divided into various compartments.

Figure 12A:
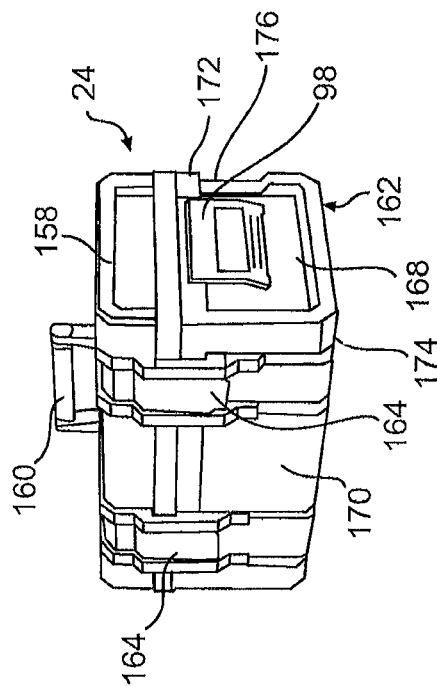
FIGS. 12a-12b are perspective views of a toolbox container of the rolling storage assembly in accordance with an embodiment of the present patent application.

As shown in FIG. 12a, the toolbox container 24 may have a lid 158 and a handle 160 located on the lid 158. The handle 160 may be pivotally attached to the lid 158 using pivot pins (not shown), although it is contemplated that other attachment mechanisms, such as rivets, fasteners, and other attachment mechanisms known in the art may be used. The container handle 160 may be disposed within a recess (not shown) formed in the lid 158 when the handle 160 is not in use and may be pivoted to an upright position when the handle 160 is in use. Grooves may be formed on the surface of the container handle 160 or rubber material or other anti-slip material may be provided on at least a portion of the container handle 160 to facilitate the grasping of the handle 160. It is contemplated that in some embodiments, the container handle 160 may be fixed such that the container handle 160 may not be movable from one position to another.

As shown in FIG. 12a, the lid 158 may be pivotally connected to a container portion 162. The lid 158 can be latched onto the container portion 162 of the toolbox container 24 via latches 164. The container latches 164 may vary in numbers (there may be one or more) and may be pivotable latches, buckles, or any other latching mechanism as would be appreciated by one skilled in the art. The lid 158 may be pivotally connected to the container portion 162 using hinges, pins, screws, fastenings, bolts, or any other connection mechanism as would be appreciated by one skilled in the art. The lid 158 may also be a slide-on lid which is slid on to container portion 162 or a snap-on lid that is snapped on to the container portion 162. It is contemplated that the methods of mounting the lid 158 on to the container portion 162 may vary and the number of lids 158 may vary. For example, there may be two lids 158 pivotally connected to the container portion 162 wherein each lid 158 may be opened or closed independently of the other. The container portion may include two opposing side walls or sides 168, a front wall or side 170, a rear wall or side 172, and a bottom wall or side 174 defining an interior space 175 (see FIG. 12b). A cutout 176 may be formed in each opposing side wall 168. The cutouts 176 and the side handles 98 may be used to releasably connect the toolbox container 24 to the mount structures 18 in the same manner described previously with respect to the small container 22. The side handles 98 of the toolbox container 24 may be constructed and arranged in a similar manner as the side handles 100 of the small container 22 to enable the toolbox container 24 to be releasably connected to the mount structures 18.

The latches 164 (or a single latch) of the toolbox container 24 may comprise latch members 166 that are constructed and arranged to engage with latch receiving portions (not shown) located on the lid 158. The latch members 166 may be pulled to disengage from latch engaging portions of the lid 158 so that the lid 158 may be opened to allow access to the contents of the toolbox container 24. In the embodiment shown in FIG. 12*b*, the latch members 166 may be pulled upwards in the counterclockwise direction to engage the latch members 166 with the latch receiving portions.

Figure 12B:
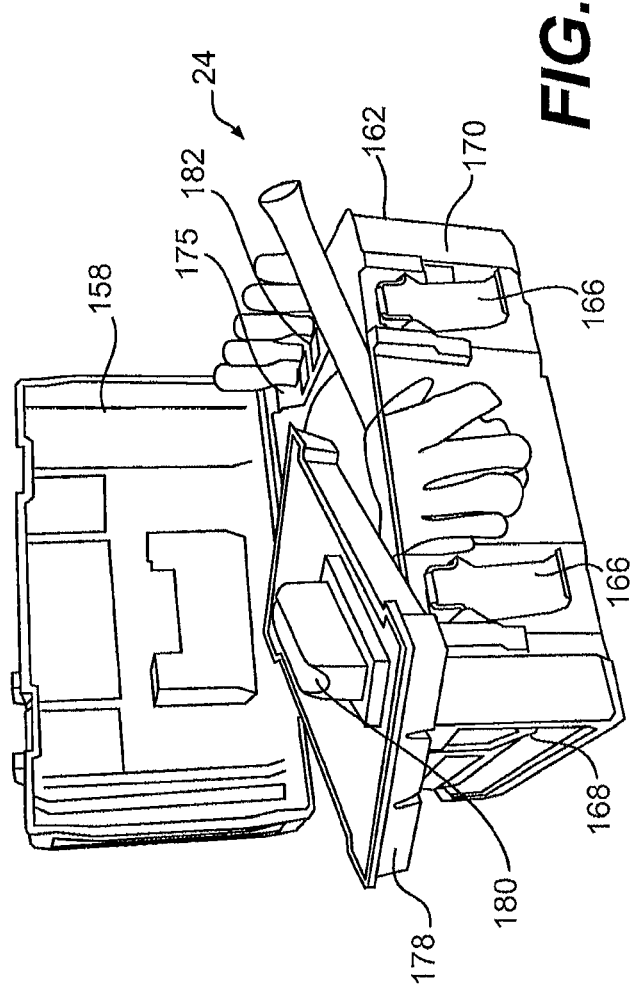

As shown in FIG. 12*b*, a removable tray 178 having a handle 180 may be carried within the toolbox container 24. The removable tray 178 may be held within the interior space 175 of the toolbox container 24 and may optionally be removed therefrom to be carried separately. A removable container 182 with partitions may also be held in the toolbox container 24. The removable container 182 with partitions may be constructed and arranged to hold various kinds of screwdrivers and other tools. In one embodiment, the width of the removable tray 178 may be two-thirds the width of the toolbox container 24. The removable tray 178 and the removable container 182 may be made of plastic, wood, metal, or other materials known in the art, or combinations thereof.

FIG. 13 shows another embodiment of the apparatus 10*a* for transporting articles between working locations. The apparatus 10*a* of FIG. 13 has similar components as apparatus 10 shown in and described with respect to FIG. 1, and the similar components of apparatus 10*a* will be labeled similarly as those of apparatus 10, but with an "a" appended thereto.

As shown in FIG. 13, the apparatus 10*a* includes the chassis 17*a* and the one or more rotatable ground engaging wheels 12*a* mounted toward the bottom of the apparatus 10*a* for rotation about an axis to provide rolling support for the apparatus 10. The wheels 12*a* may be molded structure reinforced by a plurality of wheel ribs 42*a* and each wheel 12*a* is mounted on an end of the elongated axle 44*a* of the chassis 17*a* by two hubs 45*a* or other appropriate structure. The chassis 17*a* also includes the manually engageable handle 14*a* that, when used with the ground engaging wheels 14, enable the user to manually pull the pulling handle 14*a* generally rearwardly so as to tilt the apparatus 10*a* rearwardly to a tilted rolling movement position. The handle 14*a* may be considered to be part of the chassis 17*a* or may be a separate component from the chassis 17*a*. The chassis 17*a* comprises the frame 16*a* and the at least one or more mount structures 18*a* adjustably connected to the frame 16*a*. The frame 16*a* also includes the vertically extending mounting bars 26 that are configured and arranged to attach the mount structures 18*a* to the frame 16*a* using the attachment structures 28*a*.

The handle 14*a* of the embodiment of the apparatus 10*a* shown in FIG. 13 is connected to the rest of the chassis 17*a* via an extending portion 198 that extends from a connecting portion 200, which may be connected to at least a portion of the mounting bar 26*a* of the chassis 17*a*. The handle 14*a*, the extending portion 198, and the connecting portion 200 may form a handle structure 201 of the apparatus 10*a*. The handle structure 201 may also include a rear portion 208 (see FIG. 14). Any combination of the extending portion 198, the connecting portion 200, and the handle 14*a* may be integrally formed. It should be appreciated, however, that any combination of the extending portion 198, connecting portion 200, and the handle 14*a* may be separate pieces.

Figure 28A:
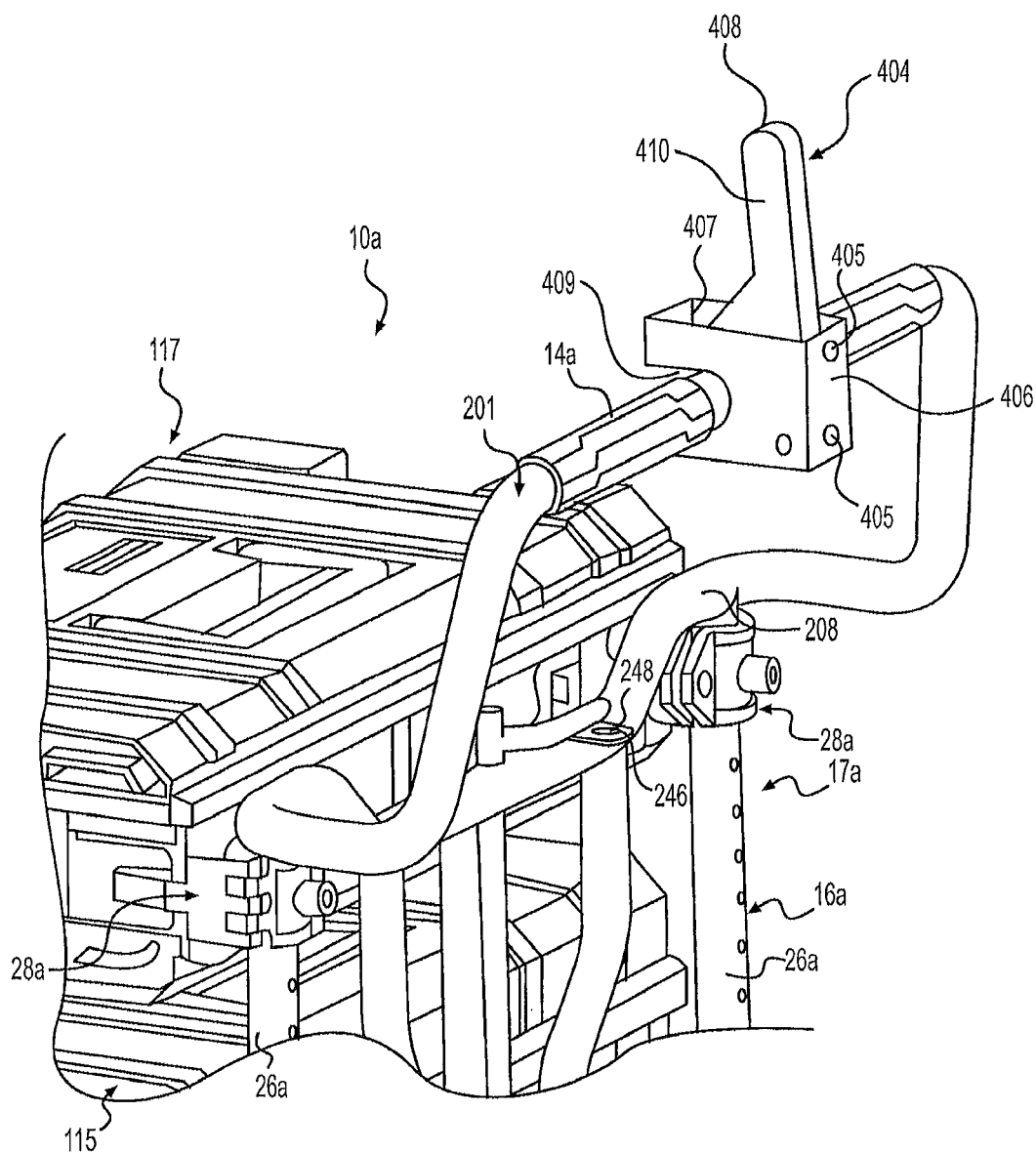
FIGS. 28A-28C are detailed views of a docking assembly in accordance with an embodiment of the present patent application.

The chassis 17*a* may optionally be provided with a docking assembly 404 (see FIG. 28*a*). The docking assembly 404 may be used to receive at least a portion of the handle 14*a* of the apparatus 10*a*. The base structure 406 of the docking assembly 404 may be attached to a surface, such as, just for example, a wall of a vehicle. The docking assembly 404 may be attached to the surface using bolts, screws, pins, clamps, or other attachment mechanisms. In one embodiment, the bolts or other attachments may be received in openings 405 provided on the base structure 406 to attach the docking assembly 404 to the vehicle or other surfaces. The docking assembly 404 may thus facilitate the transport or storage of the apparatus 10*a*.

Figure 28C:
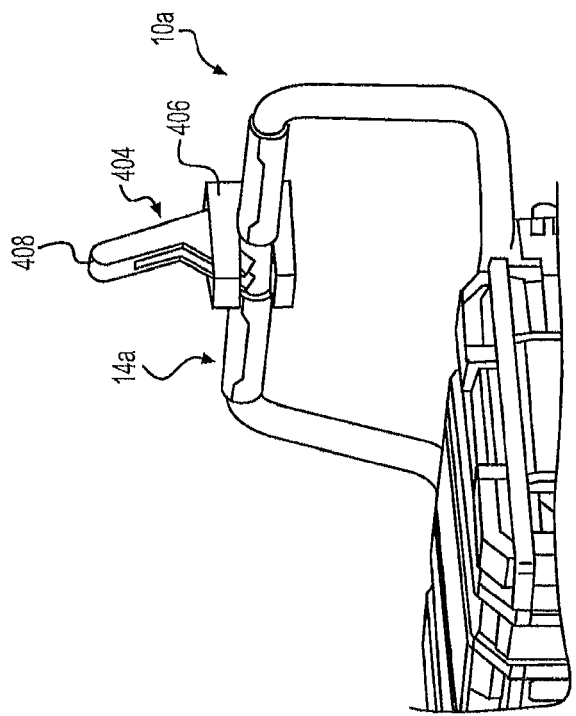
Figure 28B:
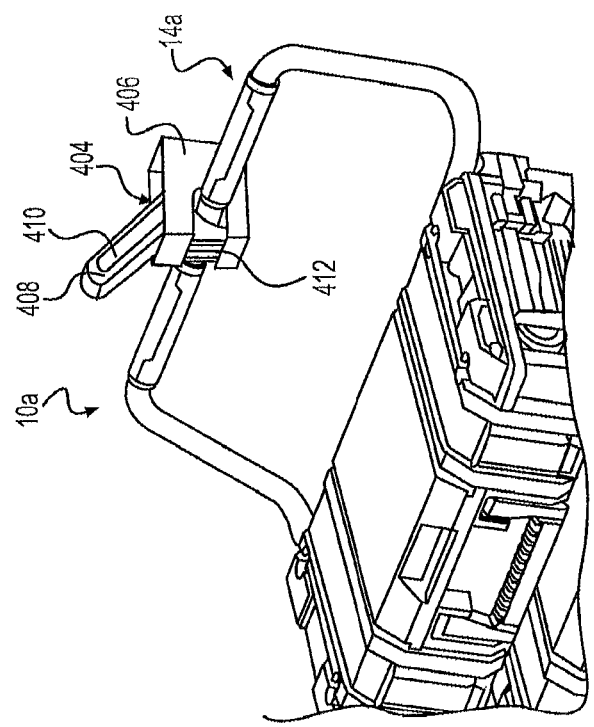

In the embodiment shown in FIG. 28*a*, the docking assembly 404 includes a base structure 406 and a movable structure 408. The base structure 406 includes a receiving space 407 constructed and arranged to receive at least a portion of the movable structure 408. The movable structure 408 may be pivotally attached to the base structure 406 using pins, screws, or any other attachment mechanism. The base structure 406 also includes a recess 409 constructed and arranged to receive at least a portion of the handle 14*a* to retain the handle 14*a* therein. The movable structure 408 includes a handle portion 410 and a retaining portion 412 (see FIG. 28*b*). The movable structure 408 may be moved between a closed position wherein the handle 14*a* is prevented from being removed or inserted into the recess 409 and an open position wherein the handle is permitted to be removed or inserted into the recess 409. Thus, in the closed position, the retaining portion 412 of the movable structure 408 blocks the recess 409, as shown in FIG. 28*b*. In the open position, the retaining portion 412 is removed from the recess 409 and thus does not block the recess 409. The docking assembly 404 may be moved between the open and closed positions via the handle portion 410.

It is contemplated that the docking assembly 404 may also include an internal spring (not shown) constructed and arranged to bias the movable structure 408 either in the closed position or in the open position. For example, in one embodiment where the docking assembly 404 is biased in the closed position, the user may move the docking assembly 404 to the open position by pushing or pulling the handle portion 410 upwards until the retaining portion 412 is no longer blocking the recess 409, as shown in FIG. 28*c*. In such embodiment, the docking assembly 404 may be moved to the closed position by releasing the handle portion 412 such that the bias of the spring moves the movable structure 408 to the closed position and the retaining portion 412 blocks the recess 409, as shown in FIG. 28*b*. In embodiments without the internal spring that biases the docking assembly 404 in either the closed or open position, the user may simply push the handle portion 412 downwards to move the docking assembly 404 to the closed position (shown in FIG. 28*b*) or pull the handle portion 412 upwards to move the docking assembly 404 to the open position (shown in FIG. 28*c*). The docking assembly 404 may also optionally be provided with a lock (not shown) that locks the movable structure 408 either in the closed position or in the open position.

First, second, and third containers 113, 115, and 117 may be releasably mounted to the chassis 17*a*. Each of the containers 113, 115, and 117 has a pair of side handles 125, 127, 129 that are constructed and arranged to clamp or otherwise engage or couple or latch or connect onto the mount structures 18*a* to enable the containers 113, 115, and 117 to be releasably connected to the chassis 17*a*. The plurality of containers 113, 115, and 117 may be releasably connected to the mount structures 18*a* such that each of the plurality of containers 113, 115, and 117 may be independently removable from the mount structures 18a and the chassis 17a. That is, each of the plurality of containers 113, 115, and 117 may be released and removed from their respective mount structures 18a and from the chassis 17a without releasing any of the other containers of the plurality of containers 113, 115, and 117. The plurality of containers 113, 115, and 117 may also be releasably connected to the mount structures 18a and arranged such that the containers 113, 115, and 117 are spaced from one another. In other words, the containers 113, 115, and 117 may be connected to the mount structures 18a and arranged on the chassis 17a such each of the containers 20, 22, 24 does not contact or rest on another container 113, 115, and 117.

It is contemplated that the mount structures 18a are not limited to the configuration shown in the illustrated embodiment. The mount structures 18a may have any configuration that enables the containers 113, 115, and 117 to be mounted thereon. The mount structures 18a may be, just for example, trays or hooks connected to the frame 16a. In some embodiments, the mount structures 18a may be removed from the frame 16a. Alternatively or additionally, in some embodiments, the mount structures 18a may also be optionally fixed to the frame 16a.

In this embodiment, the third container 117 is mounted to the mount structures 115 via the side handles 129. The second container 115 is releasably connected to the structures 18a via the side handles 127. The first container 113 is releasably connected to the mount structures 18a via the side handles 125. However, as mentioned above, it is contemplated that the arrangement and location of the containers on the chassis 17a may vary and may be customized according to user preferences. The number and size of containers may also vary, and are not limited to the containers 113, 115, and 117 shown in FIG. 13. The handles 125, 127, and 129 may have similar configurations as handles 98, 100, and 102, and may be clamped to the mount structures 18a in a similar manner.

FIG. 14 shows a rear perspective view of the apparatus 10a. The apparatus 10a may optionally have the rear member 30a secured to the frame 16a and constructed and arranged to support the frame 16a. The rear member 30a is configured to be connected to the rear portions 208 of the handle structure 201. The apparatus 10a may also include a lower rear portion 210, which may also be constructed and arranged to support the frame 16a. The lower rear portion 210 may be operatively connected to the mounting bars 26a of the chassis 17a. The lower rear portion 210 may also be constructed and arranged to receive the elongated axle 44a on which the wheels 12a are attached. The lower rear portion 210 may be constructed and arranged to receive supporting bars 202 (two are shown in this embodiment). The supporting bars 202 may be connected to a rear extending portion 212 of the chassis 17a. The mounting bars 26a and the supporting bars 202 may be arranged to extend parallel to one another.

In the illustrated embodiment, the apparatus 10a may also include a rear latching assembly 203 having a latch bar 204 constructed and arranged to latch the containers 113, 115, and 117 to the chassis 17a when the containers 113, 115, 117 are mounted on the mount structures 18a. The latch bar 204 may be configured to extend parallel to the supporting bars 202. The rear latching assembly 203 may include a latch member 206. The latch bar 204 may be connected to the latch member 206 that is constructed and arranged to move the latch bar 204 from a latched position wherein the latch bar 204 is latched to the containers 113, 115, and/or 117 and an unlatched position wherein the latch bar 204 is not latched to the containers 113, 115, and/or 117. When the latch bar 204 is in the latched position, the containers 113, 115, and/or 117 are prevented from moving forward in the direction of A (away from latch bar 204). When the latch bar 204 is in the unlatched position, the containers 113, 115, and/or 117 are permitted to be moved forward away from the latch bar 204 to be removed from the chassis 17a.

Figure 15:
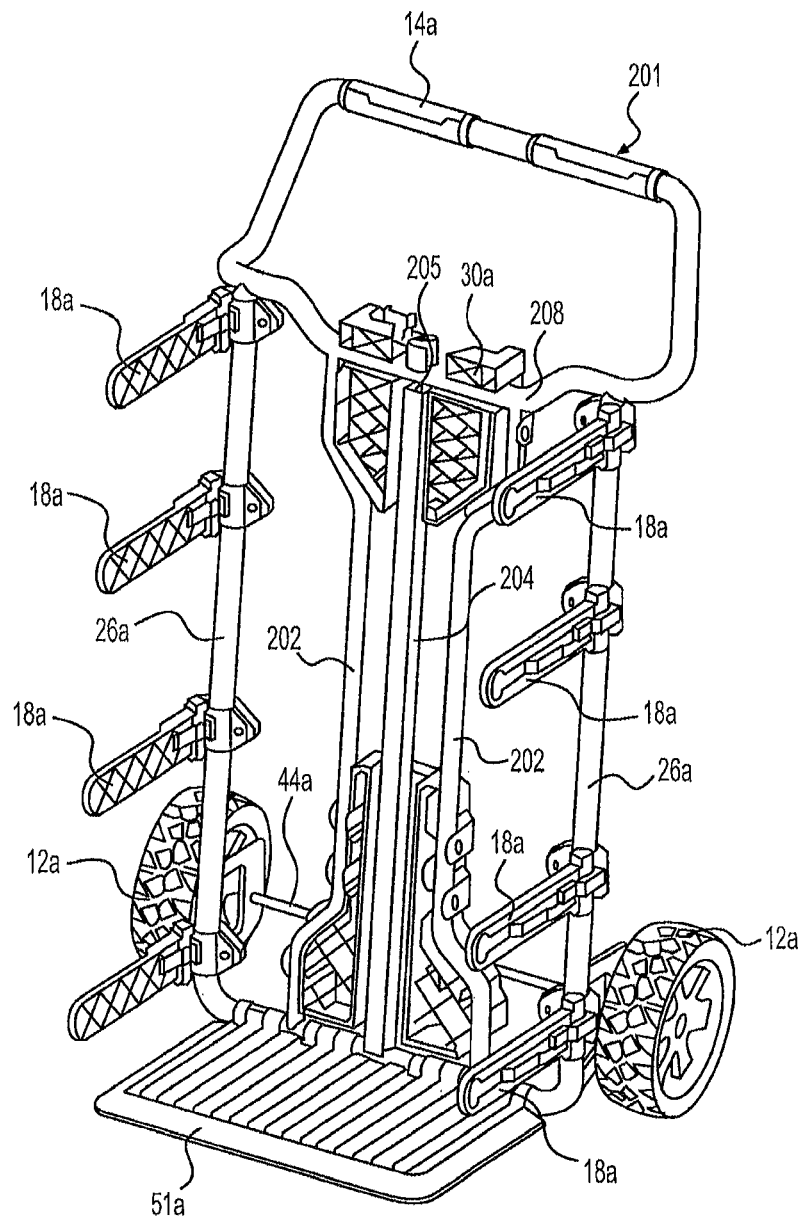
FIG. 15 shows the front perspective view of the chassis of the rolling container assembly of the embodiment of FIG. 13.

FIG. 15 shows a front perspective view of the chassis 17a of the apparatus 10a with the containers 113, 115, and 117 removed. In this embodiment, the chassis 17a includes the support structure or platform 51a. The support structure or platform 51a may be connected to the rear extending portion 212 of the chassis 17a via screws. However, it is contemplated that the support structure 51a may be connected via pins, snap-fit connections, adhesives, welding, or other attachment mechanisms. The support structure or platform 51a may be used to support at least one of the containers 113, 115, and 117. It is contemplated that the support structure or platform 51 may be used with the chassis 17 to enable the chassis 17 to function as a trolley or a handcart. It is also contemplated that the support structure or platform 51a may be used with the chassis 17 to support and transport the stacked and connected containers 113, 115, and 117 shown in FIG. 24.

Figure 16:
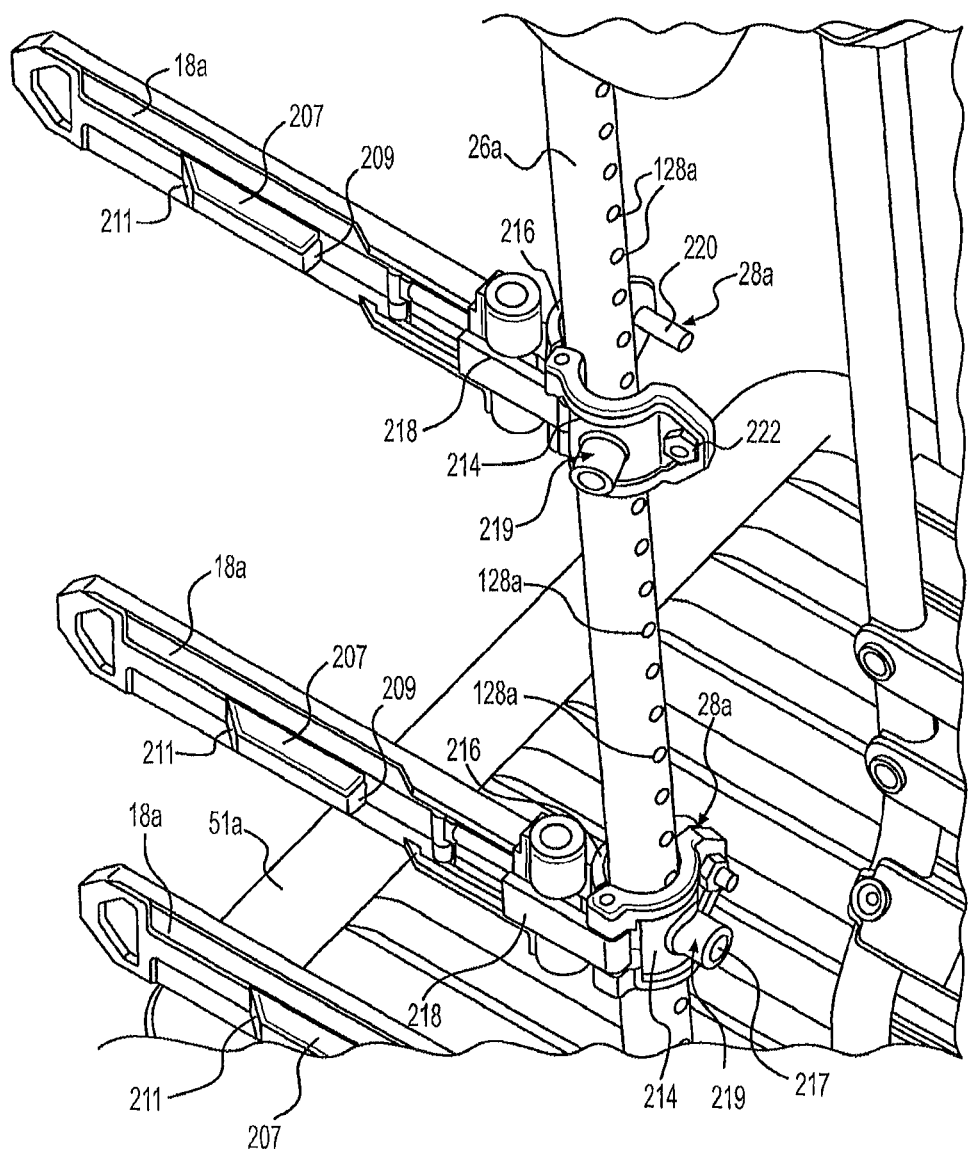
FIG. 16 shows a detailed view of the mount structure attached to the mounting bar in accordance with an embodiment of the present patent application.

FIG. 16 shows a detailed view of the mount structures 18a attached to the mounting bars 26a of the apparatus 10a via the attachment structures 28a. The mounting bars 26a include the openings 128a provided along the length thereof. In this embodiment, each attachment structure 28a includes a pivoting portion 214, a receiving portion 216, and an attachment portion 218. The attachment portion 218 is constructed and arranged to attach the attachment structure 28a to the mounting bar 26a. The pivoting portion 214 and the receiving portion 216 are constructed and arranged to be attached to an opening 128a in the mounting bars 26a. The pivoting portion 214 and the receiving portion 216 may be generally curved, thus enabling a mounting bar 26a to be received therebetween. In one embodiment, the receiving portion 216 includes a screw 220 configured to be received in a receiving region 222 of the pivoting portion 214 so as to connect the receiving portion 216 and the pivoting portion 214 to retain the mount structure 18a at a selected location on the mounting bar 26a. However, it is contemplated that the receiving portion 216 and the pivoting portion 214 may be connected via other connecting mechanisms, such as, just for example, pins, rivets, or fasteners. In this embodiment, the pivoting portion 214 is provided with an insertion receiving structure 219 having an opening 217 that is constructed and arranged to receive an insertion structure 224 (see FIG. 17A), such as a pin, screw, or other attachment mechanisms. The insertion structure 224 is constructed and arranged to be inserted into one of the openings 128 of the mounting bar 26a to retain the mount structure 18a at a selected position on the mounting bar 26a.

As shown in FIG. 16, each of the mount structures 18a includes an elongated protrusion 207 provided thereon. The protrusion 207 may have a stop surface 209 provided on an end near the mounting bar 26a and may have a slanted surface 211 on the opposite end. The protrusion 207 may be constructed and arranged to retain the containers 113, 115, 117 and prevent the containers 113, 115, 117 from being moved forward or in the direction of A (see FIG. 14) when the side handles 125, 127, 129 of the containers 113, 115, 117 are clamped onto the mount structures 18a. For example, the side handles 125, 127, 129 of containers 113, 115, and 117 may have a similar construction and arrangement as the side handle 100 described above. Thus, the side handles 125, 127, 129 may each have a recess 106*a* (see FIG. 13) formed therein. When the containers 113, 115, 117 are mounted on the mount structures 18*a*, the elongated protrusion 207 may be received in the recesses 106*a* of the side handles 125, 127, 129, as shown in FIG. 13. Accordingly, in this embodiment, when the side handles 125, 127, 129 of the containers 113, 115, and 117 are clamped onto the mount structures 18*a*, abutment between the stop surface 209 and at least a portion of the side handles 125, 127, 129 prevents the movement of the containers 113, 115, 117 in the direction of A, thus preventing the containers 113, 115, 117 from sliding off of the mount structures 18*a*. In contrast, the slanted surface 211 of the protrusion 207 enables the side handles 125, 127, 129 of the containers 113, 115, 117 to slide onto the mount structures 18*a* without requiring movement of the side handles 125, 127, 129 to the release position. Accordingly, the containers 113, 115, 117 may be pushed onto the mount structures 18*a* such that the protrusion 207 is retained in the recesses 106*a* of the side handles 125, 127, 129.

FIG. 17A illustrates details of an embodiment of the mount structure 18*a* and the attachment structure 28*a*. In this embodiment, the mount structure 18*a* may have an inner surface 221 (see FIG. 17A) and an outer surface 223 (see FIG. 18A). The inner surface 221 of the mount structure 18*a* may be provided with a plurality of strengthening ribs 225 deployed crosswise relative to one another.

In the illustrated embodiment, the attachment structure 28*a* includes the insertion structure 224 constructed and arranged to be inserted into one of the openings 128 of the mounting bar 26*a* to retain the mount structure 18*a* at a selected position on the mounting bar 26*a*. The pivoting portion 214 and the receiving portion 216 may be pivotally connected to each other via a pivot pin 228. The pivoting portion 214 and the receiving portion 216 may thus be pivoted between an open position wherein the mounting bar 26*a* may be inserted or removed from between the pivoting portion 214 and the receiving portion 216 and a closed position wherein the mounting bar 26*a* may not be inserted or removed from between the pivoting portion 214 and the receiving portion 216. The receiving portion 216 may be pivotally attached to the mount structure 18*a* via a pivot pin 230, although it is contemplated that other structures that enable pivotal or rotational movement may be used. The receiving portion 216 may have a front surface 226 configured to face in a direction away from the rear member 30*a* when the receiving portion 216 is attached to the mounting bar 26*a*. The attachment portion 218 may be configured to attach the receiving portion 216 to the mount structure 18*a*. The attachment portion 218 may be integral with the receiving portion 216 or may be separately attached to the receiving portion 216.

Figure 19:
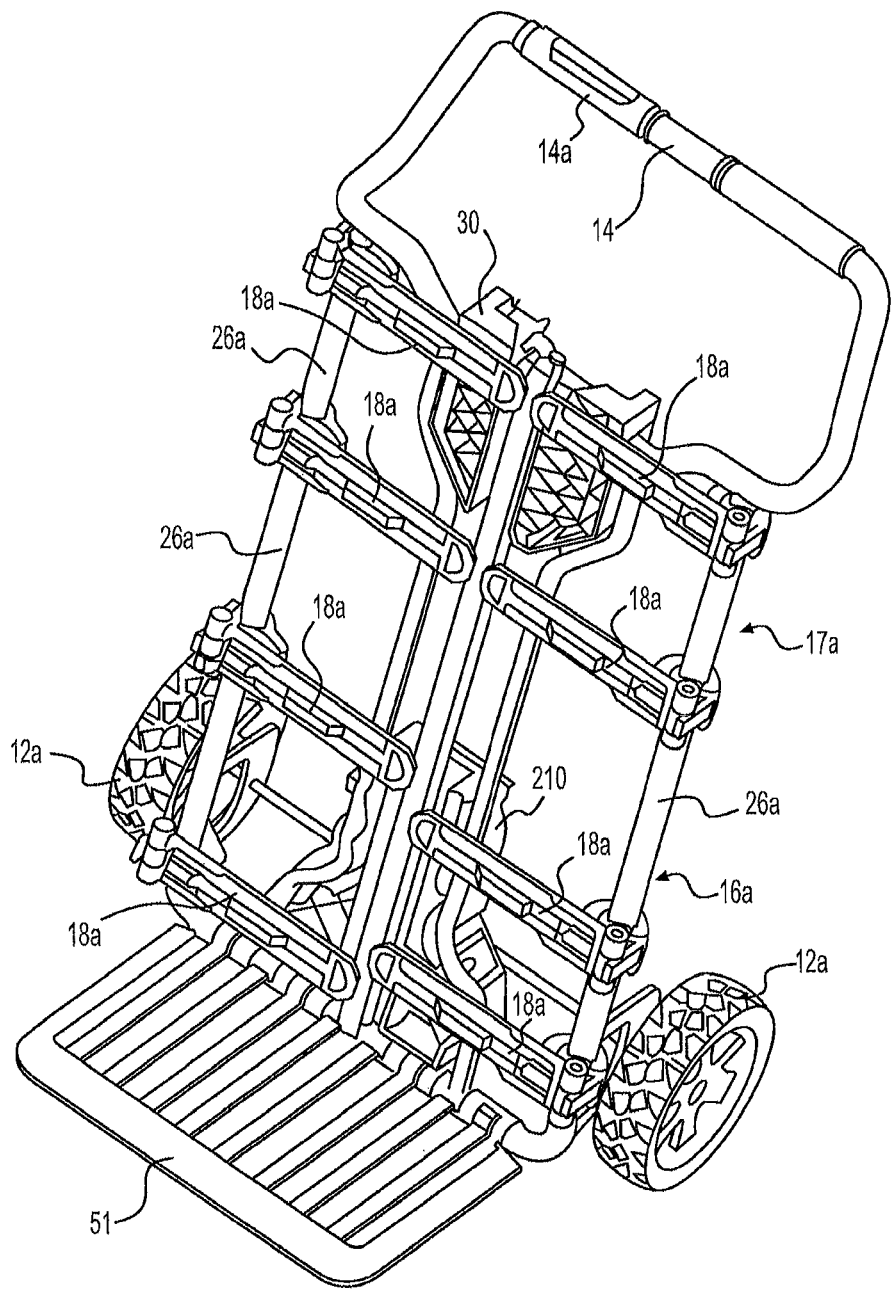
FIG. 19 shows a front perspective view of the chassis with folded mount structures in accordance with an embodiment of the present patent application.

FIG. 17B illustrates a cross sectional view of the mount structure 18*a*. The attachment portion 218 of the attachment structure 28*a* may include an internal pin 232, or other structure, that is received in a receiving portion 234 of the mount structure 18*a*. The internal pin 232 may optionally extend or retract relative to the attachment portion 218 when the mount structure 18*a* is pivoted between an extended position (see FIG. 17A) and a folded position (see FIG. 18A). In one embodiment, when the mount structures 18*a* are in the extended position, the containers 113, 115, or 117 may be mounted on the mount structures 18*a*. In such embodiment, when the mount structures 18*a* are in the folded position, the containers 113, 115, or 117 may not be mounted thereon. However, moving the mount structures 18*a* to the folded position, as shown in FIG. 19, enables easy carrying and storage of the chassis 17*a*.

FIG. 18A shows a detailed view of the mount structure 18*a* and the attachment structure 28*a* in the folded position. In the illustrated embodiment, when the mount structure 18*a* is in the folded position, a portion of the inner surface 221 of the mount structure 18*a* is in front of or disposed against the front surface 226 of the receiving portion 216 of the attachment structure 28*a*. In this embodiment, when the mount structure 18*a* is moved to the folded position, an extension portion 236 of the attachment portion 218 of the attachment structure 28*a* is constructed and arranged to stay in place. That is, the extension portion 236 of the attachment portion 218 does not move with the attachment structure 28*a*. Accordingly, in one embodiment, the extension portion 236 may extend in a direction generally perpendicular to the direction that the mount structure 18*a* is extending when the mount structure 18*a* is in the folded position, as shown in FIG. 18A. In one embodiment, the extension portion 236 may act as a stop structure that limits the further movement of the mount structure 18*a* when the mount structure 18*a* is being moved to the extended position.

FIG. 18B shows a cross sectional view of the mount structure 18*a* when the mount structure 18*a* is in the folded position. In this embodiment, the inner surface 221 of the mount structure 18*a* is disposed against the front surface 226 of the receiving portion 216 of the attachment structure 28*a*, and the internal pin 232 is received in the receiving region 234 of the mount structure 18*a*. The mount structure 18*a* may be attached to the mounting bar 26*a* as follows in accordance with an embodiment. The user may select an opening 128 on the mounting bar 26*a* corresponding to a desired height of the mount structure 18*a*. The receiving portion 216 and the pivoting portion 214 may be in the open position wherein the mounting bar 26*a* may be inserted therebetween. The receiving portion 216 may be placed against the mounting bar 26*a* at the desired height, as shown in FIG. 16. After the insertion structure 224 has been aligned with an opening 128, the pivoting structure 214 may then be pivoted towards the closed position relative to the receiving portion 216. Accordingly, when the pivoting structure 214 is pivoted towards the receiving portion 216, the insertion structure 224 is inserted into the insertion receiving structure 219 and into the selected opening 128, as shown in FIG. 29A. In one embodiment, when the receiving portion 216 and the pivoting portion 214 are in the closed position, the screw 220 of the receiving portion 216 is received in the receiving region 222 of the pivoting portion 214. The screw 220 may be tightened to retain the attachment structure 28*a* at the selected position on the mounting bar 26*a*.

To detach the mount structure 18*a* to the mounting bar 26*a*, the screw 220 of the receiving portion 216 may be unscrewed from the receiving region 222 of the pivoting portion 214. The insertion structure 224 may also be removed from the opening 128 and the insertion receiving structure 219, as shown in FIG. 29B. After the screw 220 has been unscrewed, the pivoting portion 214 may be pivoted towards the open position relative to the receiving portion 216. Once the receiving portion 216 and the pivoting portion 214 are in the open position, for example as shown in FIG. 16, the attachment structure 28*a* may be removed from the mounting bar 26*a*.

In one embodiment, to move the mount structure 18*a* to the folded position from the extended position, the mount structure 18*a* may be rotated in the direction of B (see FIG. 17A) along the pin 230 until the mount structure 18*a* is in the position shown in FIG. 18A. In one embodiment, the direction that the mount structure 18*a* extends when the mount structure 18*a* is in the folded position (see FIG. 18A) is generally perpendicular to the direction in which the mount structure 18*a* extends when the mount structure 18*a* is in the extended position (see FIG. 17A). When the mount structure 18*a* is in the folded position, the front surface 226 of the receiving portion 216 of the attachment structure 28*a* prevents further movement of the mount structure 28*a* in the direction B. To move the mount structure 18*a* to the extended position from the folded position, the mount structure 18*a* may be rotated in the direction opposite of B along the pin 230 until the mount structure 18*a* is in the position shown in FIG. 17A. The extension portion 236 may prevent the further rotation of the mount structure 18*a* in the direction opposite of B. Thus, the extension portion 236 may help position the mount structure 28*a* in the extended position.

FIG. 20A shows the rear latching structure 203 of the apparatus 10 in accordance with an embodiment. The rear latching structure 203 includes the rear latch bar 204 and the latch member 206. The rear latch member 206 is constructed and arranged to be rotatable along point 238 to rotate the latch bar 204 between an unlatched position (see FIG. 20A) and a latched position (see FIG. 20B). Thus, when the latch member 206 is rotated, the latch bar 204 is also rotated. When the latch structure 203 is in the unlatched position, the containers 113, 115, and/or 117 are permitted to be moved forward in the direction of A (see FIG. 14). When the latch structure 203 is in the latched position, the containers 113, 115, and/or 117 are prevented from being moved forward in the direction of A. In other words, the latch structure 203 in the latched position locks the containers 113, 115, and 117 to the chassis 17*a*.

As shown in FIG. 20A, the latch member 206 may include an opening 244. A locking structure 246 may be attached to the chassis 17*a*, and an opening 248 may be provided in the locking structure 246. In one embodiment, the opening 244 of the latch member 206 is constructed and arranged to be aligned with the opening 248 of the locking structure 246 when the latch member 206 is in the latched position, as shown in FIG. 20B. A padlock, combination lock, a rod, or other locking mechanisms or structures may be inserted into the aligned openings 248 and 244 to lock the latch structure 203 in the latched position, thereby preventing removal of the containers 113, 115, 117 from the chassis 17*a*.

In the embodiment shown in FIG. 20A, the rear latching structure 203 includes a retaining portion 240. The retaining portion 240 may be generally arcuate and may be formed near one end of the latch member 206, opposite that of an actuating end 245 of the latch member 206. The opening 244 may be formed on or near the actuating end 245 of the latch member 206. In one embodiment, the pivot point 238 may be provided between the retaining portion 240 and the actuating end 245. The retaining portion 240 may be constructed and arranged to be latched with a rear receiving structure of the containers 113, 115, and 117, taking the form of a rear extension structure 242 in this embodiment. In one embodiment, the rear extension structure 242 may be generally L-shaped so as to be engageable with the retaining portion 240. Accordingly, when the rear extension structure 242 of the container 113, 115, or 117 is engaged with the retaining portion 240 of the rear latching structure 203, the rear latching structure 203 is in the latched position and the container 113, 115, or 117 is latched to the latch structure 203. In contrast, when the rear extension structure 242 of the container 113, 115, or 117 is not engaged with the retaining portion 240, the rear latching structure 203 is in the unlatched position and container 113, 115, or 117 is not latched to the latch structure 203.

In the embodiment shown in FIG. 20B, the latch bar 204 and the latch member 206 are integrally formed. It is contemplated that in other embodiments, the latch bar 204 and the latch member 206 may be separate components that are operatively connected to one another. In the illustrated embodiment, the latch bar 204 has a retaining side 250 and a third side 252 opposite the retaining side 250. A middle side 254 (see FIG. 20A) may also be provided and may be constructed and arranged to connect the retaining side 250 and the third side 252. The retaining side 250, the third side 252, and the middle side 254 may form a generally U-shaped configuration with an interior space 247 and an opening 249 thereto. The retaining side 250 is constructed and arranged to engage with the rear extension structure 242 of the container 113, 115, or 117 when the latch structure 203 is in the latched position (see FIG. 20B). When the latch structure 203 is in the unlatched position, the opening 247 is forward facing (e.g., in the direction of A of FIG. 14, towards the rear extension structure 242 of the container 113, 115, or 117). In such position, the retaining side 250 of the latch bar 204 and the retaining portion 240 are not engaged with the rear extension structures 242 of the containers 113, 115, or 117. In some embodiments, the retaining side 250 of the latch bar 204 and the retaining portion 240 are integrally formed and may be formed from one piece of material. In one embodiment, the retaining portion 240 may be separated from the retaining side 250 of the latch bar 204 by a recess 205, as shown in FIG. 15. In this embodiment, the recess 205 provided between the retaining portion 240 and the retaining side 250 is constructed and arranged to receive a portion of the rear portion 208 of the handle structure 201.

Figure 26:
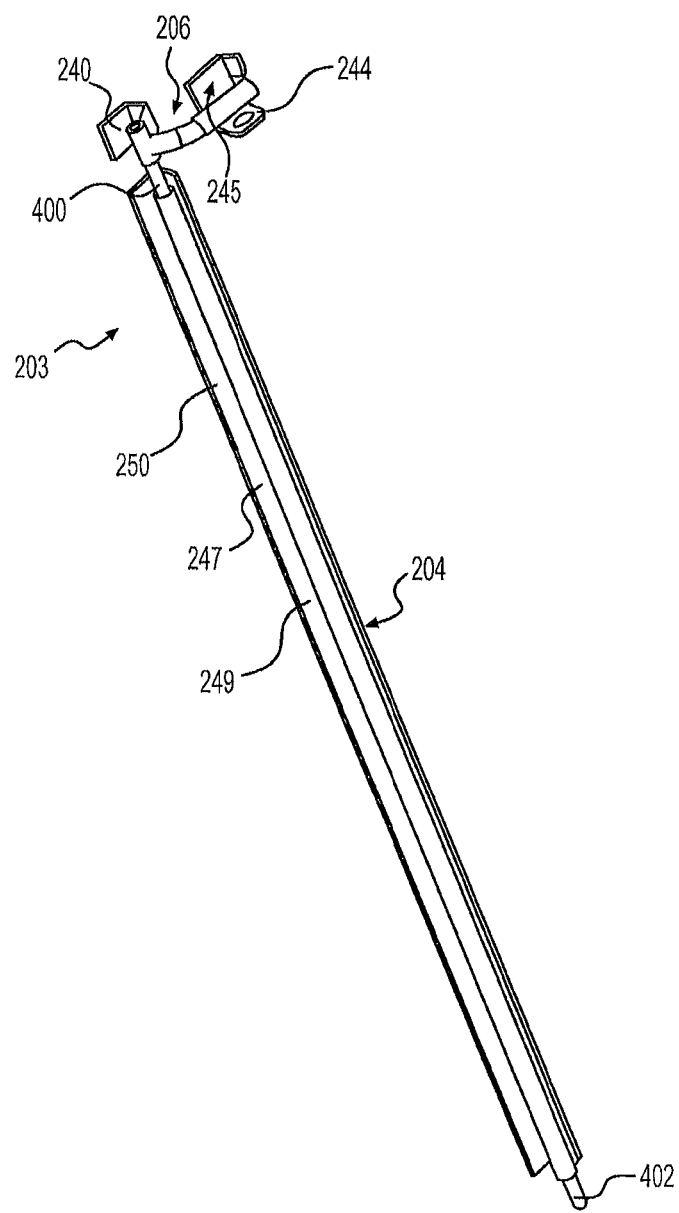
FIG. 26 is a detailed view of a rear latching assembly in accordance with an embodiment of the present patent application.

An embodiment of the rear latch assembly 203 can be seen in more detail in FIG. 26. As shown in the illustrated embodiment, the retaining side 250 may be provided along the length of the latch bar 204. Thus, the latch bar 204 may be used to retain a plurality of containers 113, 115, and 117 simultaneously.

Figure 27A:
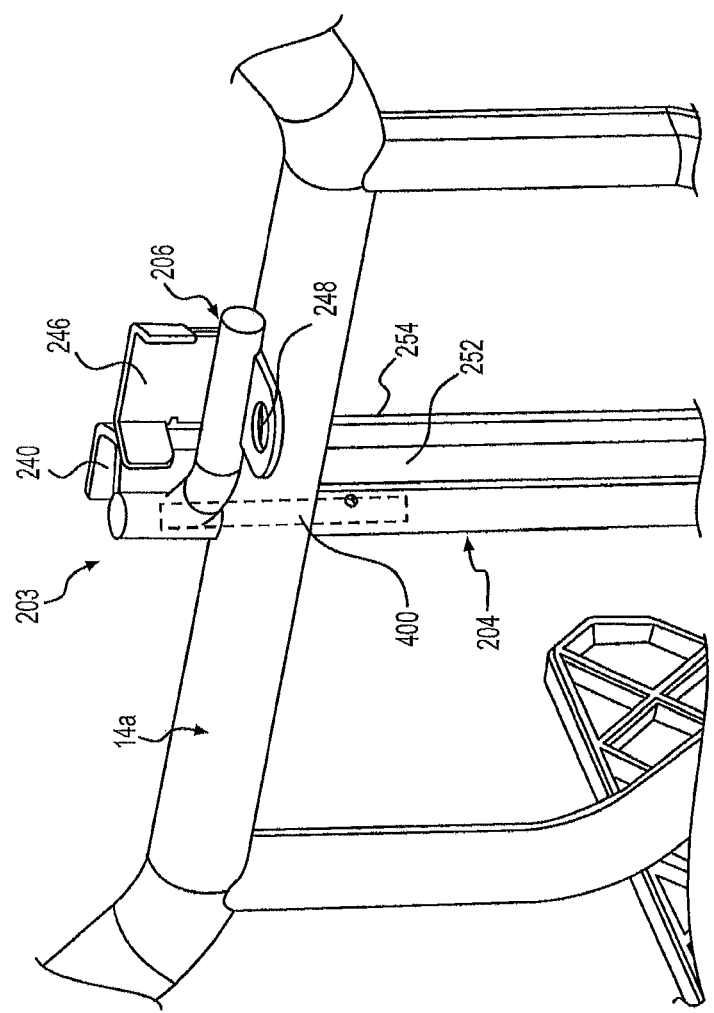
FIGS. 27A-27B are detailed views of the rear latching assembly attached to the chassis in accordance with an embodiment of the present patent application.

As shown in FIG. 27*a*, the latch member 206 is connected to the latch bar 204 via a first pin 400. A second pin 402 may be provided on the opposite end of latch bar 204. In some embodiments, the first pin 400 and the second pin 402 may either be separate or integral. The first pin 400 may be attached to the latch member 206 and the latch bar 204 via welding, riveting, adhesives, screws, or any other attachment mechanisms. Similarly, the second pin 402 may be attached to the latch bar 204 via welding, riveting, adhesives, screws, or any other attachment mechanisms.

Figure 27B:
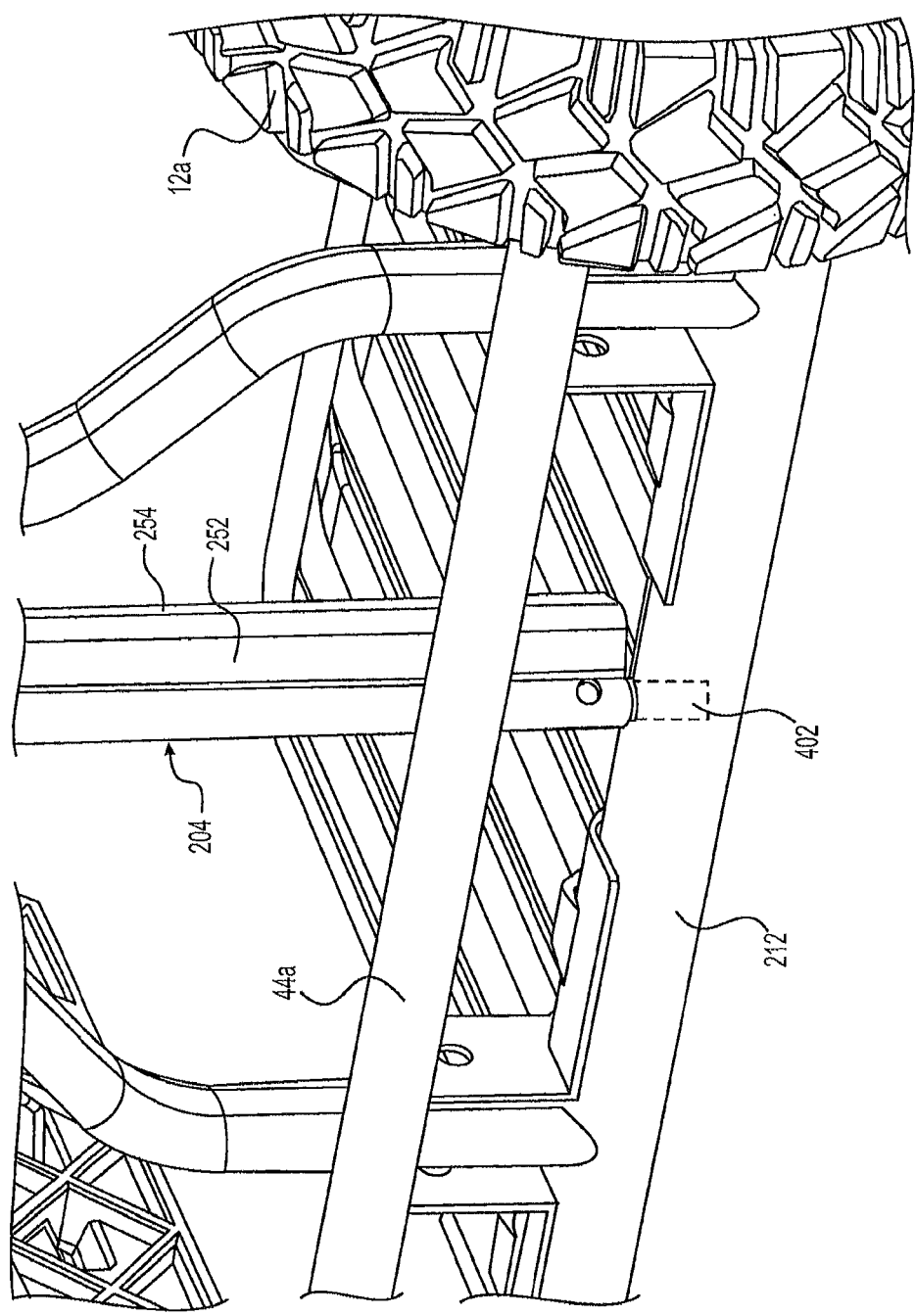

As shown in FIG. 27*a*, the pin 402 may be received in a portion of the latch member 206, in a portion of the handle 14*a*, and in a portion of the latch bar 204. This configuration enables the latch bar 204 and the latch member 206 to be pivotally retained on the chassis 17*a*. FIG. 27*b* shows the pin 402 also pivotally retaining the latch bar 204 on the chassis 17*a*. The pin 402 is received in another portion of the latch bar 204 and in the rear extending portion 212 of the chassis 17*a*.

An operation of latching the containers 113, 115, and/or 117 to the latch structure 203 in accordance with an embodiment will be described as follows. The latch structure 203 may initially be in the unlatched position, as shown in FIG. 20A. The containers 113, 115, and/or 117 may be mounted on the mount structures 18*a*. Each of the containers 113, 115, and/or 117 may have the rear extension structure 242. The user may push the actuating end 245 of the latch member 206 in the counterclockwise direction. The latch member 206 may then be rotated in the counterclockwise direction along the point 238. Accordingly, the latch bar 204, which is operatively attached to the latch member 206, is also rotated in the counterclockwise direction. Thus, the retaining portion 240 and the retaining side 250 of the latch bar 204 are rotated in the counterclockwise direction towards the rear extension structures 242 of the containers 113, 115, and/or 117 until the latch structure 203 is in the latched position, as shown in FIG. 20B. In such a position, the retaining portion 240 and the retaining side 250 of the latch bar 204 are engaged with the rear extension structures 242 of the containers 113, 115, and/or 117. Thus, the movement of the containers 113, 22, and/or 117 in the direction of A is prevented. As mentioned above, a padlock or rod may be inserted through the aligned openings 244 and 248 to retain the latch structure 203 in the latched position.

To unlatch the latch structure 203, the user may push the actuating end 245 of the latch member 136 in the clockwise direction away from the locking structure 246. The retaining portion 240 and the retaining side 250 of the latch bar 204 may thus be disengaged from the rear extension structures 242 of the containers 113, 115, and/or 117. The latch structure 203 may then be in the unlatched position. In such a position, the opening 247 of the latch bar 204 of the latch structure 203 may be facing generally in the direction of A. The containers 113, 115, and/or 117 may then be moved in the direction of A to be removed from the chassis 17a.

It is contemplated that the examples described are not limiting, and other structures or any combination of structures may be used to latch the containers 113, 115, and/or 117 to the latch bar 204. It is also contemplated that the number, location, and configuration of the latch bar(s) 204 may vary.

It is contemplated that the containers 113, 115, and 117 may be constructed with vertical dimensions having a common denominator as described above with respect to containers 20, 22, and 24. The mounting bar 26a may also be constructed similarly as mounting bar 26, described above. Thus, the containers 113, 115, and 117 may be constructed with vertical dimensions having a common denominator that is dependent on the spacing between the openings 128a.

Figure 21A:
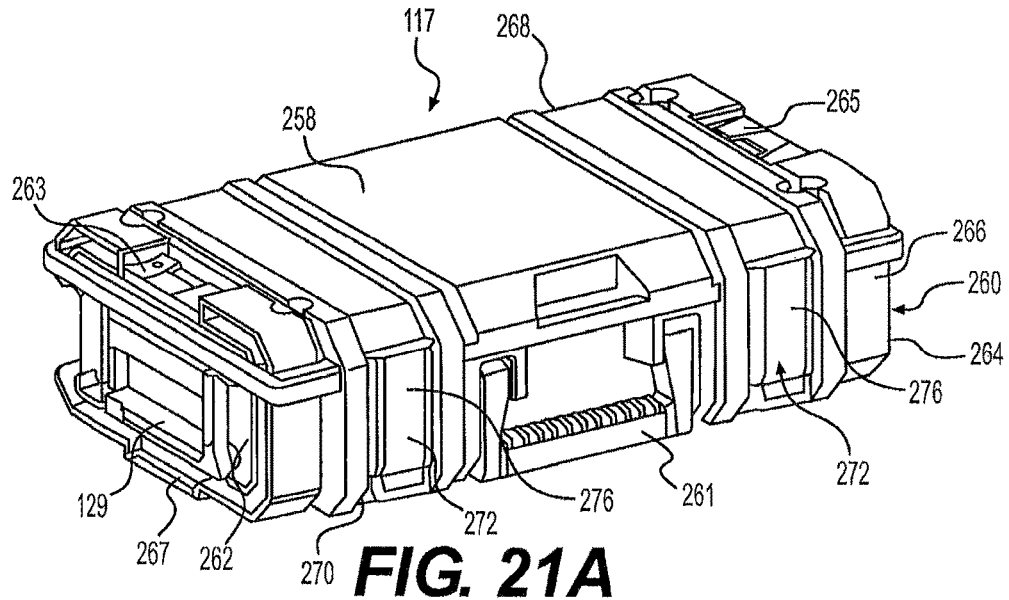
FIGS. 21A-21B show a first container of the rolling container assembly in accordance with an embodiment of the present patent application.
Figure 21B:
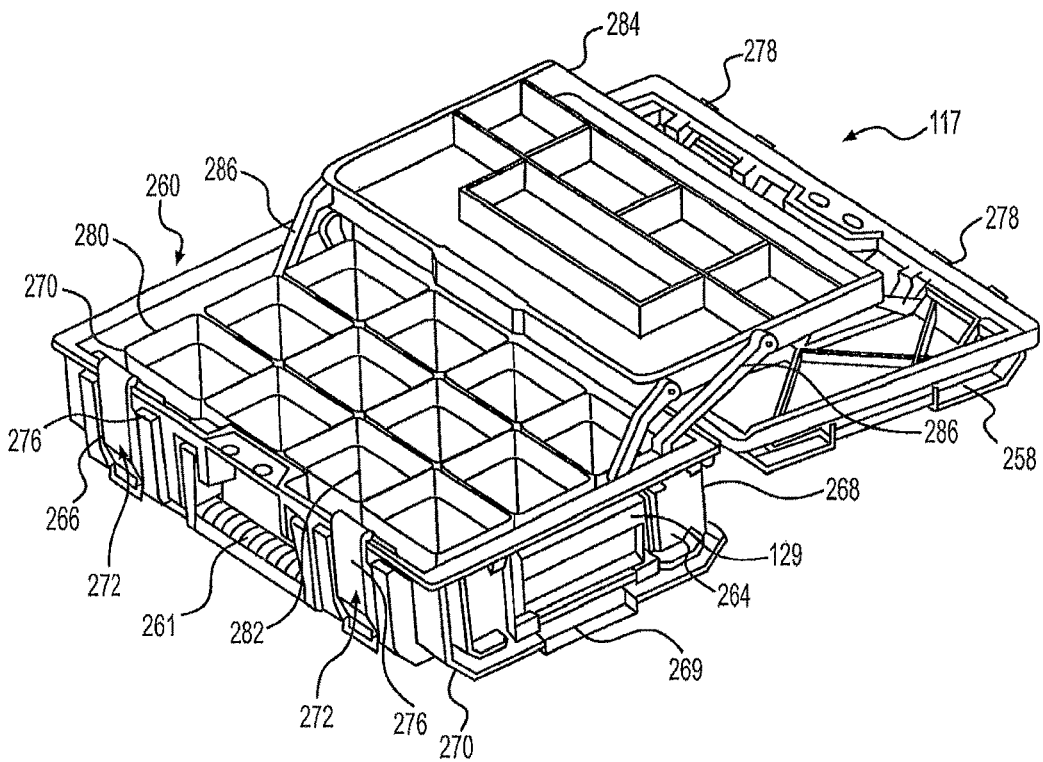

FIGS. 21A-21B, 22A-22B, and 23A-23B illustrate various embodiments of the containers 113, 115, and 117. As shown in FIGS. 21A-21B, the container 117 may have a lid 258 and a container portion 260. The container portion may include a left side or wall 262, a right side or wall 264, a front side or wall 266, a rear side or wall 268, and a bottom side or wall 270 that define a storage space 270 (see FIG. 21B) for storing items. The lid 258 may be pivotally connected to the container portion 260 and may be moved between a closed position preventing access to the storage space 270 and an open position permitting access to the storage space 270. The lid 258 can be latched onto the container portion 260 of the container 117 via latches 272. The container latches 272 may vary in numbers (there may be one or more) and may be pivotable latches, buckles, or any other latching mechanism as would be appreciated by one skilled in the art. The latches 272 (or a single latch) of the container 117 may comprise latch members 276 that are constructed and arranged to engage with latch receiving portions 278 (see FIG. 21B) located on the lid 258. The latch members 276 may be pulled to disengage from latch engaging portions 278 of the lid 258 so that the lid 258 may be opened to allow access to the contents of the container 117. In the illustrated embodiment, the lid 258 is provided with a left side latching structure 263 and a right side latching structure 265 constructed and arranged to enable the containers 117 to be latched directly to other containers (see FIG. 24). The container 117 may also be provided with a left side receiving structure 267 and a right side receiving structure 269 (see FIG. 21B) on the container portion 260. The side receiving structures 267, 269 are constructed and arranged to receive side latches of other containers. The side latches 263, 265 and the operation of latching the container 117 directly to other containers will be described in more detail later. It is contemplated that the number and location of the side latches 263, 265 and side receiving structures 267, 269 may vary.

The lid 258 may be pivotally connected to the container portion 260 using hinges, pins, screws, fastenings, bolts, or any other connection mechanism as would be appreciated by one skilled in the art. The lid 258 may also be a slide-on lid which is slid on to container portion 260 or a snap-on lid that is snapped on to the container portion 260. It is contemplated that the methods of mounting the lid 258 on to the container portion 260 may vary and the number of lids 258 may vary. A handle 261 may be pivotally attached to the container portion 260 using pivot pins (not shown), although it is contemplated that other attachment mechanisms, such as rivets, fasteners, and other attachment mechanisms known in the art may be used. It is also contemplated that the handle 261 may be attached to the lid 258 of the container 117 in other embodiments. It is also contemplated that in some embodiments, the container handle 261 may be fixed such that the container handle 260 may not be movable from one position to another.

In the illustrated embodiment, the container 117 is provided with the side handles 129 on the left side 262 and the right side 264. The handles 129 may be used to releasably connect the container 117 to the mount structures 18a in the same manner as the side handles 98, 100, 102 of the containers 20, 22, and 24, which are described above. That is, the side handles 129 of the container 117 may be constructed and arranged in a similar manner as the side handles 100 of the small container 22 described above to enable the container 117 to be releasably connected to the mount structures 18a.

In the illustrated embodiment, the storage space 270 of the container 117 has a removable tray 280 disposed therein. The removable tray 280 is divided into a plurality of compartments 282. An upper tray 284 may also be provided and may be pivotally attached to the container portion 260 via attachment structures 286. The attachment structures 286 may pivot to enable the upper tray 284 to move upwards and to the right (as shown in FIG. 21B) to enable access to the compartments 282 of the removable tray 280. The attachment structures 286 may also pivot to enable the upper tray 284 to be disposed on top of the removable tray 280 so as to prevent access to the compartments 282 thereof.

Figure 22A:
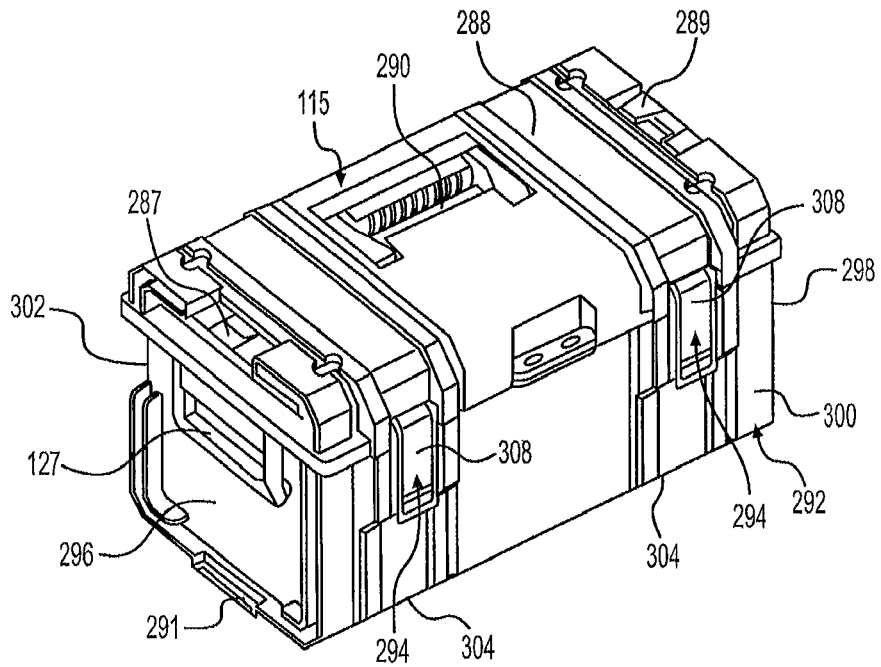
FIGS. 22A-22B show a second container of the rolling container assembly in accordance with an embodiment of the present patent application.
Figure 22B:
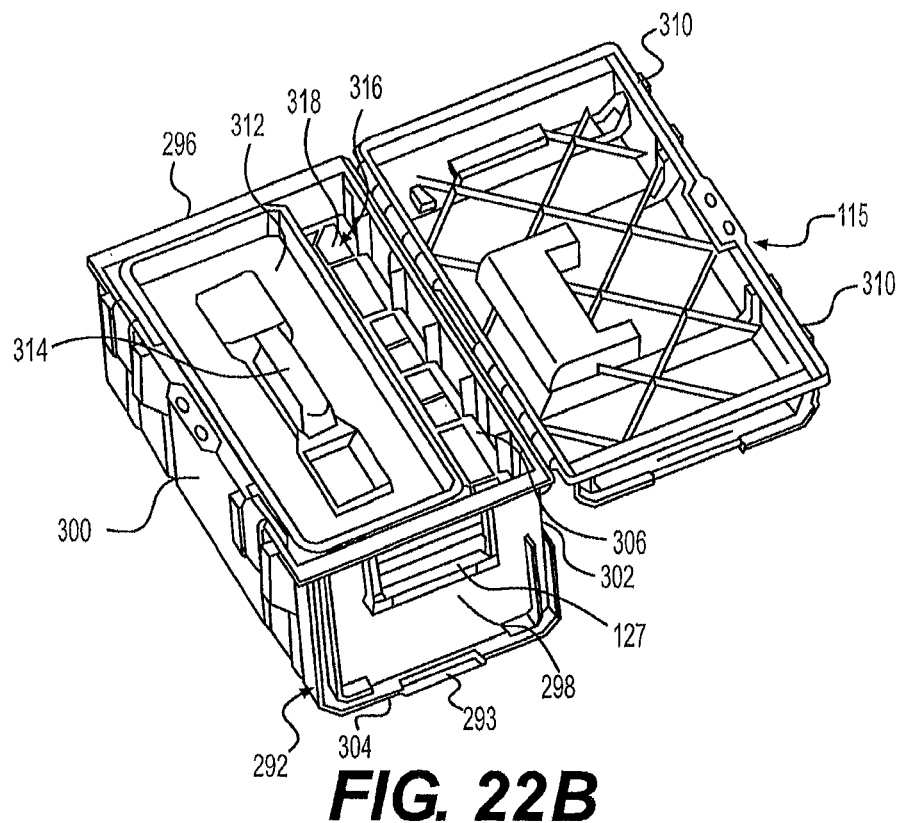

FIGS. 22A-22B illustrate an embodiment of the container 115. In this embodiment, the container 115 includes a lid 288 and a handle 290 located on the lid 288. The handle 290 may be pivotally attached to the lid 288 using pivot pins (not shown), although it is contemplated that other attachment mechanisms, such as rivets, fasteners, and other attachment mechanisms known in the art may be used. The container handle 290 may be disposed within a recess (not shown) formed in the lid 288 when the handle 290 is not in use and may be pivoted to an upright position when the handle 290 is in use. It is contemplated that in some embodiments, the container handle 290 may be fixed such that the container handle 290 may not be movable from one position to another.

As shown in FIG. 22A, the lid 288 may be pivotally connected to a container portion 292. The lid 288 can be latched onto the container portion 292 of the container 115 via latches 294. The container latches 294 may vary in numbers (there may be one or more) and may be pivotable latches, buckles, or any other latching mechanism as would be appreciated by one skilled in the art. The lid 288 may be pivotally connected to the container portion 292 using hinges, pins, screws, fastenings, bolts, or any other connection mechanism as would be appreciated by one skilled in the art. The lid 288 may also be a slide-on lid which is slid on to container portion 162 or a snap-on lid that is snapped on to the container portion 292. It is contemplated that the methods of mounting the lid 288 on to the container portion 292 may vary and the number of lids 288 may vary. The container portion 292 may include two opposing side walls or sides 296, 298, a front wall or side 300, a rear wall or side 302, and a bottom wall or side 304 defining an interior space 306 (see FIG. 12b). The side handles 127 may be used to releasably connect the container 115 to the mount structures 18a in the same manner as the side handles 98, 100, 102 of the containers 20, 22, and 24 described above. That is, the side handles 127 of the container 115 may be constructed and arranged in a similar manner as the side handles 100 of the small container 22 described above with respect to FIGS. 3-4 to enable the container 115 to be releasably connected to the mount structures 18a. The container 115 may also be provided with a left side latching structure 287 and a right side latching structure 289 constructed and arranged to enable the container 115 to be latched directly to other containers (see FIG. 24). The container 115 may also be provided with a left side receiving structure 291 and a right side receiving structure 293 (see FIG. 22B) on the container portion 292. The side receiving structures 291, 293 are constructed and arranged to receive side latches of other containers. The side latches 287, 289 and the operation of latching the container 115 directly to other containers will be described in more detail later. It is contemplated that the number and location of the side latches 287, 289 and side receiving structures 291, 293 may vary.

The latches 294 (or a single latch) of the container 115 may comprise latch members 308 that are constructed and arranged to engage with latch receiving portions 310 (see FIG. 22B) located on the lid 288. The latch members 308 may be pulled to disengage from latch engaging portions of the lid 288 so that the lid 288 may be opened to allow access to the contents of the container 115.

As shown in FIG. 22B, a removable tray 312 having a handle 314 may be carried within the container 115. The removable tray 312 may be held within the interior space 306 of the container 115 and may optionally be removed therefrom to be carried separately. An inner container 316 with a plurality of partitions 318 may also be held in the container 115. The inner container 316 with partitions 318 may be constructed and arranged to hold various kinds of screwdrivers and other tools. In one embodiment, the partitions 318 may be provided with rubber or other memory retention material that facilitates the positioning and retention of screwdrivers and/or other tools in the partitions 318. The removable tray 312 and the inner container 316 may be made of plastic, wood, metal, or other materials known in the art, or combinations thereof.

Figure 23A:
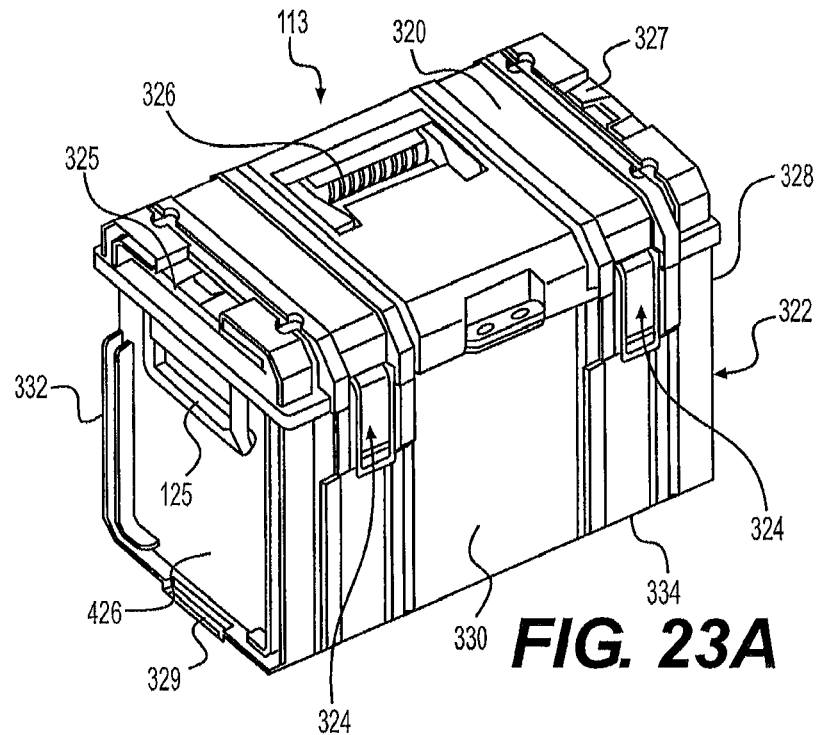
FIGS. 23A-23B show a third container of the rolling container assembly in accordance with an embodiment of the present patent application.
Figure 23B:
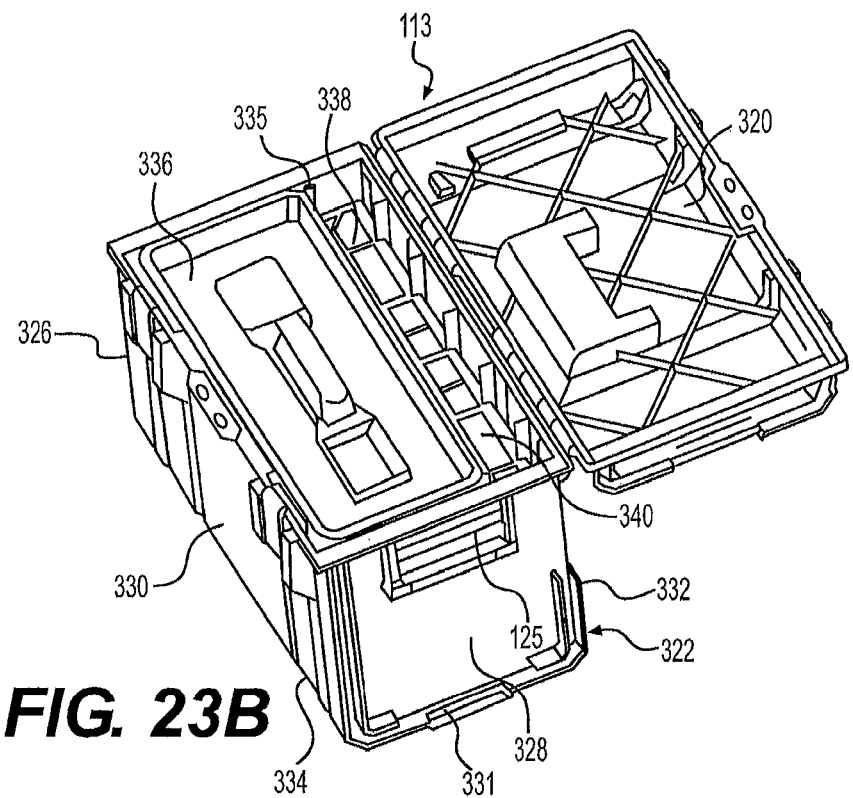

FIGS. 23A-23B show an embodiment of the first container 113. In this embodiment, the container 113 may have a similar configuration as container 115 described with respect to FIGS. 22A-22B. However, the container 113 may be larger than the container 115. For example, the container 113 may include a lid 320 latched to a container portion 322 with latches 324. A handle 426 may be provided on the lid 320. In this embodiment, a left side latch 325 and a right side latch 327 are provided on the container 113 and are constructed and arranged to enable the container 113 to be latched directly to other containers (see FIG. 24). The container 113 may also be provided with a left side receiving structure 329 and a right side receiving structure 331 (see FIG. 23B) on the container portion 322. The side receiving structures 329, 331 are constructed and arranged to receive side latches of other containers. The side latches 325, 327 and the operation of latching the container 113 directly to other containers will be described in more detail later. It is contemplated that the number and location of the side latches 325, 327 and the side receiving structures 329, 331 may vary.

The container portion 322 may include two opposing side walls 326, 328, a front wall 330, a back wall 332, and a bottom wall 334 defining an interior space 335 (see FIG. 23B) for storing items. As shown in FIG. 23B, a removable tray 336 may be provided in the interior space 335. An inner container 338 with partitions 340 may also be provided in the interior space 335. The removable tray 336 and the inner container 338 may have similar configurations as the removable tray 312 and the inner container 316 of the container 115 shown in FIGS. 22A-22B. The container 113 may also be provided with the side handles 125 that may be used to releasably connect the container 113 to the mount structures 18a in the same manner as the side handles 98, 100, 102 of the containers 20, 22, and 24 described above. That is, the side handles 125 of the container 115 may be constructed and arranged in a similar manner as the side handles 100 of the container 22 described above with respect to FIGS. 3-4 to enable the container 113 to be releasably connected to the mount structures 18a.

Figure 24:
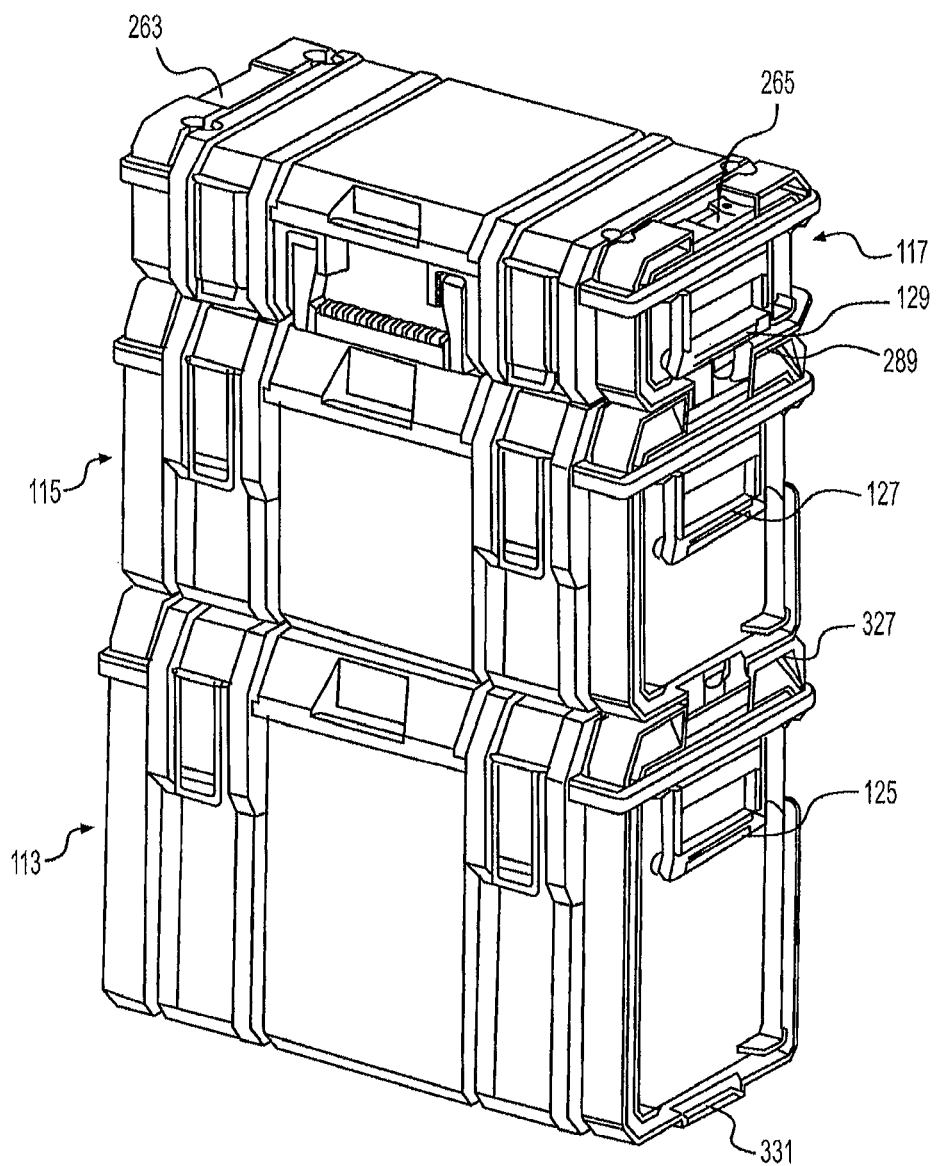
FIG. 24 is a perspective view of the first, second, and third containers latched directly together in accordance with an embodiment of the present patent application.

In the embodiment of FIG. 24, the side latches 325 (obstructed from view in this embodiment) and side latch 327 can be moved between a latched position wherein the container 115 is prevented from being removed from the container 113 and an unlatched position wherein the container 115 is permitted to be removed from the container 113. Similarly, the side latch 287 (obstructed from view in this embodiment) and side latch 289 can be moved between a latched position wherein the container 117 is prevented from being removed from container 115 and an unlatched position wherein the container 117 is permitted to be removed from the container 115. In this embodiment, for the container 115 to be removable from container 113, both side latches 327, 329 should be in the unlatched position. For the container 117 to be removable from container 115, both side latches 325, 327 should be in the unlatched position. The latching of the containers 113, 115, and 117 shown in this embodiment is not intended to be limiting. For example, any combination and number of containers 113, 115, and 117 may be latched, and the containers 113, 115, and 117 may be latched in any order and are not limited to the configuration shown in FIG. 24.

The configuration and operation of the side latch 327 of the container 113 will be described with respect to FIGS. 25A-25C. It is contemplated that the side latches 263, 265 of the container 117, the side latches 287, 289 of the container 115, and the side latch 325 of the container 113 may have similar configurations as the side latch 327 and may operate in a similar manner.

Figure 25A:
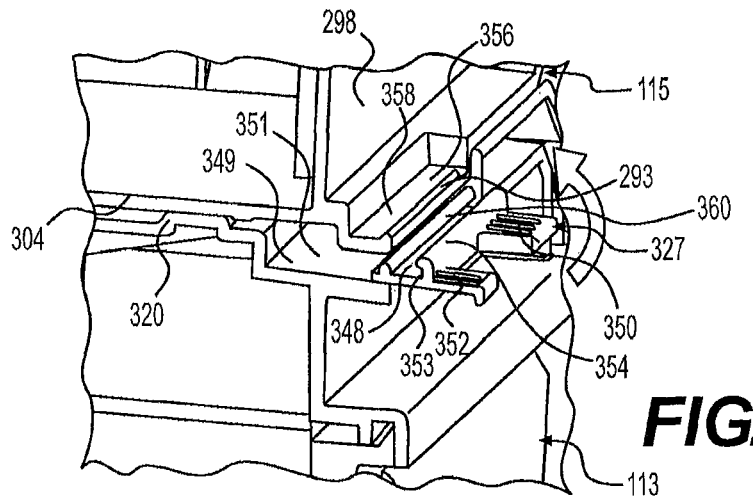
FIGS. 25A-25C are detailed views of side latch structures of the first container in accordance with an embodiment of the present patent application.
Figure 25B:
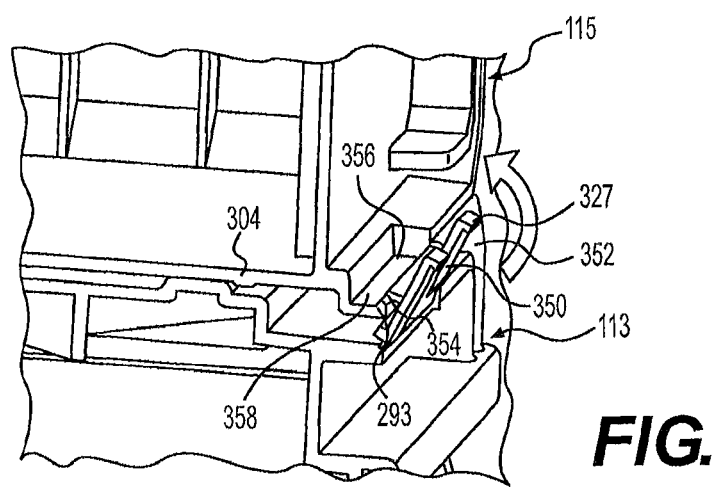
Figure 25C:
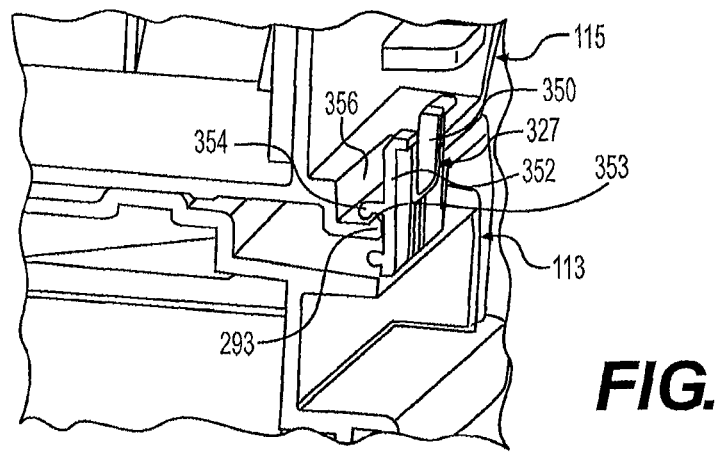

As shown in FIG. 25A, the latch 327 may include a middle portion 348 and two upper portions 350, 352 extending from the middle portion 348. The upper portions 350, 352 may facilitate the latching and unlatching of the latch structure 327. Grooves may be provided on the upper portions 350, 352 to facilitate the grasping of the upper portions 350, 352. An elongated protrusion 354 may be provided on the middle portion 348. The elongated protrusion 354 may have an elongated groove 353 disposed underneath thereof. In the illustrated embodiment, the elongated protrusion 354 is provided on the middle portion 348 near the upper portions 350, 352. The elongated protrusion 354 may be constructed and arranged to engage with the right side receiving structure 293 of the container 115. The container 113 may include a depression 349 formed on the lid 320. A bottom surface 351 may be formed in the depression 351. In one embodiment, the side latch structure 327 may be pivotally connected to the lid 320 near or in the depression 351. When the side latch structure 327 is not being used to latch container 113 to another container, the side latch structure 327 may be pivoted to a stored position (see FIG. 23A) in the depression 349 wherein the elongated protrusion 354 is facing or disposed against the bottom surface 351. It is contemplated that a biasing member, such as a spring, may be used to bias the side latch structure 327 towards the depression 349, or in any position.

In this embodiment, the right side receiving structure 293 is an elongated ridge provided in a depression 356 formed near the right wall 298 of the container 115. The right side receiving structure 293 may extend upwards from a bottom surface 358 of the depression 356. In one embodiment, the bottom surface 358 of the depression may be situated lower than the bottom wall 304 of the container 115. The containers 117 and 113 may also have a similar configuration. The side latch 327 may optionally be provided with a second elongated protrusion 360 disposed beneath the elongated protrusion 354.

The latch 327 of container 113 may be latched to the side receiving structure 293 of container 115 to latch container 113 and 115 in accordance with an embodiment as follows. Before the container 115 is stacked on container 113, the side latch 327 may be pivoted away from the stored position (see FIG. 23A) wherein the side latch 327 is disposed in the depression 349 to a position outside of the depression 349 (see FIG. 25A). As shown in FIG. 20A, the container 115 may then be stacked on top of container 113 such that the side latch 327 of container 113 is disposed beneath the side receiving structure 293 of container 115. The latch structure 327 may be pivoted upwards in the counterclockwise direction, as shown in FIG. 25B. The elongated protrusion 354 of the side latch 327 may be pushed against the side receiving structure 293 until the side receiving structure 293 is disposed in the groove 353 underneath the elongated protrusion 353 and a portion of the elongated protrusion 353 is disposed to the left of the side receiving structure 293, as shown in FIG. 25C. The elongated protrusion 354 and the side receiving structure 293 may have resilient properties that enable the elongated protrusion 354 to move over the side receiving structure 293 so that the side receiving structure 293 may be received in the groove 353. In this position, the latch 327 and the side receiving structure 293 are in the latched position that prevents container 115 from being removed from container 113.

To unlatch the side latch 327 from the side receiving structure 293, the user may pull on the upper portions 305, 352 of the latch 327 to move the latch 327 downward in the clockwise direction. The resilient properties of the elongated protrusion 354 and the side receiving structure 293 enables the side receiving structure 293 to move out of the groove 354 when sufficient force has been applied. The side latch 327 may then be pivoted downwards to the position shown in FIG. 25A so that the container 115 may be unlatched and removed from container 113. As mentioned above, for container 115 to be removed from container 113, the side latch 325 (see FIG. 23A) of container 113 should also be unlatched from the side receiving structure 291 of container 115. As also mentioned above, the side latches 263, 265 of the container 117, the side latches 287, 289 of the container 115, and the side latch 325 of the container 113 may have similar configurations as the side latch 327 and may operate in a similar manner. It should be appreciated that the configuration, location, and number of side latches and side receiving structures may vary in other embodiments.

Figure 30A:
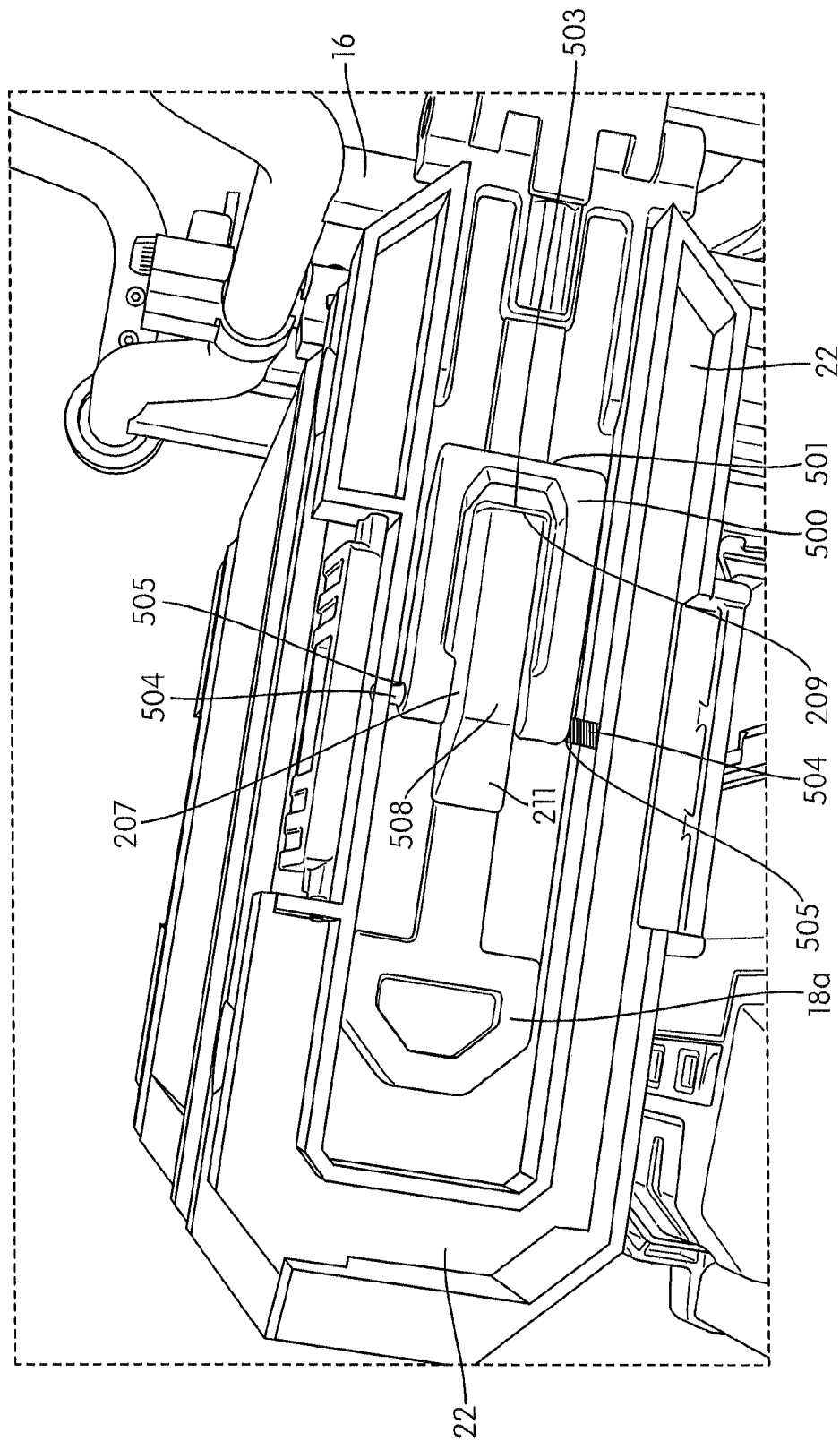
FIG. 30A is a perspective left side view of upper portion of the rolling storage assembly showing various components of a latching assembly for latching a container to the mount structure, in accordance with an embodiment of the present patent application.
Figure 30B:
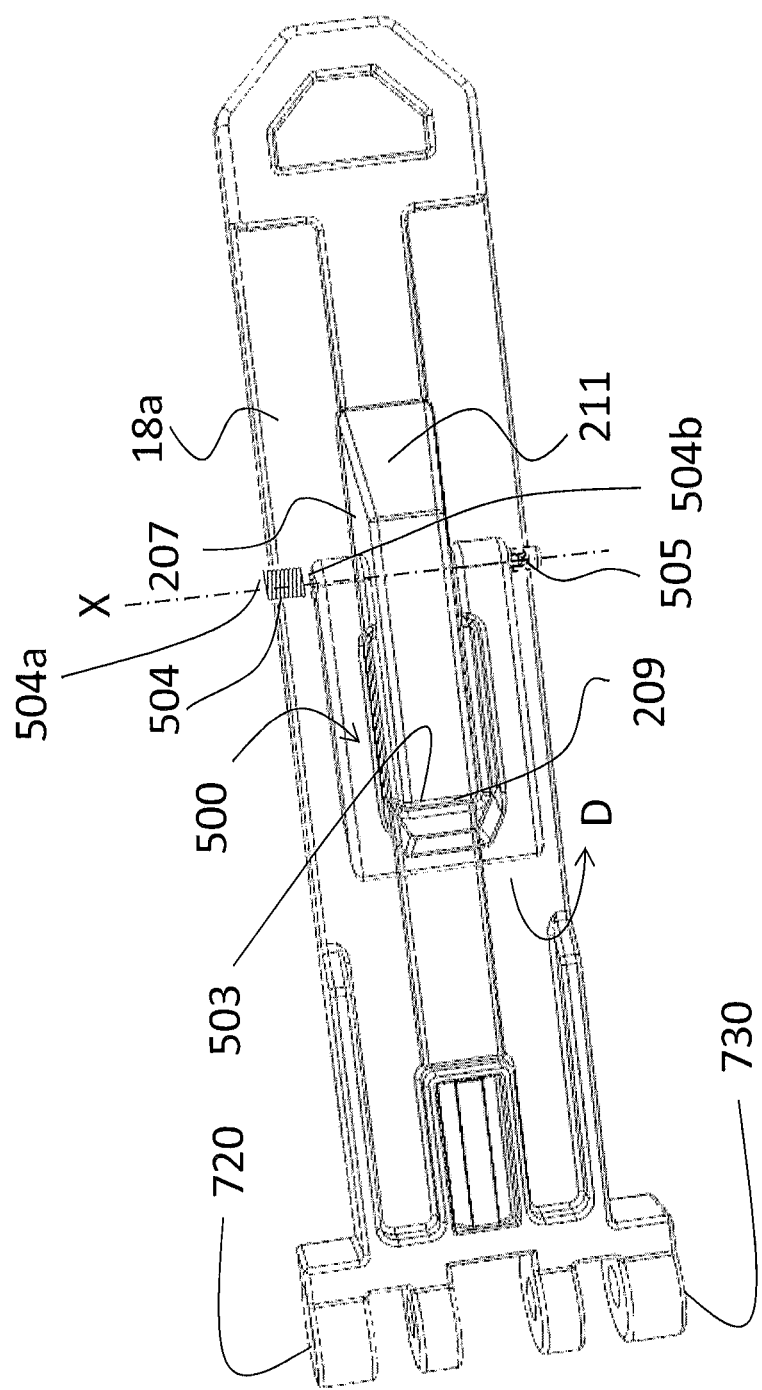
FIGS. 30B-30C are line drawing side views showing various components of the mount structure and the latching assembly shown in FIG. 30A in accordance with an embodiment of the present patent application.

As shown in FIG. 30A, in another embodiment, any of the aforementioned containers described herein may be provided with a spring biased latch 500 for latching the containers with the mount structures 18a. It is contemplated that any of the containers discussed herein may utilize latch 500. As shown in FIG. 30B, for illustrative purpose the latch 500 is shown attached to the container 22 using pivot pins 505. It is contemplated that, in addition to, or instead of pivot pins 505, other attachment mechanisms such as, for example, snap-fit connections, living hinges, or other pivotal connections may be alternatively used for attaching the latch 500 to the container. In addition, The latch 500 is constructed and arranged to pivot about vertical axis X (see FIG. 30B) such that in its closed position, a latching surface 503 of the latch 500 is engaged with or captures the protrusion 207 (see FIG. 30B) of the mount structures 18a such that abutment of between the stop surface 209 of the protrusion 207 and the latching surface 503 of the latch 500 prevents of the container 22 from being pulled away from the frame 16 to which mount structures 18a are mounted, thus, preventing the container 22 from sliding off the mount structures 18a. In an embodiment, the latch 500 may be biased to stay in a closed position (as shown in FIG. 30A) using a suitable biasing mechanism such as, for example, a spring 504. The spring 504 may be, for example, a leaf spring, a coil spring, torsion spring, or other spring that maintains the latch 500 in a position that captures the projection of protrusion 207.

One end 504a of the spring 504 is connected to container body, adjacent the latch 500, while the other end 504b of the spring is connected to the latch 500 adjacent the hinge or pivot pin of the latch. To release the latch 500, a user may pull or rotate the latch 500 outwardly in the direction D (see FIG. 30B) using, for example, a tab or end structure 501 of the latch 500, such that the latch 500 rotates about the axis X such that that the stop surface 209 no longer engages the latching surface 503, allowing the container 22 to be moved off the mount structure 18a (seen clearly in FIG. 30C).

Figure 30C:
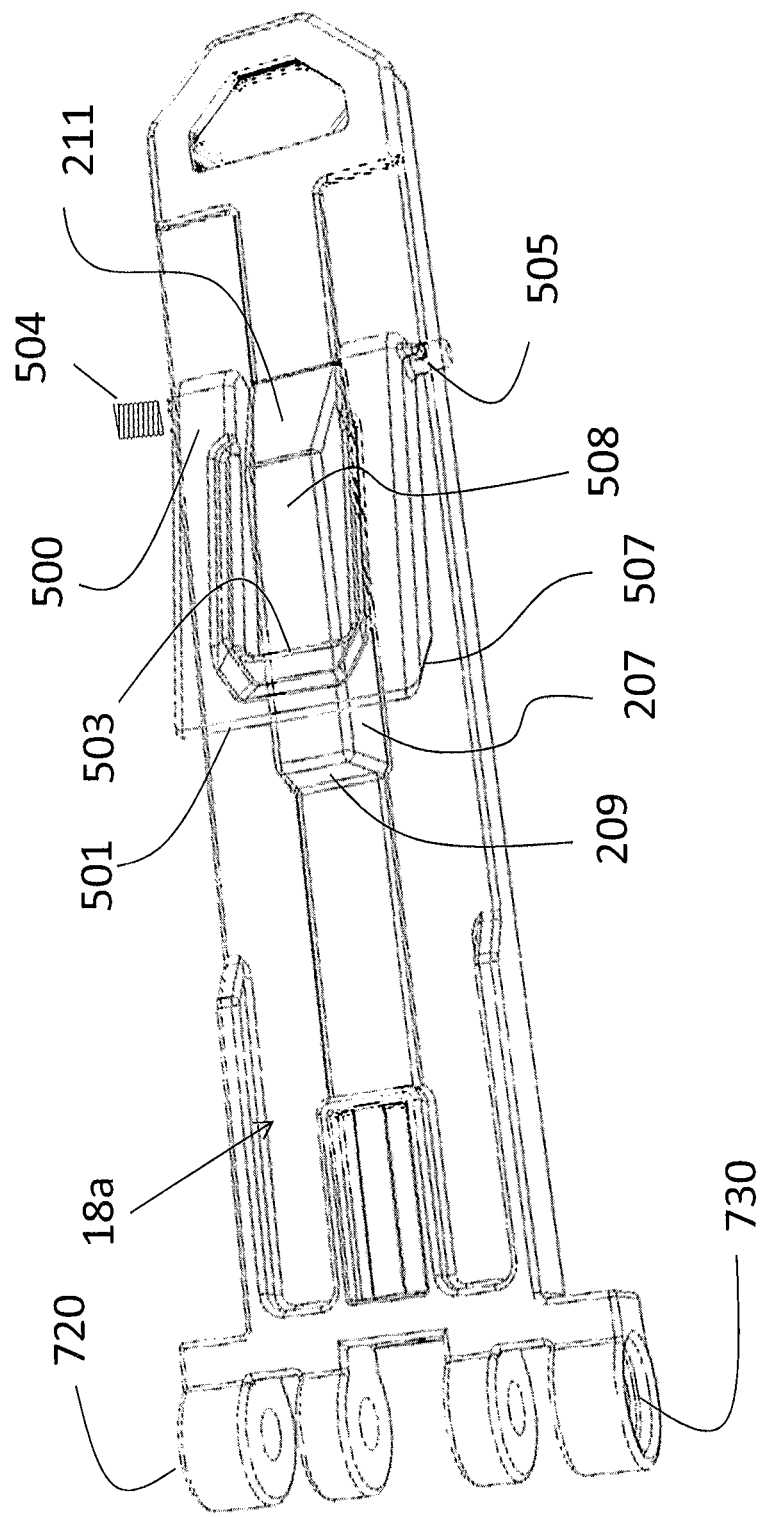

In an embodiment, a user, while mounting the container 22 onto the mount structures 18a, may manually pull the latch 500 outwardly into an open position using, for example, the end structure or tab 501, and slide the container 22 onto the mount structures 18a, and then release the latch 500 when it is in a position to lock with protrusion 207. Alternatively, in an embodiment, as shown in FIG. 30C, the latch 500 may be provided with a ramp surface 507 on tab 501 so that while the container 22 is slid onto the mount structures 18a, the ramp surface 507 can engage and can slide along the ramp surface 211 of the protrusion 207. The manually forced engagement between ramp surfaces 507 and 211 cams the latch 500 to pivot the latch 500 (see FIG. 30C) against the bias of the spring 504. The tab or end structure 501 then rides along the main upper surface 508 of the protrusion 207 until it reaches the end of the protrusion 207, at which time the spring 504 biases the latch 500 down so that the tab 501 and the latch surface 503 thereof is engaged behind the stop surface 209, as seen in FIG. 30B. Thus, the container 22 can be latched onto the mount structures 18*a* without requiring the user to pull the latch 500 outwardly to the open position. In an embodiment, only one of the ramp surfaces 211 or 507 need be provided for similar camming functionality. In an embodiment, the protrusion 207 on the mount structures 18*a* may be provided with a recess (not shown) along the stop surface 209 such that the latching portion 503 of the latch 500 fits into the recess for a secure latch. In an embodiment, the ramp surface 507 of the latch 500 may be constructed and arranged substantially parallel to the stop surface 209 of the protrusion 207. In such an embodiment, the ramp surface 507 may be provided with a ridge (not shown) and the stop surface 209 may be provided with a matching recess (not shown) such that the ridge fits into the matching recess.

Figure 31A:
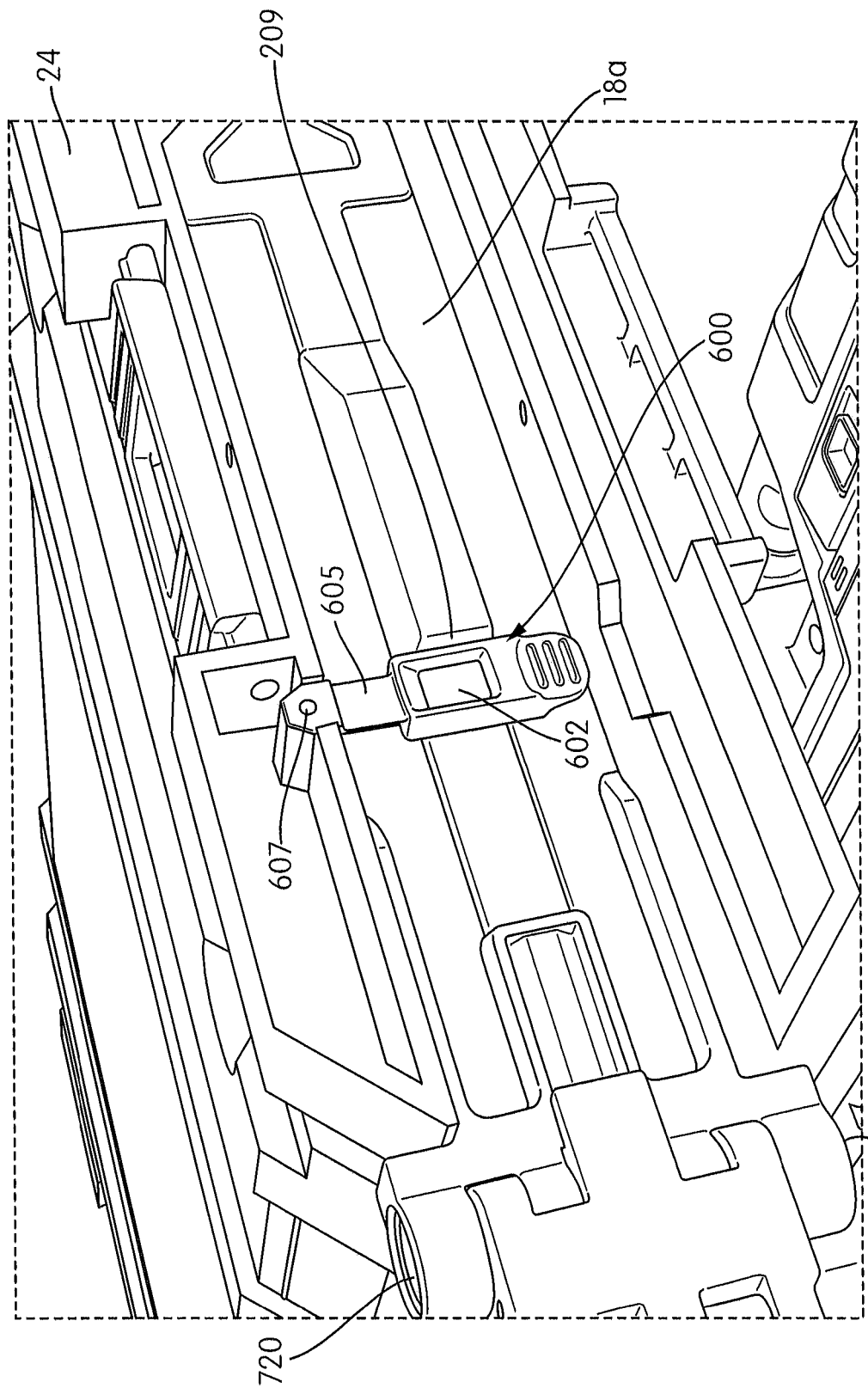
FIG. 31A is a perspective right side view of upper portion of the rolling storage assembly showing various components of an alternate latching assembly for latching a container to the mount structure, in accordance with an embodiment of the present patent application.
Figure 31B:
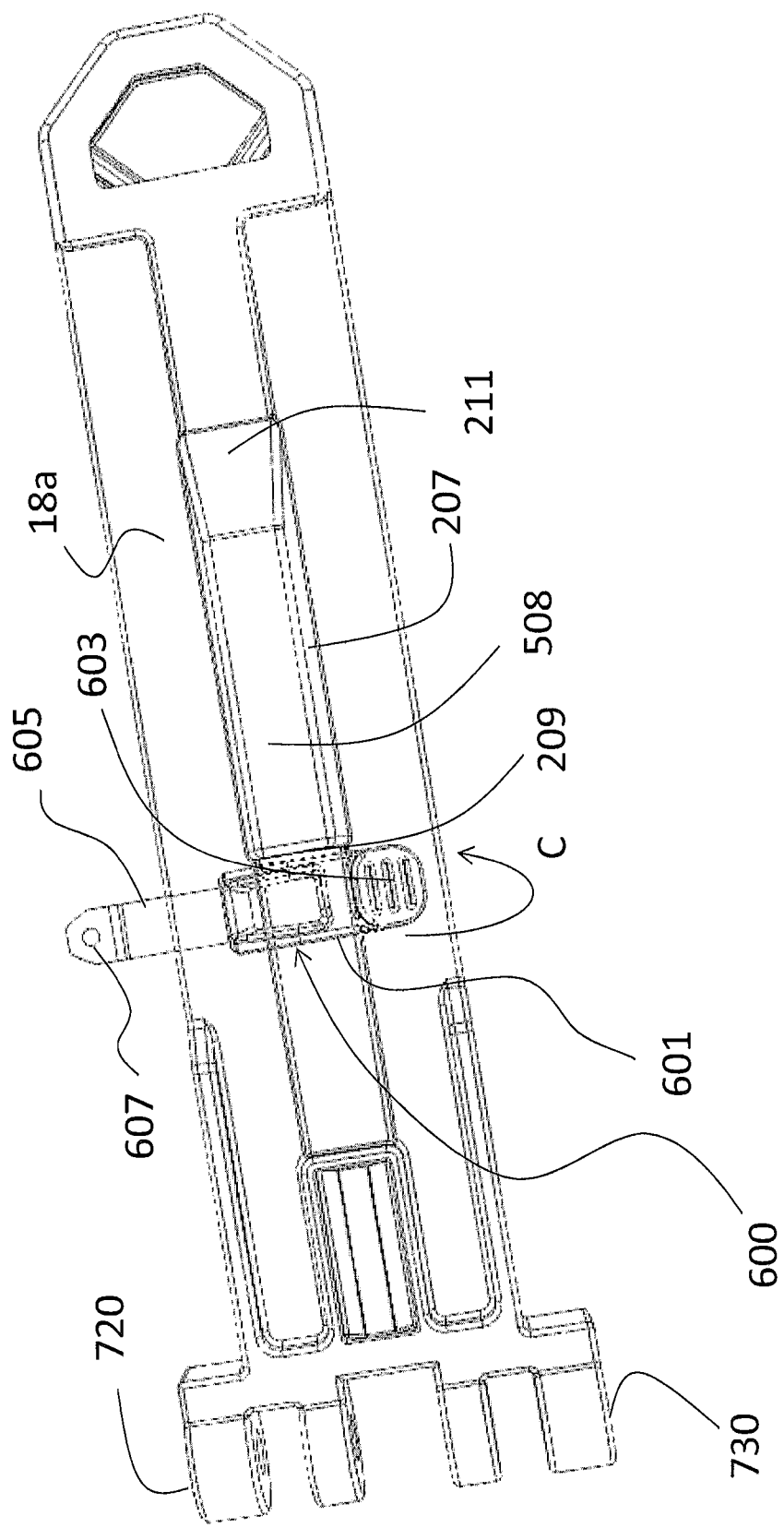
FIGS. 31B-31C are line drawing side views showing various components of the mount structure and the alternate latching assembly shown in FIG. 31A in accordance with an embodiment of the present patent application.
Figure 31C:
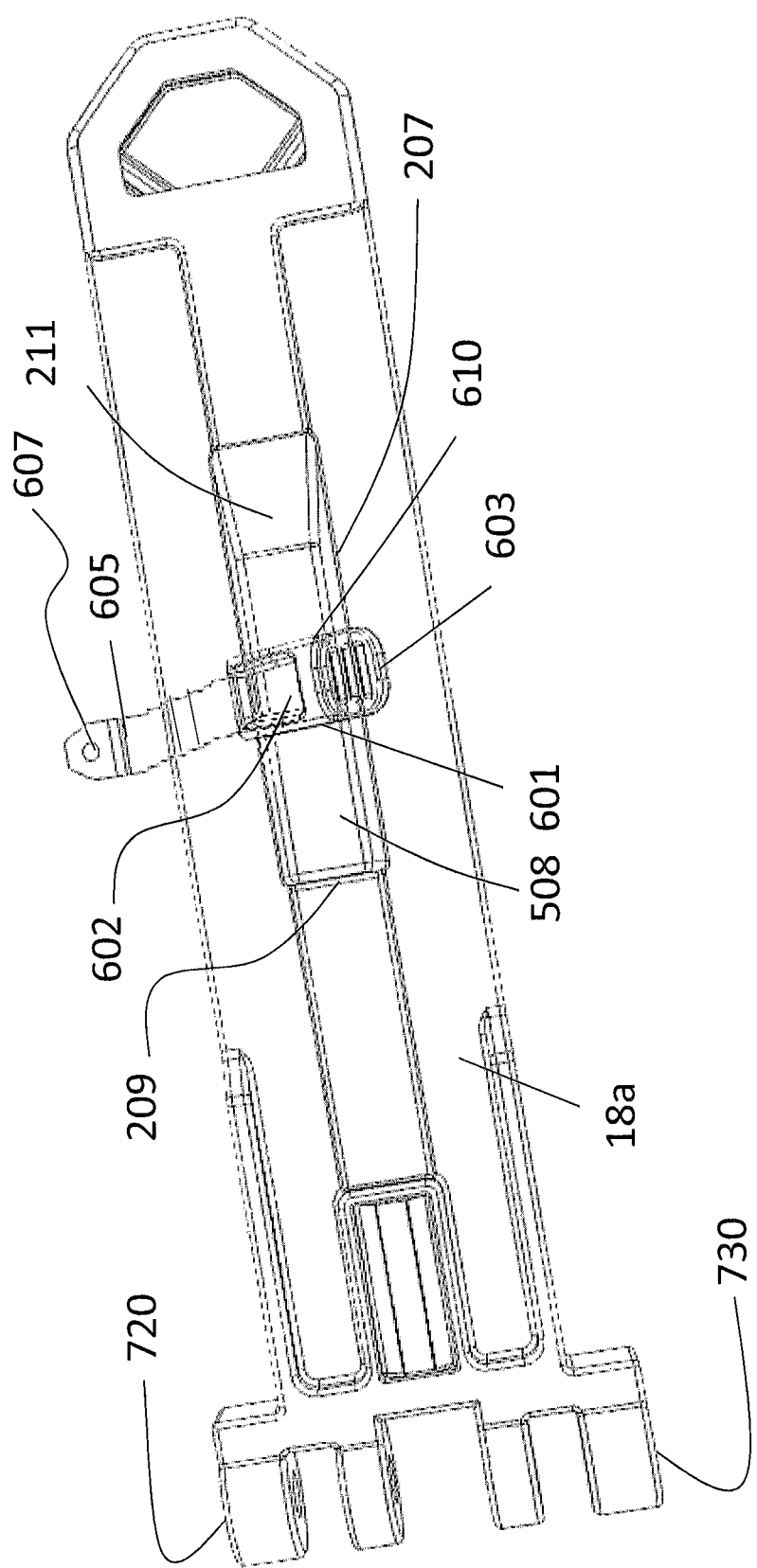

In the embodiments of FIGS. 31A-31C, an alternate the latch 600 bends outwardly rather than pivots about an axis. The side portion 601 of the latch 600 can ride over the ramp surface 211 to provide a similar effect to lock one of the containers (e.g., container 24) to one or more of the mount structures 18*a* in place. As shown in FIG. 31B, the latch 600 may be attached to the container 24 using a leaf spring 605. The latch 600 is attached to the container 24 by an attachment pin, rivet or screw 607. The latch 600 is constructed and arranged to flex outwardly bending it against the spring force of spring 605 to release a latching surface 610 (see FIG. 31C) of the main latch body 602 from engagement with stop surface 209 of the protrusion 207. In its closed position, the latching surface 610 of the latch 600 is shown engaged with the protrusion 207 (see FIG. 31B) of the mount structures 18*a* such that abutment of between the stop surface 209 and the latching surface 610 of the latch 600 prevents the movement of the container 24, thus, preventing the container 24 from sliding off the mount structures 18*a*.

To release the latch 600, a user may pull the latch 600 outwardly in the direction C (see FIG. 31B) using, for example, a tab or end structure 603, such that the latch 600 bends away by virtue of the spring 605 such that the stop surface 209 no longer engages the latching surface 610, allowing the container 24 to be moved off the mount structure 18*a*.

In an embodiment, a user, while mounting the container 24 onto the mount structures 18*a*, may manually pull the latch 600 outwardly into an open position using, for example, the end structure or tab 603, and slide the container 24 onto the mount structures 18*a*. Alternately, in an embodiment, while the container 24 is slid onto the mount structures 18*a*, the side portion 601 of the latch 600 may slide along the slanted surface 211 of the protrusion 207. The manually forced engagement between the side portion 601 and the ramp surface 211 cams the latch 600 to pivot the latch 600 against the bias of the spring 605. The side portion 601 and the main latch body 602 then ride (see FIG. 31C) along the main upper surface 508 of protrusion 207 until the latching surface 610 reaches the end of the protrusion 207, at which time the spring 605 biases the latch 600 down so that the main latch body 602 and the latching surface 610 thereof is engaged by the stop surface 209, as can be seen in FIG. 31B. Thus, the container 24 can be latched onto the mount structures 18*a* without requiring the user to pull the latch 600 outwardly to the open position. In an embodiment, the side portion 601 may be provided with a ramp surface (not shown) to facilitate the sliding of the main latch body 602 along the protrusion 207. One of skill in the art will appreciate that only one of the protrusion 207 or the main latch body 602 need be provided for similar functionality. In an embodiment, the protrusion 207 on the mount structures 18*a* may be provided with a recess (not shown) along the stop surface 209 such that the latching portion 610 of the latch 600 snaps fit into the recess for a secure latch. In an embodiment, the surface of the latching surface 610 may be provided with a ridge (not shown) and the stop surface 209 may be provided with a matching recess (not shown) such that the ridge snaps into the matching recess for a secure fit.

While different embodiments herein have been shown to have different latches on different containers, it is specifically contemplated that the same container e.g., container 20, container 22 and/or container 24, may have the latch 500 on one side wall and the latch 600 on a second opposing side wall so that two different latches are used on the opposite sides of one container.

Figure 32A:
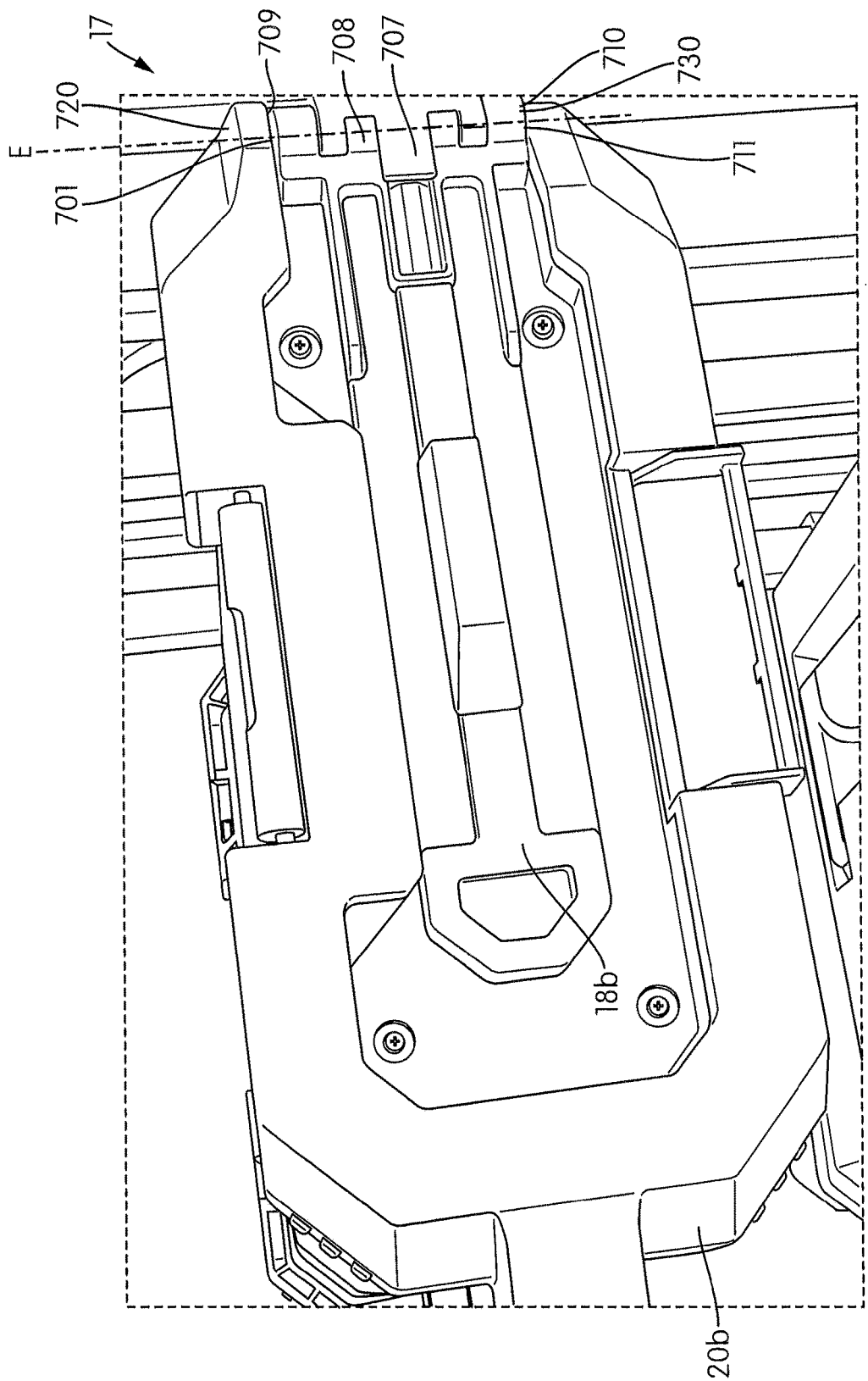
FIG. 32A is a perspective left side view, of middle portion of the rolling storage assembly showing various components of another alternate latching assembly for latching a container to the mount structure, in accordance with an embodiment of the present patent application.

In another embodiment shown in FIG. 32A, mount structures 18*b* may be provided with recesses 720 and 730 at the rear end of the mount structures 18*b* where the mount structures 18*b* are pivotally connected to the chassis 17. These recesses 720 and 730 may also be provided in prior embodiments as well, as illustrated in FIGS. 30A-30C and 31A-31C. Specifically, hinge 707 is secured to the chassis 17. The hinge 701 defines a pivot axis E about which the mount structure 18*b* will pivot. A hinge pin or other hinge structure connects the hinge 707 with the rear hinge portion 708 of mount structure 18*b*. The upper portion 709 and lower portion 710 of the hinge portion 708 have upwardly facing 720 and downwardly facing 730 recesses, respectively. A container (e.g., container 22, 24, and/or 20) may be provided with an upper protrusion 701 and a lower protrusion 711 (see FIGS. 32B and 32C) constructed and arranged such that when the container 20 is mounted onto the mount structures 18*b*, the protrusions 701 and 711 engage within the recesses 720 and 730 in the upper 709 and lower 710 portions respectively, to prevent the movement of the container 20 relative to the chassis 17, thus, preventing the container 20 from sliding off the mount structures 18*b*. The engagement between the protrusions and the recesses 720 and 730, as shown in FIG. 32B, may be a snap-fit. In such an embodiment, the protrusions 701 and 711 may be provided with a ramp surface 703 and a stop surface 705 (see, for example, FIG. 32C). When a user slides the container 20 onto the mount structures 18*b*, the protrusions 701 and 711 slide into the recesses. The stop surface 705 prevents the container 20 from moving forward once the protrusions are engaged with the corresponding recesses.

Figure 32D:
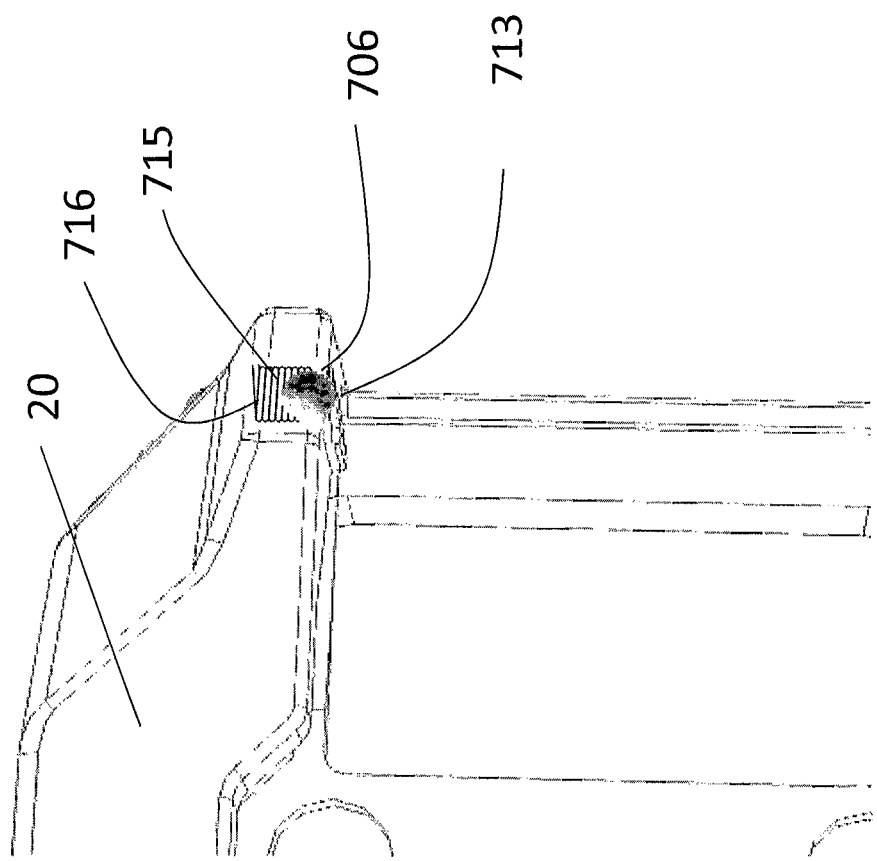

In an embodiment, the protrusions may engage with the recesses by a friction fit or interlocking fit (not shown). In another embodiment, as shown in FIG. 32D, the one or more protrusions may take the form of a spring biased ball 713 biased by spring 715. The ball 713 and spring 715 may be at least partially contained in a recess 716 formed in the container 20. In another embodiment, spring biased pins are used as the protrusions. In one embodiment, a release lever is used to retract the pins to facilitate removal and/or insertion of the pins or balls from and into the recess 720 and/or 730. In an embodiment, the protrusion 701 may be retractable, for example, using lever (not shown) A user may pull on the lever to retract the protrusion or pin such that it is no longer engaged with the recess 720 and/or 730. In an embodiment, the lever may be provided with a locking mechanism (not shown) constructed and arranged to lock the protrusion in its retracted position. In an embodiment, the locking mechanism may be, alternatively or additionally, constructed and arranged to lock the protrusion in its engaged position. In various embodiments, the protrusion may be provided by a ball bearing, a peg, or any other suitable structure known in the art.

One skilled in the art will appreciate that any of the mount structures 18 and/or 18*a* described herein may be additionally provided with the functionality of the mount structures 18*b* described herein with reference to FIGS. 32A-32D. It is contemplated that the arrangement and location of the any of the mount structures (e.g., 18, 18*a*, and/or 18*b*) described herein on the any of the chassis (e.g., 17 and 17*a*) described herein may vary and may be customized according to user preferences.

Figure 33:
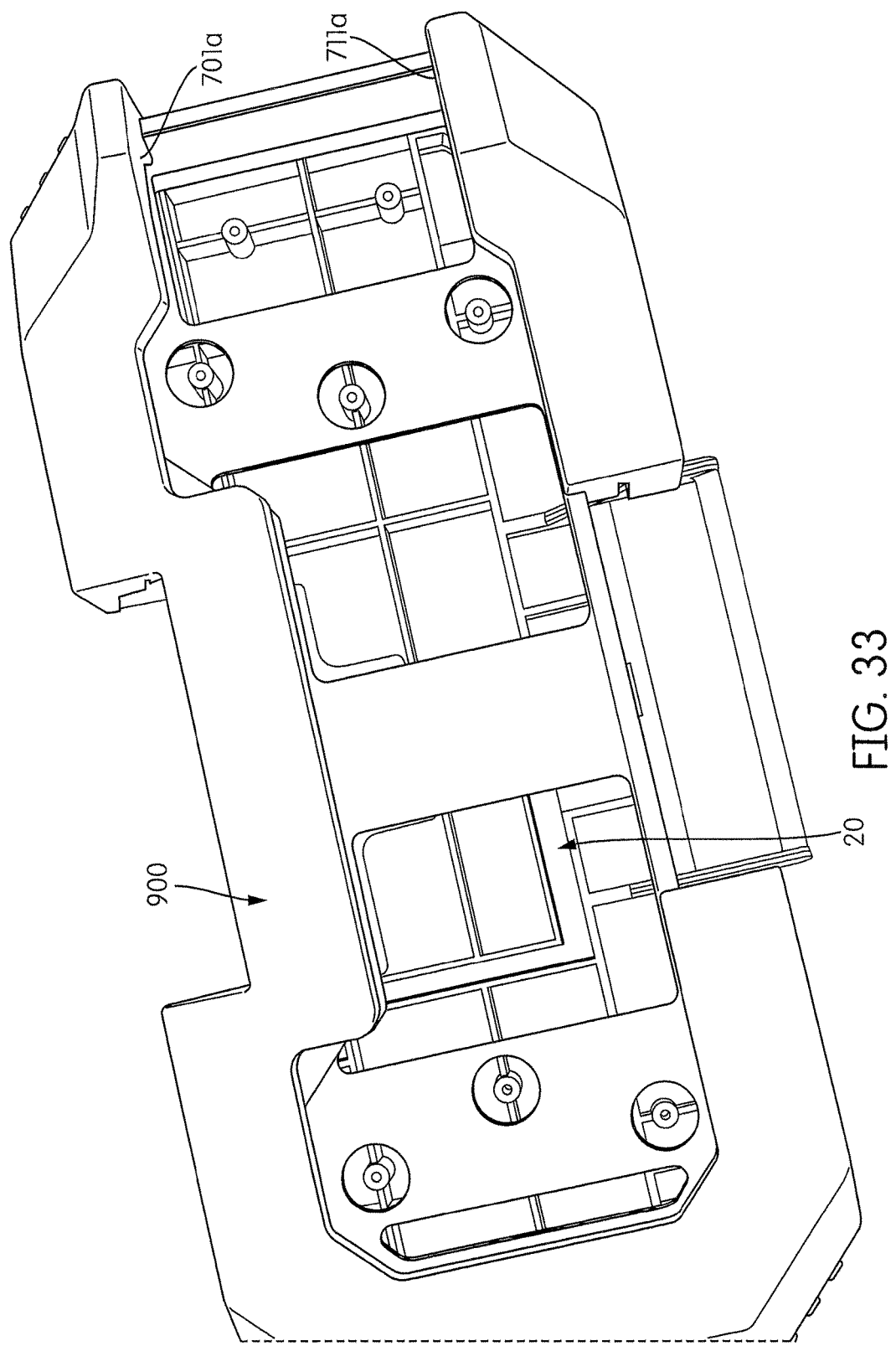
FIG. 33 is a perspective view of an attachment for a container showing an alternate latching mechanism for latching the container to the mount structure, in accordance with an embodiment of the present patent application.

In another embodiment shown in FIG. 33, any one of the containers described herein may include an attachment 900 attached to one or both of the side walls of the container (e.g., container 20). In an embodiment, the attachment 900 may be removably attached to the container 20 using any fastening means including, but not limited to, screws, nuts, rivets, adhesives, or any other adhesives or any combination thereof. In an embodiment, the attachment 900 may be fitted onto the container 20 using, for example, a snap-fit or a friction fit. In an embodiment, the attachment 900 may include protrusions such as 701*a* and 711*a* similar to protrusions 701 and 711 described herein (with reference to FIGS. 32A-32D) near the rear end of the attachment 900 (as seen clearly in FIG. 33). In such an embodiment, the protrusions 701*a* and 711*a* provide similar functionality as the protrusions 701 and 711. It is contemplated that the attachment 900 can be designed such that the containers' access the mount structures (e.g., 18 and 18*a*) described herein may not be restricted.

Figures 34A, 34B:
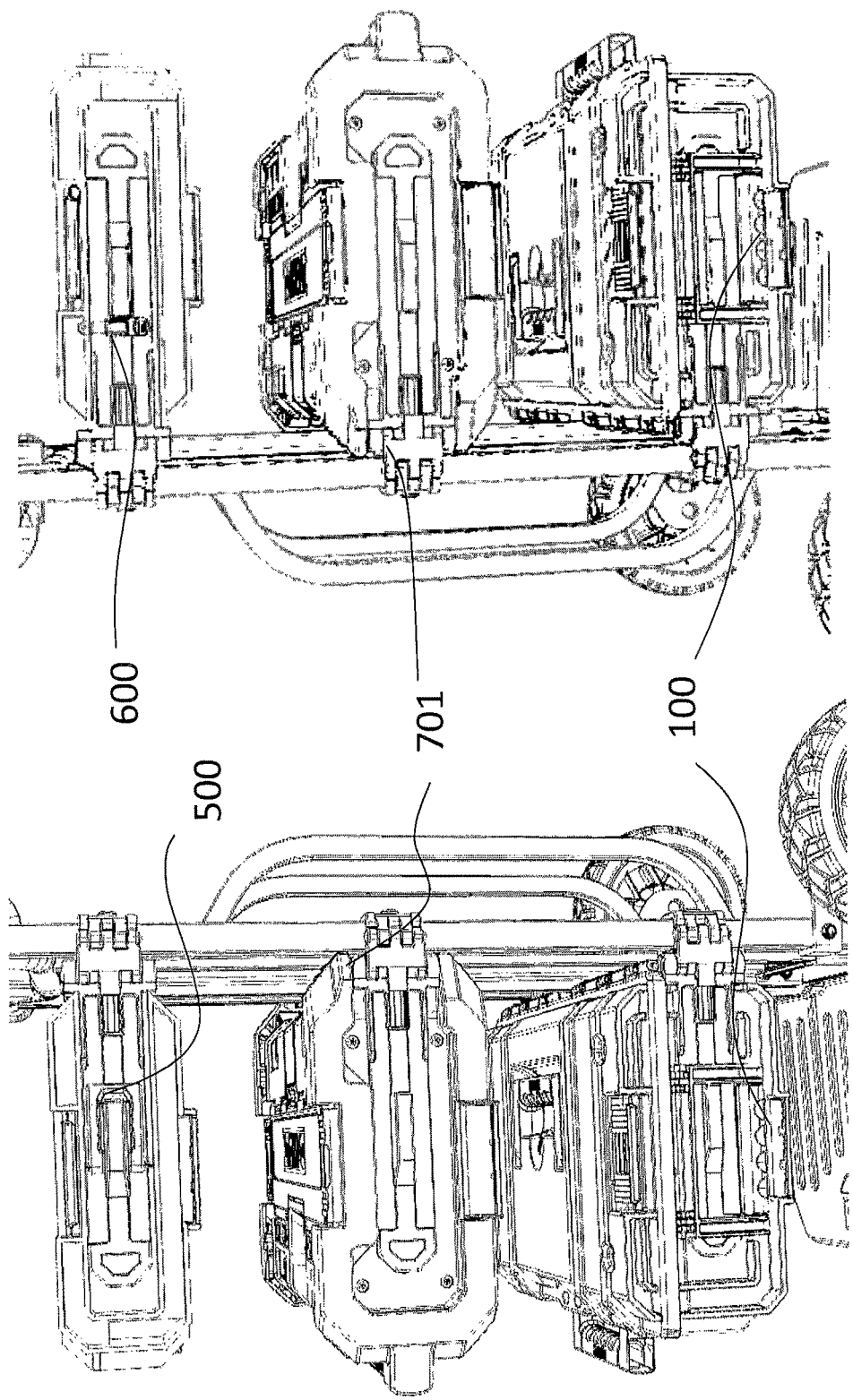
FIGS. 34A-34B are perspective views of the first, second, and third containers latched to the mount structures in accordance with an embodiment of the present patent application.

It is contemplated that any one or more of the containers described herein may be provided with any combination of the latch 500, the latch 600, latch handles 98, 100 or 102, or one or more protrusions 701 and recesses 720, 730 of the embodiments illustrated and disclosed with respect to FIGS. 30A-30C, 31A-31C, and FIGS. 32A-32D. Examples of such embodiments can be seen in FIG. 34A and FIG. 34B.

Figure 35:
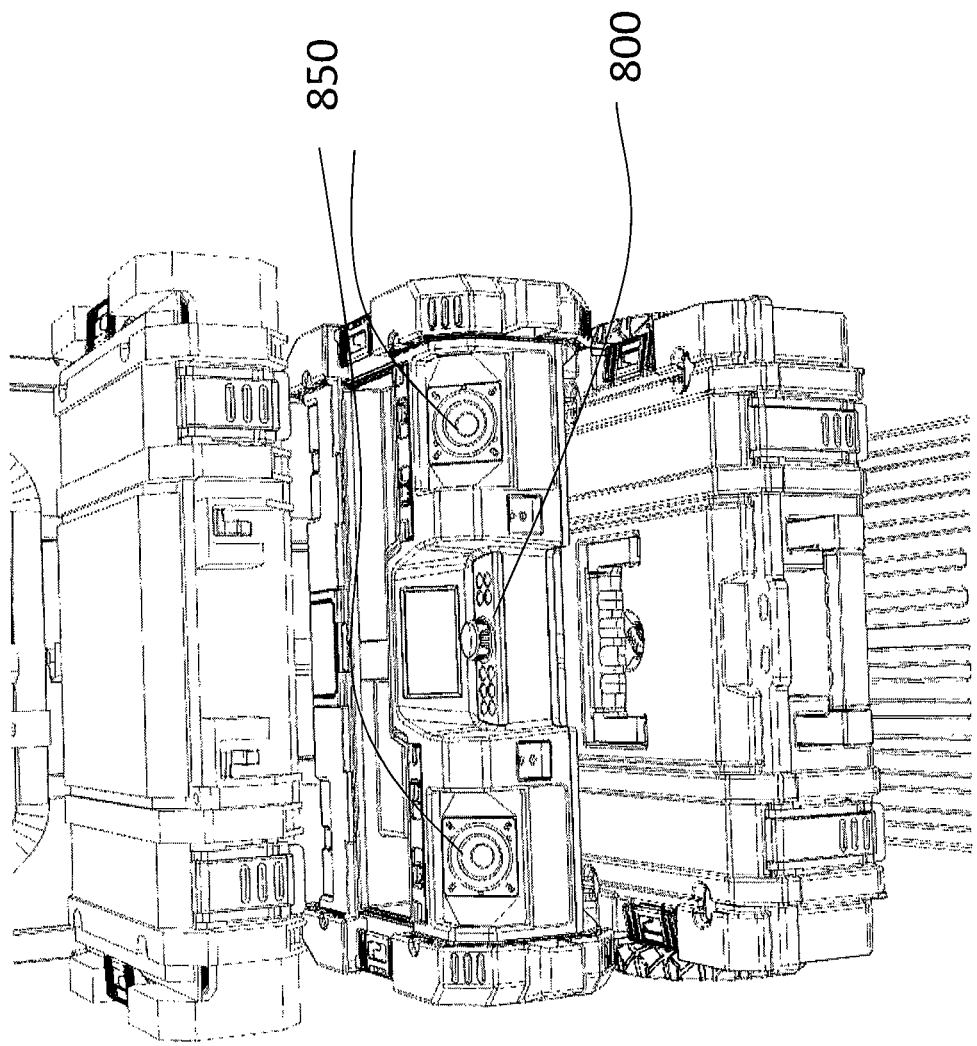
FIG. 35 is a perspective view of the rolling storage assembly including a container having a radio in accordance with an embodiment of the present patent application.

As shown in FIG. 35, in an embodiment, a container may constitute or include a radio. As used herein, a radio may refer to any electronic instrument that is equipped with an audio playback apparatus 800. Examples of audio playback apparatus 800 may include an AM receiver, an FM receiver, a satellite radio receiver, magnetic tape player, a CD player, or an MP3 player such as, for example, an iPod. The audio playback apparatus 800 may also be equipped with one or more speakers 850 and a volume controller. The audio playback apparatus 800 may be further equipped with a battery (not shown) or a port for connecting the audio playback apparatus to an electric supply outlet (not shown). Additionally or alternatively, the audio playback apparatus may include one or more ports to receive audio input from a phone or any other electronic equipment equipped with providing an audio output such as, for example, a smartphone, a tablet, a laptop, and any other such electronic equipment known in the art. The radio or audio playback apparatus 800 is provided with one or more of the latch arrangements described herein to enable the apparatus 800 to be releasably attached to any pair of the mount structures disclosed herein.

Although the present patent application has been described in detail for the purpose of illustration based on what is currently considered to be the most practical and preferred embodiments, it is to be understood that such detail is solely for that purpose and that the present patent application is not limited to the disclosed embodiments, but, on the contrary, is intended to cover modifications and equivalent arrangements that are within the spirit and scope of the appended claims. For example, it is to be understood that the present patent application contemplates that, to the extent possible, one or more features of any embodiment may be combined with one or more features of any other embodiment.

What is claimed is:

1. An apparatus for transporting articles between working locations, comprising:
   one or more rotatable ground engaging wheels mounted towards the bottom of the apparatus for rotation about an axis to provide rolling support for the apparatus;
   a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction;
   a frame;
   at least one container connected to the frame;
   one or more mount structures adjustably connected to the frame; and
   an audio playback device comprising one or more speakers, the audio playback device configured to be releasably connected to the one or more mount structures with a releasable connection,
   wherein the releasable connection between the audio playback device and the one or more mount structures comprises at least one releasable latch disposed on one of the audio playback device and the one or more mount structures and configured to engage with the other of the audio playback device and one or more mount structures to latch the audio playback device to the one or more mount structures connected to the frame.

2. The apparatus of claim 1, wherein the releasable connection between the audio playback device and the one or more mount structures enables the audio playback device to be connected at different heights on the apparatus.

3. The apparatus of claim 2, wherein the at least one container is releasably connected to the frame.

4. The apparatus of claim 1, wherein a releasable connection between the at least one container and the frame enables the at least one container to be connected at different heights on the apparatus.

5. The apparatus of claim 4, wherein the at least one container is releasably connected to the one or more mount structures.

6. The apparatus of claim 1, wherein the at least one container is releasably connected to the one or more mount structures.

7. The apparatus of claim 1, wherein the at least one releasable latch is disposed on the one or more mount structures and is configured to engage with one or more coupling elements on the audio playback device to latch the audio playback device to the one or more mount structures.

8. The apparatus of claim 1, wherein the releasable connection comprises one or more protrusions provided on the one or more mount structures.

9. The apparatus of claim 8, wherein the at least one releasable latch is disposed on the audio playback device and is configured to engage with the one or more protrusions on the one or more mount structures to latch the audio playback device to the one or more mount structures.

10. The apparatus of claim 9, wherein the at least one releasable latch is provided with a spring to bias the releasable latch in a closed position, wherein when the at least one releasable latch is engaged with an associated protrusion, abutment between a stop surface provided on the associated protrusion and at least a portion of the associated releasable latch prevents removal of the audio playback device from the associated one or more mount structures.

11. The apparatus of claim 1, wherein the audio playback device is selected from the group consisting of an AM receiver, an FM receiver, a satellite radio receiver, a magnetic tape player, a CD player, and an MP3 player.

12. The apparatus of claim 1, wherein the audio playback device includes a volume controller, and a battery or a port configured for connecting the audio playback device to an electric supply outlet.

13. The apparatus of claim 1, wherein the audio playback device includes one or more ports configured to receive an audio input from an electronic equipment configured for providing an audio output.

14. The apparatus of claim 1, wherein the one or more mount structures comprise a connection structure that includes at least one stop surface, and wherein the audio playback device has at least one spring biased latch constructed and arranged to releasably engage with the at least one stop surface.

15. An apparatus for transporting articles between working locations, comprising:
one or more rotatable ground engaging wheels mounted towards the bottom of the apparatus for rotation about an axis to provide rolling support for the apparatus;
a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction;
a frame;
one or more mount structures adjustably connected to the frame so as to adjust a height thereof on the frame;
at least one container releasably connected to the one or more mount structures that are adjustably connected to the frame, thus enabling a height of the at least one container to be adjusted on the frame; and
an audio playback device comprising one or more speakers, the audio playback device configured to be releasably connected to the one or more mount structures with a releasable connection,
wherein the releasable connection between the audio playback device and the one or more mount structures comprises at least one releasable latch disposed on one of the audio playback device and the one or more mount structures and configured to engage with the other of the audio playback device and the one or more mount structures to latch the audio playback device to the one or more mount structures connected to the frame.

16. The apparatus of claim 15, wherein the at least one releasable latch is disposed on the one or more mount structures and is configured to engage with one or more coupling elements on the audio playback device to latch the audio playback device to the one or more mount structures.

17. The apparatus of claim 15, wherein the at least one releasable latch is disposed on the audio playback device is configured to engage with one or more protrusions on the one or more mount structures to latch the audio playback device to the one or more mount structures.

18. The apparatus of claim 17, wherein the at least one releasable latch is provided with a spring to bias the releasable latch in a closed position, wherein when the at least one releasable latch is engaged with an associated protrusion, abutment between a stop surface provided on the associated protrusion and at least a portion of the associated releasable latch prevents removal of the audio playback device from the associated one or more mount structures.

* * * * *

UNITED STATES PATENT AND TRADEMARK OFFICE
CERTIFICATE OF CORRECTION

PATENT NO. : 9,643,629 B2  
APPLICATION NO. : 14/830304  
DATED : May 9, 2017  
INVENTOR(S) : Sharon Bar-Erez et al.

Page 1 of 1

It is certified that error appears in the above-identified patent and that said Letters Patent is hereby corrected as shown below:

On the Title Page

Item (73) Assignee:  
Replace "The Stanley Works Isreal Ltd., Rosh Ha'Ayin (IL)"  
With -- The Stanley Works Israel Ltd., Rosh Ha'Ayin (IL) --

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*